US010293881B2

(12) United States Patent
Hoogendoorn

(10) Patent No.: US 10,293,881 B2
(45) Date of Patent: *May 21, 2019

(54) REAR SUSPENSION SYSTEM FOR A BICYCLE

(71) Applicant: Yeti Cycling, LLC, Golden, CO (US)

(72) Inventor: Steven W. Hoogendoorn, Evergreen, CO (US)

(73) Assignee: Yeti Cycling, LLC, Golden, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/981,230

(22) Filed: Dec. 28, 2015

(65) Prior Publication Data

US 2016/0280317 A1    Sep. 29, 2016

Related U.S. Application Data

(60) Continuation of application No. 14/191,530, filed on Feb. 27, 2014, now Pat. No. 9,221,513, which is a continuation of application No. 13/626,276, filed on Sep. 25, 2012, now Pat. No. 8,696,008, which is a continuation of application No. 12/786,307, filed on May 24, 2010, now Pat. No. 8,272,658, which is a division of application No. 11/229,270, filed on Sep. 15, 2005, now Pat. No. 7,722,072.

(60) Provisional application No. 60/610,273, filed on Sep. 15, 2004.

(51) Int. Cl.
*B62D 21/00* (2006.01)
*B62K 25/28* (2006.01)
*B62K 25/04* (2006.01)

(52) U.S. Cl.
CPC ...... *B62K 25/286* (2013.01); *B62K 2025/045* (2013.01); *B62K 2025/048* (2013.01)

(58) Field of Classification Search
CPC ............ B62K 25/286; B62K 2025/045; B62K 2025/048
See application file for complete search history.

(56) References Cited

U.S. PATENT DOCUMENTS

| 421,748 A | 2/1890 | McErlain |
| 519,855 A | 5/1894 | Whitaker |
| 591,306 A | 10/1897 | Tolson |
| 630,232 A | 8/1899 | Hughes et al. |
| 712,784 A | 11/1902 | Ellis |
| 724,871 A | 4/1903 | Hunter |

(Continued)

FOREIGN PATENT DOCUMENTS

| CA | 2293366 A1 | 12/1998 |
| CA | 2980086 A1 | 6/2005 |

(Continued)

OTHER PUBLICATIONS

International Bureau, International Search Report and Written Opinion for corresponding PCT Application No. PCT/US2012/066427, dated Jan. 18, 2013, 12 pages.

(Continued)

*Primary Examiner* — Tony H Winner
(74) *Attorney, Agent, or Firm* — Dorsey & Whitney LLP

(57) ABSTRACT

A bicycle may include a rear suspension system to absorb forces impacting on the bicycle by allowing a rear wheel of the bicycle to be displaced relative to the bicycle frame. The rear suspension system may be adjusted in some versions to affect the travel path of the rear wheel as well as the leverage ratio curve to suit the rider's preference.

12 Claims, 50 Drawing Sheets

(56) References Cited

U.S. PATENT DOCUMENTS

| | | |
|---|---|---|
| 944,795 A | 12/1909 | Leet et al. |
| 1,043,269 A | 11/1912 | Stephenson |
| 1,068,583 A | 7/1913 | Harley |
| 1,168,702 A | 1/1916 | Babis, Jr. |
| 1,220,606 A | 3/1917 | Chelstrom |
| 1,261,440 A | 4/1918 | Rigby |
| 1,283,030 A | 10/1918 | Ashton |
| 1,369,356 A | 2/1921 | Rigby |
| 2,173,520 A | 9/1939 | Klatt |
| 3,803,933 A | 4/1974 | Huret et al. |
| 3,813,955 A | 6/1974 | Huret et al. |
| 3,847,028 A | 11/1974 | Bergles |
| 3,917,313 A | 11/1975 | Smith et al. |
| 3,977,697 A | 8/1976 | MacPike et al. |
| 4,058,181 A | 11/1977 | Buell |
| 4,076,271 A | 2/1978 | Doncque |
| 4,114,918 A | 9/1978 | Lutz |
| 4,241,617 A | 12/1980 | Fujimoto et al. |
| 4,265,329 A | 5/1981 | de Cortanze |
| 4,279,172 A | 7/1981 | Nagano et al. |
| 4,322,088 A | 3/1982 | Miyakoshi et al. |
| 4,360,214 A | 11/1982 | Isono |
| 4,408,674 A | 10/1983 | Boyesen |
| 4,410,196 A | 10/1983 | Ribi |
| 4,415,057 A | 11/1983 | Yamaguchi |
| 4,429,760 A | 2/1984 | Koizumi et al. |
| 4,433,747 A | 2/1984 | Offenstadt |
| 4,463,824 A | 8/1984 | Boyesen |
| 4,463,964 A | 8/1984 | Takayanagi et al. |
| 4,485,885 A | 12/1984 | Fukuchi |
| 4,500,302 A | 2/1985 | Crepin |
| 4,506,755 A | 3/1985 | Tsuchida et al. |
| 4,540,193 A | 9/1985 | Noda et al. |
| 4,544,044 A | 10/1985 | Boyesen |
| RE32,059 E | 12/1985 | Nagano |
| 4,558,761 A | 12/1985 | Boyesen |
| 4,561,519 A | 12/1985 | Omori |
| 4,574,909 A | 3/1986 | Ribi |
| 4,582,343 A | 4/1986 | Waugh |
| 4,586,913 A | 5/1986 | Nagano |
| 4,596,302 A | 6/1986 | Suzuki et al. |
| 4,619,633 A | 10/1986 | Nagano |
| 4,621,706 A | 11/1986 | Boyesen |
| 4,671,525 A | 6/1987 | Ribi |
| 4,673,053 A | 6/1987 | Tanaka et al. |
| 4,679,811 A | 7/1987 | Shuler |
| 4,702,338 A | 10/1987 | Trema |
| 4,735,277 A | 4/1988 | Prince |
| 4,744,434 A | 5/1988 | Miyakoshi et al. |
| 4,789,042 A | 12/1988 | Pitts |
| 4,789,174 A | 12/1988 | Lawwill |
| RE32,924 E | 5/1989 | Nagano |
| 4,830,391 A | 5/1989 | Silk |
| 4,878,884 A | 11/1989 | Romano |
| 4,951,791 A | 8/1990 | Belil |
| 5,011,459 A | 4/1991 | Van De Vel |
| 5,121,937 A | 6/1992 | Lawwill |
| 5,205,572 A | 4/1993 | Buell et al. |
| 5,226,674 A | 7/1993 | Buell et al. |
| 5,244,224 A | 9/1993 | Busby |
| 5,259,637 A | 11/1993 | Busby |
| 5,282,517 A | 2/1994 | Prince |
| 5,295,702 A | 3/1994 | Buell |
| 5,299,820 A | 4/1994 | Lawwill |
| 5,306,036 A | 4/1994 | Busby |
| 5,332,246 A | 7/1994 | Buell |
| 5,335,929 A | 8/1994 | Takagaki et al. |
| 5,354,085 A | 10/1994 | Gally |
| 5,356,165 A | 10/1994 | Kulhawik et al. |
| 5,360,078 A | 11/1994 | Rifenburg et al. |
| 5,370,411 A | 12/1994 | Takamiya et al. |
| 5,409,248 A | 4/1995 | Williams |
| 5,409,249 A | 4/1995 | Busby |
| 5,417,445 A | 5/1995 | Smart |
| 5,429,380 A | 7/1995 | Lawwill |
| 5,435,584 A | 7/1995 | Buell |
| 5,441,292 A | 8/1995 | Busby |
| 5,452,910 A | 9/1995 | Harris |
| 5,474,318 A | 12/1995 | Castellano |
| 5,498,013 A | 3/1996 | Hwang |
| 5,509,679 A | 4/1996 | Leitner |
| 5,553,881 A | 9/1996 | Klassen et al. |
| 5,570,896 A | 11/1996 | Collins |
| 5,597,366 A | 1/1997 | Ozaki |
| 5,607,367 A | 3/1997 | Patterson |
| 5,611,557 A | 3/1997 | Farris et al. |
| 5,628,524 A | 5/1997 | Klassen et al. |
| 5,658,001 A | 8/1997 | Blanchard |
| 5,678,837 A | 10/1997 | Leitner |
| 5,688,200 A | 11/1997 | White |
| 5,772,228 A | 6/1998 | Owyang |
| 5,791,674 A | 8/1998 | D'Aluisio et al. |
| 5,816,966 A | 10/1998 | Yang et al. |
| 5,826,899 A | 10/1998 | Klein et al. |
| 5,899,480 A | 5/1999 | Leitner |
| 5,957,473 A | 9/1999 | Lawwill |
| 6,012,999 A | 1/2000 | Patterson |
| 6,076,845 A | 6/2000 | Lawwill et al. |
| 6,102,421 A | 8/2000 | Lawwill et al. |
| 6,131,934 A | 10/2000 | Sinclair |
| 6,206,397 B1 | 3/2001 | Klassen et al. |
| 6,244,610 B1 | 6/2001 | Kramer-Massow |
| 6,439,593 B1 | 8/2002 | Tseng |
| 6,450,520 B1 | 9/2002 | Girard |
| 6,488,301 B2 | 12/2002 | Klassen et al. |
| 6,543,799 B2 | 4/2003 | Miyoshi |
| 6,629,903 B1 | 10/2003 | Kondo |
| 6,712,374 B2 | 3/2004 | Assier |
| 6,793,230 B1 | 9/2004 | Cheng |
| 6,843,494 B2 | 1/2005 | Lam |
| 6,845,998 B2 | 1/2005 | Probst |
| 6,871,867 B2 | 3/2005 | Parigian |
| 6,877,591 B1 | 4/2005 | Hso |
| 6,886,846 B2 | 5/2005 | Carroll |
| 6,902,504 B2 | 6/2005 | Fukuda |
| 6,926,298 B2 | 8/2005 | Ellsworth et al. |
| 6,955,373 B2 | 10/2005 | Chang |
| 7,025,698 B2 | 4/2006 | Wickliffe |
| 7,048,292 B2 | 5/2006 | Weagle |
| 7,066,481 B1 | 6/2006 | Soucek |
| RE39,159 E | 7/2006 | Klassen et al. |
| 7,100,930 B2 | 9/2006 | Saiki |
| 7,104,908 B2 | 9/2006 | Nagano |
| 7,128,329 B2 | 10/2006 | Weagle |
| 7,131,511 B2 | 11/2006 | Arnold |
| 7,210,695 B2 | 5/2007 | Griffiths |
| 7,216,883 B2 | 5/2007 | Oconnor |
| 7,350,797 B2 | 4/2008 | Carroll |
| 7,377,535 B2 | 5/2008 | Chamberlain |
| 7,392,999 B2 | 7/2008 | Oconnor |
| 7,413,208 B2 | 8/2008 | Weng |
| 7,427,077 B2 | 9/2008 | Lesage et al. |
| 7,467,803 B2 | 12/2008 | Buckley |
| 7,494,146 B2 | 2/2009 | Tseng |
| 7,581,743 B2 | 9/2009 | Graney |
| 7,635,141 B2 | 12/2009 | Oconnor |
| 7,658,394 B1 | 2/2010 | Huang |
| 7,677,347 B2 | 3/2010 | Brawn |
| 7,703,785 B2 | 4/2010 | Colegrove et al. |
| 7,703,788 B2 | 4/2010 | Tanouye et al. |
| 7,712,757 B2 | 5/2010 | Berthold |
| 7,717,212 B2 | 5/2010 | Weagle |
| 7,722,072 B2 | 5/2010 | Hoogendoorn |
| 7,722,488 B2 | 5/2010 | Kunisawa et al. |
| 7,766,135 B2 | 8/2010 | Fox |
| 7,784,810 B2 | 8/2010 | Graney |
| 7,806,422 B2 | 10/2010 | I |
| 7,815,207 B2 | 10/2010 | Currie |
| 7,828,314 B2 | 11/2010 | Weagle |
| 7,837,213 B2 | 11/2010 | Colegrove et al. |
| 7,837,214 B2 | 11/2010 | Tribotte |
| 7,891,688 B2 | 2/2011 | Chamberlain |
| 7,909,347 B2 | 3/2011 | Earle |
| 7,914,407 B2 | 3/2011 | Fukushima et al. |

(56) References Cited

U.S. PATENT DOCUMENTS

| | | |
|---|---|---|
| 7,934,739 B2 | 5/2011 | Domahidy |
| 7,938,424 B2 | 5/2011 | Arraiz |
| 7,938,425 B2 | 5/2011 | Chamberlain |
| 7,954,837 B2 | 6/2011 | Talavasek |
| 7,963,541 B2 | 6/2011 | Chamberlain |
| 7,980,579 B2 | 7/2011 | Buckley |
| 8,002,301 B2 | 8/2011 | Weagle |
| 8,006,993 B1 | 8/2011 | Chamberlain |
| 8,007,383 B2 | 8/2011 | Watarai et al. |
| 8,012,052 B2 | 9/2011 | Shahana |
| 8,033,558 B2 | 10/2011 | Earle |
| 8,066,297 B2 | 11/2011 | Beale et al. |
| 8,075,009 B2 | 12/2011 | Cocalis et al. |
| 8,136,829 B1 | 3/2012 | Kang et al. |
| 8,152,191 B2 | 4/2012 | Huang et al. |
| 8,201,841 B2 | 6/2012 | Beale et al. |
| 8,272,657 B2 | 9/2012 | Graney et al. |
| 8,272,658 B2 | 9/2012 | Hoogendoorn |
| 8,286,982 B2 | 10/2012 | Plantet et al. |
| 8,303,443 B2 | 11/2012 | Wickliffe et al. |
| 8,348,295 B2 | 1/2013 | Beaulieu et al. |
| 8,382,136 B2 | 2/2013 | Beale et al. |
| 8,419,573 B2 | 4/2013 | Yamaguchi |
| 8,430,415 B2 | 4/2013 | Earle et al. |
| 8,434,776 B2 | 5/2013 | Wuthrich |
| 8,439,383 B2 | 5/2013 | Talavasek |
| 8,459,680 B2 | 6/2013 | Chamberlain |
| 8,585,070 B2 | 11/2013 | Beale |
| 8,590,914 B2 | 11/2013 | Domahidy |
| 8,622,411 B1 | 1/2014 | Chamberlain |
| 8,641,072 B2 | 2/2014 | Graney et al. |
| 8,646,797 B2 | 2/2014 | Buckley |
| 8,678,962 B2 | 3/2014 | Jordan |
| 8,696,008 B2 | 4/2014 | Hoogendoorn |
| 8,727,057 B2 | 5/2014 | Park et al. |
| 8,733,774 B2 | 5/2014 | Graney et al. |
| 8,770,360 B2 | 7/2014 | Fox |
| 8,833,785 B2 | 9/2014 | Wagner |
| 8,851,498 B2 | 10/2014 | Alsop |
| 8,882,127 B2 | 11/2014 | Colegrove et al. |
| 8,919,799 B2 | 12/2014 | Wimmer |
| 8,931,793 B2 | 1/2015 | Klieber |
| 8,932,162 B2 | 1/2015 | Emura et al. |
| 8,998,235 B2 | 4/2015 | Beale |
| 9,039,026 B2 | 5/2015 | Hudec |
| 9,056,644 B2 | 6/2015 | Hudák |
| 9,056,647 B2 | 6/2015 | Hu |
| 9,061,729 B2 | 6/2015 | Canfield et al. |
| 9,102,378 B2 | 8/2015 | Zawistowski |
| 9,102,379 B2 | 8/2015 | Capogna |
| 9,127,766 B2 | 9/2015 | Kuwayama et al. |
| 9,145,185 B1 | 9/2015 | Claro |
| 9,156,521 B2 | 10/2015 | Lumpkin |
| 9,216,791 B2 | 12/2015 | Hudec |
| 9,221,513 B2 | 12/2015 | Hoogendoorn |
| 9,242,693 B2 | 1/2016 | Voss |
| 9,302,732 B2 | 4/2016 | Beale |
| 9,327,792 B2 | 5/2016 | Johnson et al. |
| 9,334,011 B2 | 5/2016 | Chamberlain |
| 9,376,156 B2 | 6/2016 | Chamberlain |
| 9,376,162 B2 | 6/2016 | Colegrove et al. |
| 9,457,871 B2 | 10/2016 | Kuwayama et al. |
| 9,469,369 B2 | 10/2016 | Thoma |
| 9,505,462 B2 | 11/2016 | Pasqua et al. |
| 9,598,131 B2 | 3/2017 | Zusy et al. |
| 9,637,199 B2 | 5/2017 | Pasqua et al. |
| 9,676,446 B2 | 6/2017 | Pasqua et al. |
| 9,758,217 B2 | 9/2017 | Bortoli et al. |
| 9,821,879 B2 | 11/2017 | Hoogendoorn et al. |
| 9,919,765 B2 | 3/2018 | Wickliffe et al. |
| 2001/0024024 A1 | 9/2001 | Klassen et al. |
| 2003/0038450 A1 | 2/2003 | Lam |
| 2004/0046355 A1 | 3/2004 | Carroll |
| 2004/0061305 A1 | 4/2004 | Christini |
| 2004/0239071 A1 | 12/2004 | Chamberlain et al. |
| 2005/0067809 A2 | 3/2005 | Chamberlain |
| 2005/0067810 A1 | 3/2005 | Weagle |
| 2005/0184483 A1 | 8/2005 | Buckley |
| 2005/0253357 A1 | 11/2005 | Chang et al. |
| 2005/0285367 A1 | 12/2005 | Chang et al. |
| 2006/0061059 A1 | 3/2006 | Lesage et al. |
| 2006/0071442 A1 | 4/2006 | Hoogendoorn |
| 2006/0119070 A1 | 6/2006 | Weagle |
| 2006/0181053 A1 | 8/2006 | Huang et al. |
| 2006/0197306 A1 | 9/2006 | Oconnor |
| 2006/0225942 A1 | 10/2006 | Weagle |
| 2006/0231360 A1 | 10/2006 | Chen |
| 2007/0024022 A1 | 2/2007 | Weagle |
| 2007/0108725 A1 | 5/2007 | Graney |
| 2007/0194550 A1 | 8/2007 | Wadelton |
| 2007/0210555 A1 | 9/2007 | Oconnor |
| 2008/0054595 A1 | 3/2008 | Lu |
| 2008/0067772 A1 | 3/2008 | Weagle |
| 2008/0217882 A1 | 9/2008 | Beaulieu et al. |
| 2008/0238030 A1 | 10/2008 | Tseng |
| 2008/0238031 A1 | 10/2008 | Tseng |
| 2008/0252040 A1 | 10/2008 | Colegrove et al. |
| 2008/0258427 A1 | 10/2008 | Buckley |
| 2008/0303242 A1 | 12/2008 | Oconnor |
| 2009/0001685 A1 | 1/2009 | Talavasek et al. |
| 2009/0026728 A1 | 1/2009 | Domahidy |
| 2009/0072512 A1 | 3/2009 | Earle |
| 2009/0250897 A1 | 10/2009 | Tanouye et al. |
| 2009/0278331 A1 | 11/2009 | Graney |
| 2009/0283986 A1 | 11/2009 | Falke |
| 2010/0059965 A1 | 3/2010 | Earle |
| 2010/0102531 A1 | 4/2010 | Graney et al. |
| 2010/0109282 A1 | 5/2010 | Weagle |
| 2010/0127473 A1 | 5/2010 | Cocalis et al. |
| 2010/0156066 A1 | 6/2010 | Oconnor |
| 2010/0327553 A1 | 12/2010 | Talavasek |
| 2010/0327554 A1 | 12/2010 | Talavasek |
| 2010/0327556 A1 | 12/2010 | Chamberlain |
| 2011/0025015 A1 | 2/2011 | Colegrove et al. |
| 2011/0175310 A1 | 7/2011 | Lewis |
| 2011/0187078 A1 | 8/2011 | Higgon |
| 2011/0233892 A1 | 9/2011 | Domahidy |
| 2011/0233893 A1 | 9/2011 | Buckley |
| 2011/0275256 A1 | 11/2011 | Gibbs et al. |
| 2011/0285106 A1 | 11/2011 | Talavasek |
| 2012/0223504 A1 | 9/2012 | Antonot |
| 2012/0228850 A1 | 9/2012 | Tseng |
| 2012/0280470 A1 | 11/2012 | Colegrove et al. |
| 2012/0299268 A1 | 11/2012 | Chamberlain et al. |
| 2013/0001918 A1 | 1/2013 | Graney et al. |
| 2013/0001919 A1 | 1/2013 | Graney et al. |
| 2013/0093160 A1 | 4/2013 | Alsop |
| 2013/0096781 A1 | 4/2013 | Reichenbach et al. |
| 2013/0214503 A1 | 8/2013 | Chiuppani |
| 2013/0249181 A1 | 9/2013 | Becker et al. |
| 2013/0249188 A1 | 9/2013 | Beale |
| 2013/0285346 A1 | 10/2013 | Wimmer |
| 2014/0001729 A1 | 1/2014 | Hudec |
| 2014/0015220 A1 | 1/2014 | Talavasek |
| 2014/0060950 A1 | 3/2014 | Beutner |
| 2014/0217697 A1 | 8/2014 | Buckley |
| 2014/0318306 A1 | 10/2014 | Tetsuka |
| 2015/0001829 A1 | 1/2015 | Berthold |
| 2015/0054250 A1 | 2/2015 | Hu |
| 2015/0115569 A1 | 4/2015 | Matheson et al. |
| 2015/0175238 A1 | 6/2015 | Lumpkin |
| 2015/0183487 A1 | 7/2015 | Tsai |
| 2015/0191213 A1 | 7/2015 | Beale |
| 2015/0251724 A1 | 9/2015 | Hudec |
| 2015/0360743 A1 | 12/2015 | Oconnor |
| 2016/0083042 A1 | 3/2016 | Voss |
| 2016/0272273 A1 | 9/2016 | Colegrove et al. |
| 2016/0280317 A1 | 9/2016 | Hoogendoorn |
| 2016/0311493 A1 | 10/2016 | Scheer |
| 2018/0229798 A1 | 8/2018 | Hoogendoorn et al. |

(56) References Cited

U.S. PATENT DOCUMENTS

2018/0265165 A1    9/2018  Zawistowski
2018/0297661 A1   10/2018  Beale

FOREIGN PATENT DOCUMENTS

| | | |
|---|---|---|
| DE | 692011 C | 6/1940 |
| DE | 9405076 U1 | 5/1994 |
| DE | 9416803 U1 | 12/1994 |
| DE | 4435482 A1 | 4/1996 |
| EP | 0422324 A1 | 4/1991 |
| EP | 0723907 B1 | 7/1998 |
| EP | 0941917 A2 | 9/1999 |
| EP | 1060979 A2 | 12/2000 |
| EP | 2540609 A1 | 1/2013 |
| FR | 541520 A | 7/1922 |
| FR | 933079 A | 4/1948 |
| FR | 2774966 A1 | 8/1999 |
| GB | 17336 | 10/1913 |
| JP | H0725378 A | 1/1995 |
| WO | 9422710 A1 | 10/1994 |
| WO | 9803390 A1 | 1/1998 |
| WO | 9818671 A1 | 5/1998 |
| WO | 9856645 A1 | 12/1998 |
| WO | 199944880 | 9/1999 |
| WO | 9965760 A1 | 12/1999 |
| WO | 9944880 A9 | 1/2000 |
| WO | 03010042 A1 | 2/2003 |
| WO | 03018392 A1 | 3/2003 |
| WO | 03021129 A1 | 3/2003 |
| WO | 2004045940 A2 | 6/2004 |
| WO | 2005030564 A2 | 4/2005 |
| WO | 2005030565 A1 | 4/2005 |
| WO | 2005090149 A1 | 9/2005 |
| WO | 2006005687 A1 | 1/2006 |
| WO | 2006032052 A2 | 3/2006 |
| WO | 2006061052 A1 | 6/2006 |
| WO | 2008025950 A1 | 3/2008 |
| WO | 2008130336 A1 | 10/2008 |
| WO | 2009121936 A1 | 10/2009 |
| WO | 2010033174 A1 | 3/2010 |
| WO | 2010103057 A1 | 9/2010 |
| WO | 2010121267 A1 | 10/2010 |
| WO | 2012024697 A1 | 2/2012 |
| WO | 2012027900 A1 | 3/2012 |
| WO | 2012063098 A1 | 5/2012 |
| WO | 2012122634 A1 | 9/2012 |
| WO | 2013028138 A2 | 2/2013 |
| WO | 2013078436 A1 | 5/2013 |
| WO | 2013119616 A1 | 8/2013 |
| WO | 2013142855 A2 | 9/2013 |
| WO | 2013192622 A1 | 12/2013 |
| WO | 2014009019 A1 | 1/2014 |
| WO | 2014029759 A1 | 2/2014 |
| WO | 2014202890 A1 | 12/2014 |
| WO | 2015196242 A1 | 12/2015 |
| WO | 2016036237 A1 | 3/2016 |
| WO | 2016097433 A1 | 6/2016 |
| WO | 2016134471 A1 | 9/2016 |

OTHER PUBLICATIONS

International Bureau, "PCT International Search Report and Written Opinion dated Dec. 14, 2011", PCT/US2011/048696, Dec. 14, 2011, 10 pages.
Author Unknown, "Sarrus Linkage", Wikipedia, http://en.wikipedia.org/wiki/Sarrus_linkage, 1 page, at least as early as Aug. 20, 2010.
European Patent Office, "European Extended Search Report dated May 28, 2015", European Patent Application No. 12851566.5, 7 pages.
European Patent Office, "Extended European Search Report dated Sep. 15, 2015", EP Patent Application No. 11818903.4, 8 pages.
Prosecution Document, "EP Supplementary Search Report dated Dec. 11, 2008", EP Application No. 05798319.9, 1 page.
Prosecution Document, "PCT International Search Report and Written Opinion dated Nov. 29, 2006", PCT Application No. PCT/US2005/33410, 5 pages.
Zawistowski, Peter "Quantifying Wheel Path", Think Turquoise, http://www.yeticycles.com/blog/?p=237, as early as Jul. 27, 2011, 4 pages.
International Search Report and Written Opinion dated Aug. 2, 2018 in connection with International Patent Application No. PCT/US2018/023124, 14 pages.
International Search Report and Written Opinion dated Sep. 28, 2018 in connection with International Patent Application No. PCT/US2018/041054, 13 pages.
International Search Report and Written Opinion dated Feb. 12, 2016 in connection with International Patent Application No. PCT/US2015/065090, 11 pages.
Chen, "Design of Structural Mechanisms", A dissertation submitted for the degree of Doctor of Philosophy in the Department of Engineering Science at the University of Oxford, St Hugh's College, 2003, 160 Pages.
Li, "Movable Spatial 6R Linkages", XP055249075, Retrieved from the Internet on Oct. 13, 2016: URL:http://people.ricam.oeaw.ac.at/z.li/publications/talks/6.pdf, Oct. 2, 2013, 48 Pages.
Sarrut, "Note Sur La Transformation Des Mouvements Rectilignes Alternatifs", Académie des Sciences, 36, 1036-1038, 1853, 5 Pages.

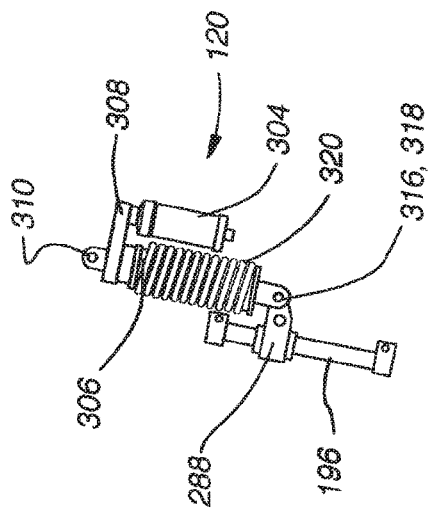
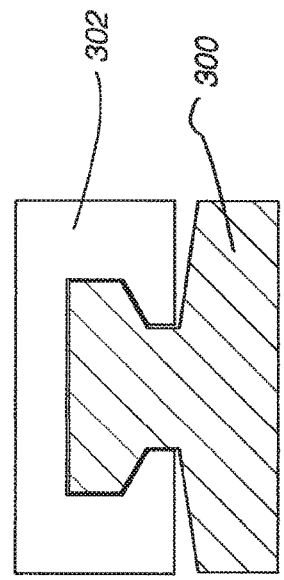
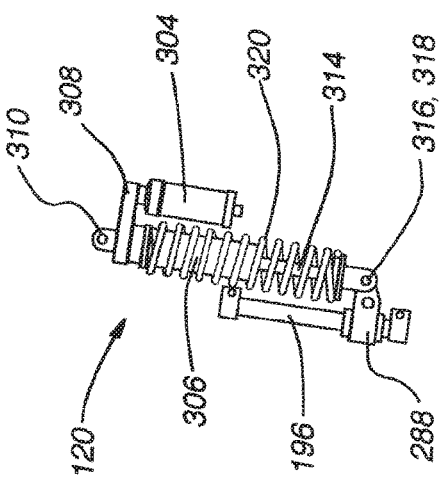
Fig. 13B
Fig. 12
Fig. 13A

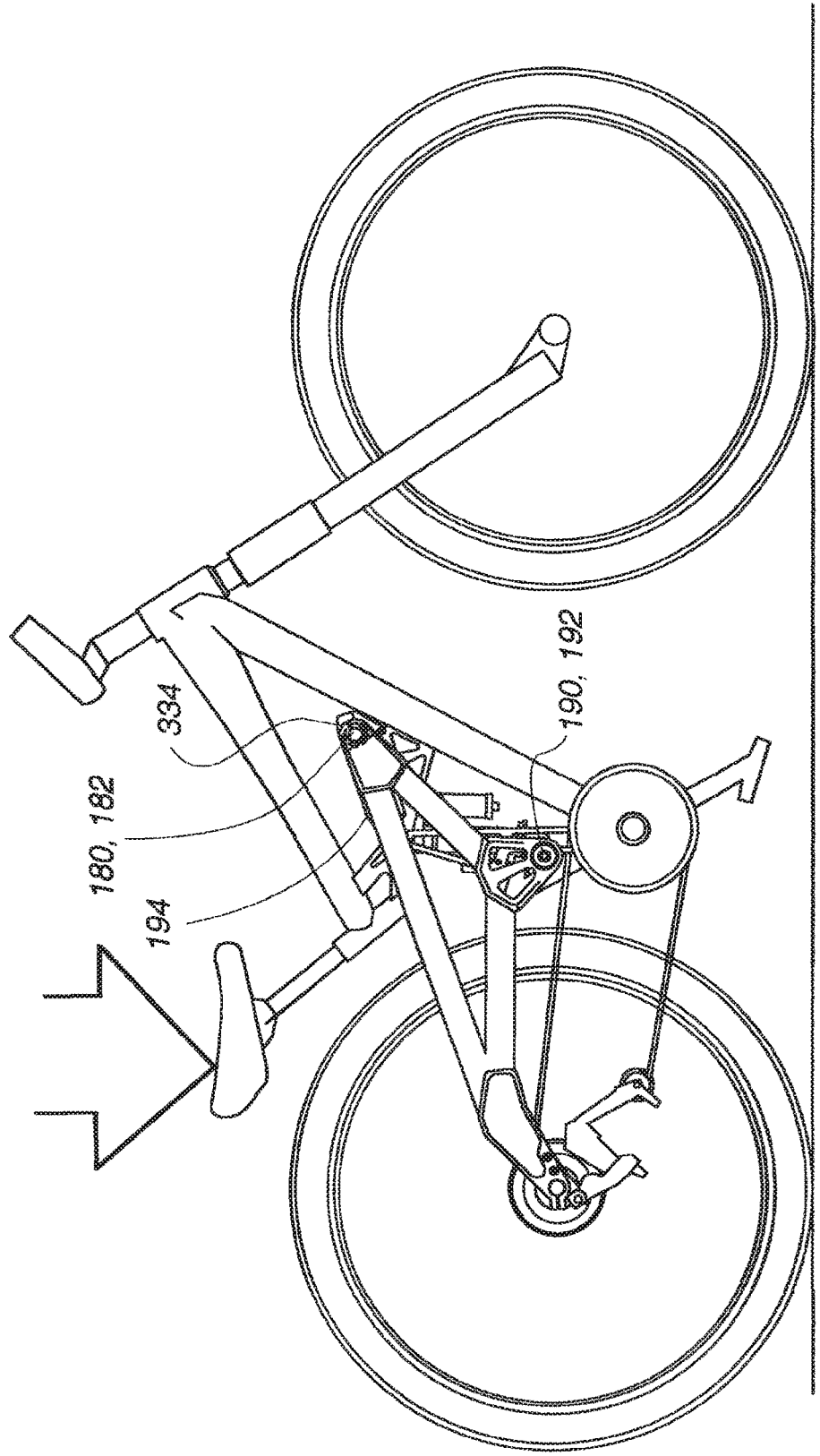

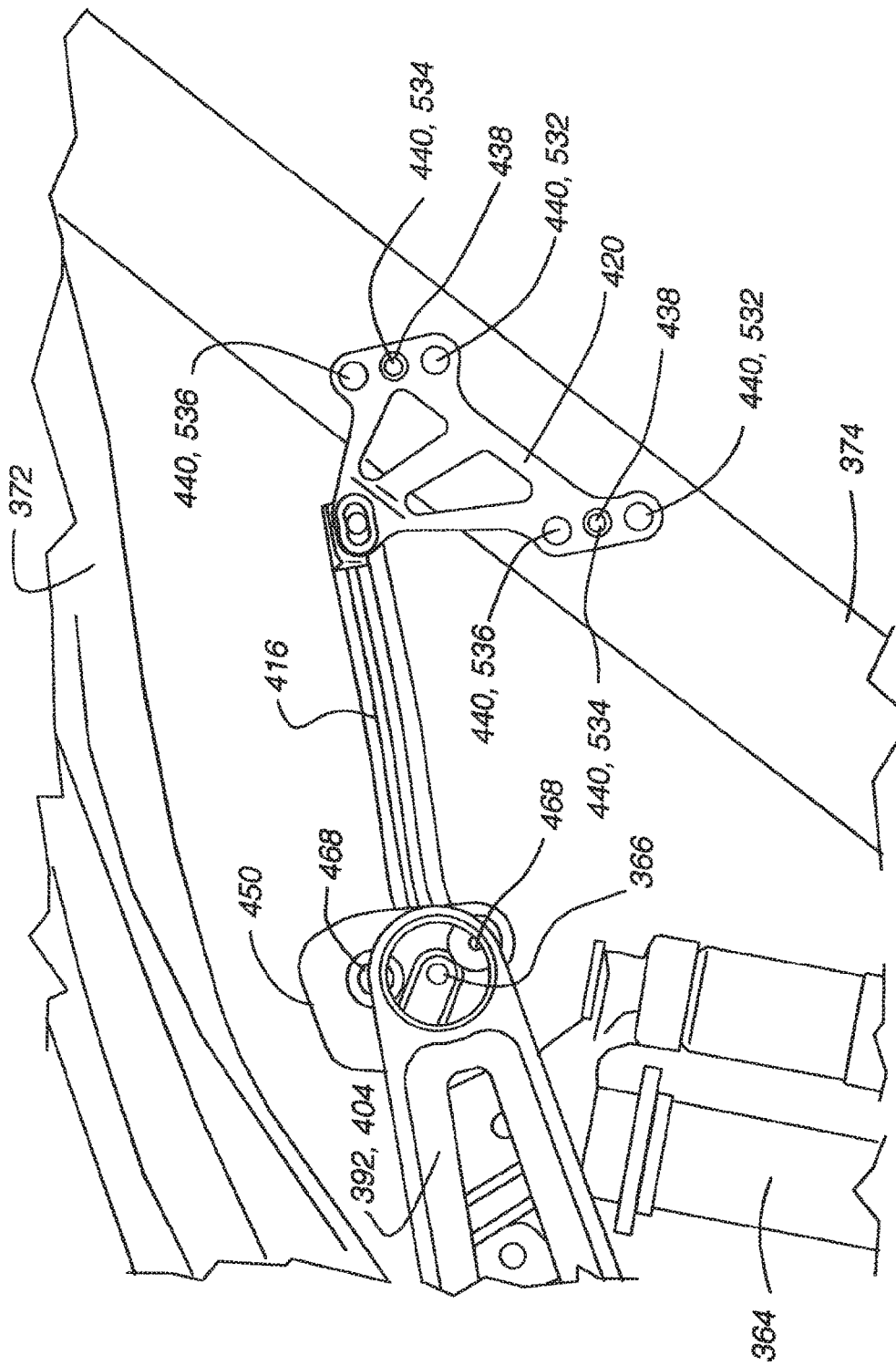

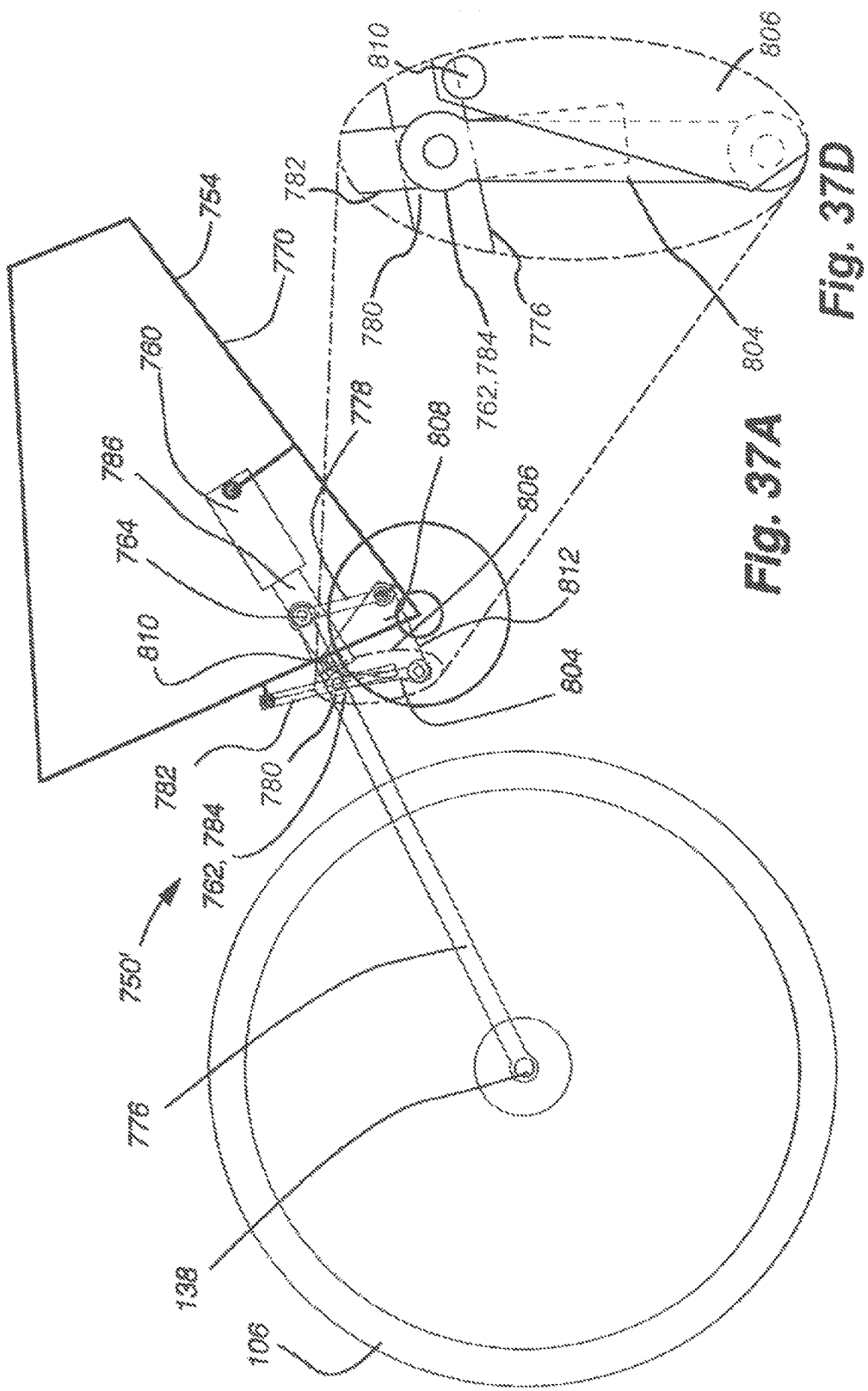

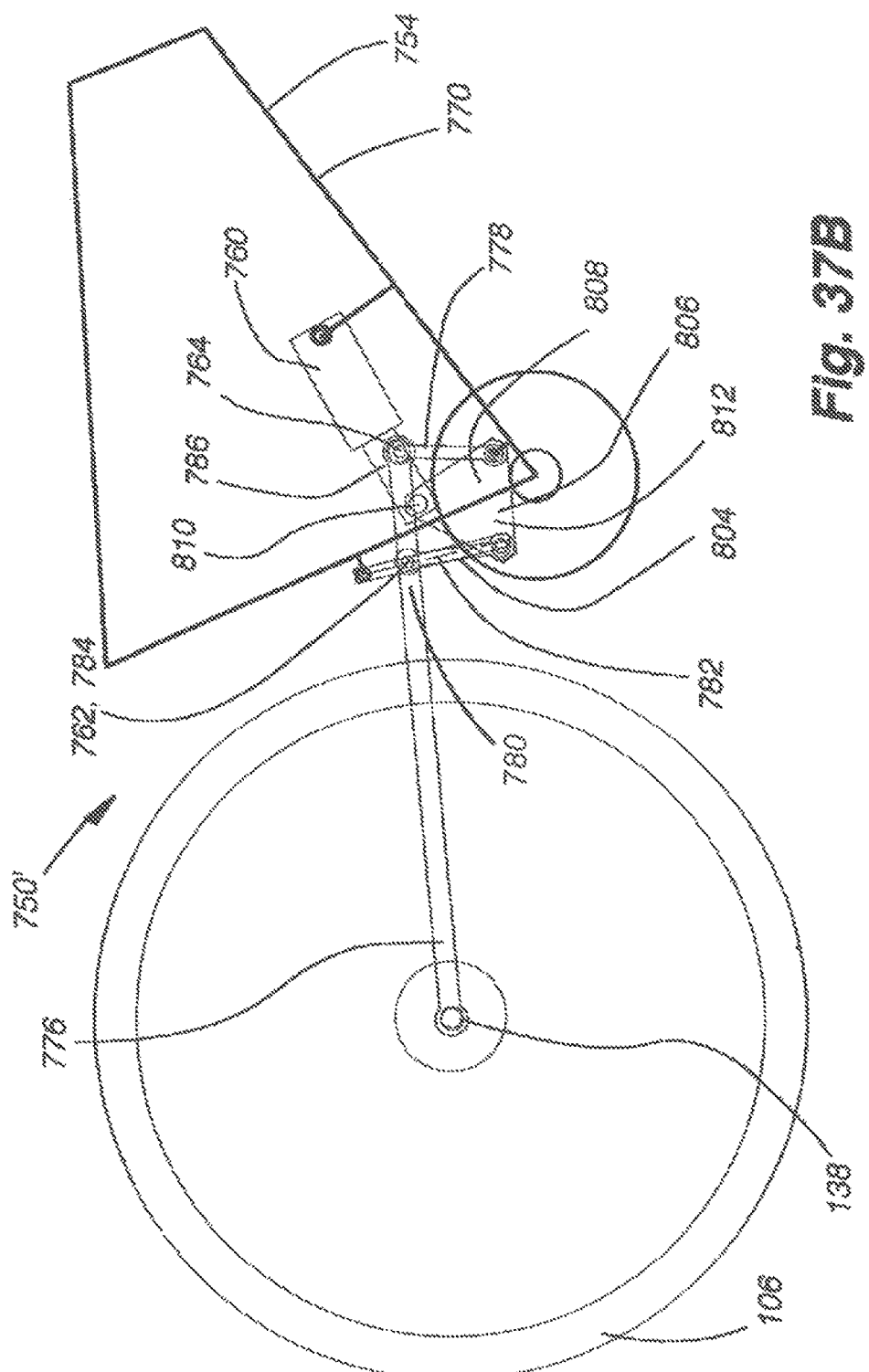

REAR SUSPENSION SYSTEM FOR A BICYCLE

CROSS-REFERENCE TO RELATED APPLICATIONS

This application is a continuation of U.S. patent application Ser. No. 14/191,530, filed on Feb. 27, 2014 and entitled "Rear Suspension System for a Bicycle", which is a continuation of U.S. patent application Ser. No. 13/626,276, filed on Sep. 25, 2012 and entitled "Rear Suspension System for a Bicycle", now U.S. Pat. No. 8,696,008, which is a continuation of U.S. patent application Ser. No. 12/786,307, filed on May 24, 2010 and entitled "Rear Suspension System for a Bicycle," now U.S. Pat. No. 8,272,658, which is a divisional of U.S. patent application Ser. No. 11/229,270, filed on Sep. 15, 2005 and entitled "Rear Suspension System For a Bicycle", now U.S. Pat. No. 7,722,072, which claims the benefit under 35 U.S.C. § 119(e) to U.S. Provisional Patent Application No. 60/610,273, filed on Sep. 15, 2004 and entitled "Rear Suspension System For a Bicycle", all of which are hereby incorporated in their entireties by reference as though fully disclosed herein.

BACKGROUND OF THE INVENTION a. Field of the Invention

This invention is generally related to bicycles, and more particularly, to suspension systems for rear wheels of bicycles.

b. Background Art

Rear suspension systems are commonly used on bicycles, and are especially common on mountain bikes. Mountain biking is a sport where a rider can encounter rough terrain (such as holes in the ground, rocks, and the like). Sometimes the rider also jumps the bike over natural or man-made obstacles while riding. The rear suspension system helps to reduce the impact felt by the rider resulting from forces exerted on a rear wheel when traveling over rough terrain or when jumping the bicycle. When impact forces act on the rear wheel, the rear suspension system allows the rear wheel to be displaced relative to the bicycle frame, which, in turn, acts to absorb the impact.

Many rear suspension systems available on the market allow the rear wheel of the bicycle to travel in a particular path that is dictated by the physical construction of the suspension system. Essentially, the rear wheel path is permanently fixed by the rear suspension design. Different rear wheel paths cause different reactions in the way the bicycle handles. Therefore, one rear wheel path that is suitable to a particular rider or condition may be unsuitable for another rider or condition.

BRIEF SUMMARY OF THE INVENTION

Aspects of the present invention relate to a rear suspension system for a bicycle. The rear suspension system acts to absorb forces impacting on the bicycle by allowing a rear wheel of the bicycle to be displaced relative to the rest of the bicycle. The structural and geometrical configurations of the rear suspension system provide a travel path in which the rear wheel moves. Embodiments of the rear suspensions system can include at least two pivotal connections used to couple various bicycle components together. The pivotal connections can also be configured to translate along respective paths, and as such, can be configured in various ways to provide different rear wheel paths. Various components of the embodiments of the rear suspension system can also be adjusted to affect the travel path of the rear wheel of the bicycle as well as the leverage ratio to suit the rider's preference. In addition, the pivotal connections can be configured to mitigate forces exerted on the rear suspension system from a bicycle's drive train and/or braking system.

In one aspect of the present invention, a bicycle may include a frame and a rear suspension system including a swingable member configured for operative association with the frame and including a rear frame including a bottom member and a top member extending upwardly from the bottom member, such that the top member of the rear frame does not move relative to the bottom member of the rear frame when the swingable member moves. The rear suspension system may also include a link system configured for operative association with the swingable member, the link system including a first link pivotally connected with the swingable member so as to allow the swingable member to swing and a second link slideable along a guide member so as to provide a translational pivoting of the swingable member relative to the frame.

In another example, the swingable member may include a triangular rear frame. In a further example, the guide member may be a rail. Additionally, in other examples, the second link may be slideable along a rail mounted on the frame. In a further example, the frame further may include a top tube, a head tube connected with the top tube, a down tube connected with the head tube, and a seat tube connected with the top tube. Further, the rail may be mounted to the frame between the top tube and the down tube.

In another embodiment, the bicycle may further include a rear sprocket operatively associated with the swingable member. In a further embodiment, the guide member may be arcuate. In another example, the one guide member may be linear. In further embodiments, the second link may be configured to move along a contour of the guide rail.

The features, utilities, and advantages of various embodiments of the invention will be apparent from the following more particular description of embodiments of the invention as illustrated in the accompanying drawings and defined in the appended claims.

BRIEF DESCRIPTION OF THE DRAWINGS

FIG. 12 is a cross-sectional view of an alternative guide rail and slider link configuration.

FIG. 13A is a right side view of a shock assembly and a right guide rail.

FIG. 13B is a right side view of the shock assembly depicted in FIG. 13A in a partially compressed stage.

FIG. 16A is a right side view of the bicycle in FIG. 1 showing the rear suspension system in a fully compressed stage.

FIG. 24 is a detailed view of the first pivot translating assembly shown in FIG. 19.

FIG. 37A is a schematic representation of the rear suspension system according to a fourth embodiment of the invention in a relatively first non-compressed stage.

FIG. 37B depicts the rear suspension system of FIG. 37A in a second partially compressed stage.

FIG. 37D is an enlarged view of the connections between the connecting link, slider link, rocker link, and guide rail of the rear suspension system of FIG. 37A.

DETAILED DESCRIPTION OF THE INVENTION

Figure 1:
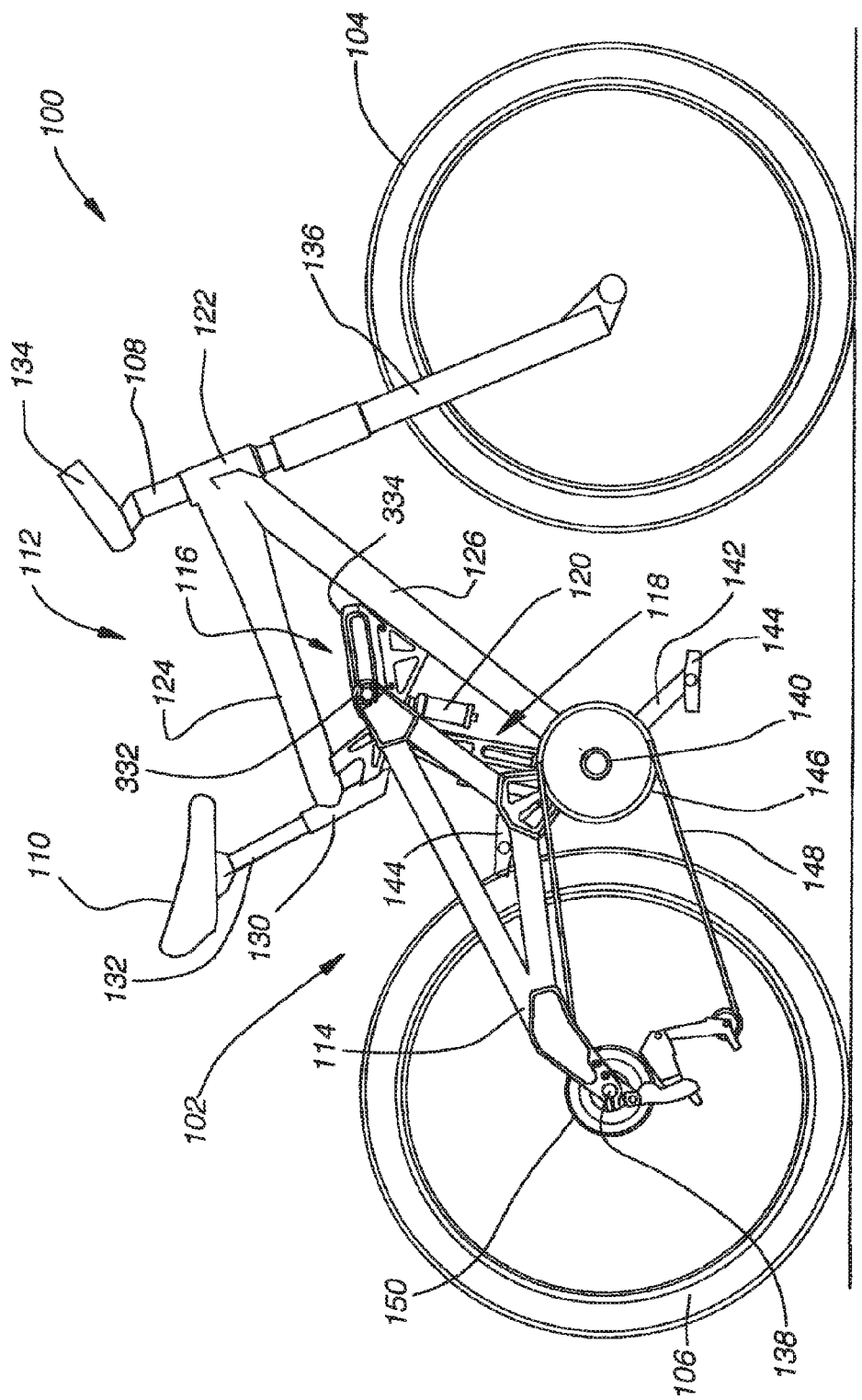
FIG. 1 is a right side view of a bicycle incorporating a rear suspension system according to one embodiment of the present invention.

The present invention provides a rear suspension system for a bicycle. The rear suspension system acts to absorb forces impacting on the bicycle by allowing a rear wheel of the bicycle to be displaced relative to the rest of the bicycle. Such forces can be caused from riding over rough terrain (such as rocks, holes in the ground, and the like). Upon displacement of the rear wheel, the rear suspension system can allow the rear wheel to move from a general first position to a second position. The rear suspension system may then act to return the rear wheel to the general first position. The structural and geometrical configurations of the rear suspension system provide a travel path in which the rear wheel moves when acted upon by various forces. As discussed below, embodiments of the rear suspensions system can include at least two pivotal connections used to couple various bicycle components together. The pivotal connections can also be capable of translating along respective paths, and as such, can be configured in various ways to provide different wheel paths.

As is known in the art, the leverage ratio of a rear suspension system also can also affect the "feel" of the rear suspension system as sensed by the rider when the rear wheel is displaced. As discussed in more detail below, the leverage ratio can be defined as the total rear wheel travel divided by the total shock stroke. Different rear wheel paths and leverage ratios can provide the bicycle with a different feel and cause the bicycle to respond differently when encountering rough terrain. Depending on a particular rider's preference, one wheel path and/or leverage ratio may not be to the liking of another rider. Many currently available rear suspensions systems offer only one rear wheel path and/or leverage ratio curve that is permanently fixed by the structural and geometrical design of the rear suspension system. Embodiments of the rear suspension system of the present invention can be adjusted by the user to affect the travel path of the rear wheel of the bicycle as well as the leverage ratio to suit the rider's preference. More particularly, embodiments of the present invention provide adjustable travel paths for pivotal connections used to couple the rear suspension system to the bicycle frame. Although the rear suspension system is described below with reference to a typical bicycle depicted in the figures, it should be understood the rear suspension system can be used with bicycles having different frame styles than that which is depicted and described herein. Further, although the systems and methods are described below mainly with reference to bicycles, the present invention can be applied to other vehicles, such as scooters and motorcycles.

As previously mentioned, embodiments of the rear suspension system include at least two pivotal connections capable of translating along respective paths. The pivotal connections can be configured to couple a rear frame to a front frame. As such, the pivotal connections can be configured to provide various rear wheel paths and leverage ratios. In addition, the pivotal connections can be configured to mitigate forces exerted rear suspension system from a bicycle's drive train and/or braking system. For example, embodiments of the rear suspension system can include a first pivotal connection that translates in a substantially horizontal direction and a second pivotal connection that translates in a substantially vertical direction. In such an example, the rear wheel path and leverage ratio are largely dictated by the first pivotal connection, while the second pivotal connection acts mainly to mitigate drive train and/or braking forces.

FIG. 1 shows a bicycle 100 including a rear suspension system 102 according to a first embodiment of the present invention. The bicycle 100 is rollingly supported by a front wheel 104 and a rear wheel 106. A rider can steer the bicycle 100 by turning the front wheel 104 toward a desired direction of travel with a steering system 108. The bicycle 100 also includes a seat 110 connected with a front frame 112 which can be used to support the rider. As discussed in more detail below, the rear suspension system includes a rear frame 114 coupled with the front frame 112 through a first pivot translating assembly 116 and a second pivot translating assembly 118. The rear suspension system 102 can also include a shock assembly 120, which can be configured to couple the front frame 112 with the rear frame 114. However, it is to be appreciated that the shock assembly 120 need not directly couple the front frame 112 with the rear frame 114. For example, in other embodiments of the present invention, the shock assembly 120 can be connected with the front frame 112 and the first pivot translating assembly 116 or the second pivot translating assembly 118. Although portions of the rear suspension assembly are described and depicted as a rear frame fabricated from various members connected together, it is to be appreciated that the rear frame can be fabricated as a single piece or member.

As shown in FIGS. 1-5, the front frame 112 can include a head tube 122, a top tube 124, a down tube 126, a bottom bracket 128, and a seat tube 130. The top tube 124 extends rearwardly from the head tube 122 to connect with an upper portion of the seat tube 130, and the down tube 126 extends rearwardly and downwardly from the head tube 122 to connect with the bottom bracket 128. The front frame 112 described herein utilizes an "interrupted seat tube" design wherein the seat tube 130 does not extend from the top tube 124 all the way to the bottom bracket 128. It is to be appreciated that in other frame configurations, the seat tube can extend from the top tube and connect with the bottom bracket. Referring to FIG. 1, the seat or saddle 110, which is used to support the rider, is connected with a seat post 132. In some configurations, the seat post can be releasably received within the seat tube 130, so the height of the seat relative to the frames can be adjusted.

As illustrated in FIG. 1, the steering system 108 includes a handle bar 134 connected with an upper portion of a front fork member 136. Both the handle bar 134 and the front fork member 136 are rotatably connected with the head tube 122. The front wheel 104 is rotatably connected with a lower portion of the front fork member 136, as is known in the art.

Turning the handle bar 134 in a particular direction causes the front wheel 104 to turn in the same direction. As such, a user can steer the bicycle 100 by turning the handle bar 134 in a desired direction of travel. As described in more detail below, the rear wheel 106 is rotatably connected with the rear suspension frame 114 through a rear axle 138.

As shown in FIGS. 1-5, the bottom bracket 128 is connected with a lower end portion of the down tube 126. The bottom bracket 128 rotatably supports a crank shaft 140 having crank arms 142 extending radially therefrom in opposite directions. Foot pedals 144 are rotatably connected with the crank arms. A drive sprocket 146, which is connected with the crank shaft 140, is typically connected through a chain 148 with a rear sprocket assembly 150 coupled with the rear wheel 106. When the rider applies forces to the pedals 144, the forces are translated through the drive sprocket 146 and chain 148 to the rear sprocket assembly 150, causing the rear wheel 106 to rotate. Rotation of the rear wheel translates into forward motion of the bicycle 100.

Figure 6:
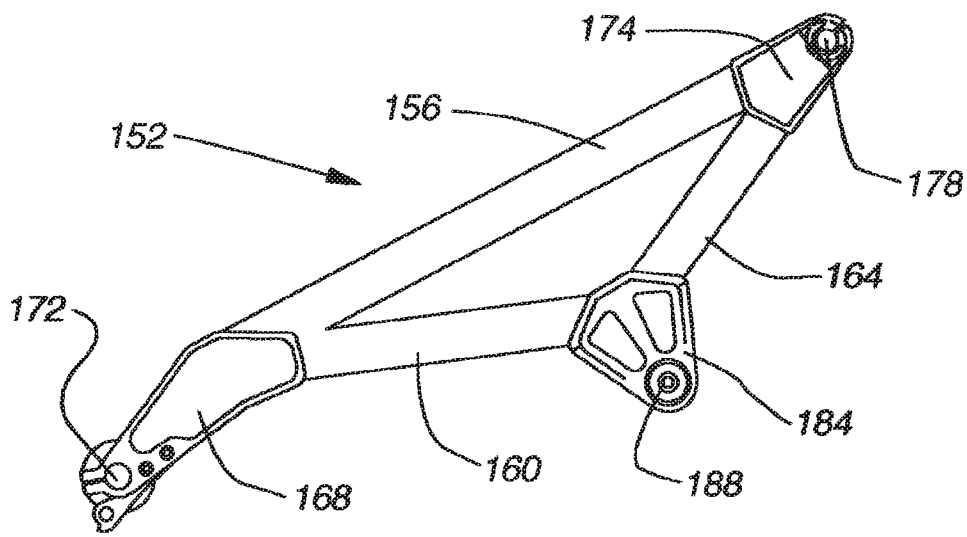
FIG. 6 is a right side view of a right rear triangle of the bicycle depicted in FIG. 1.

As shown in FIGS. 1-6, the rear frame 114 includes right and left rear triangles 152, 154. Generally, right and left top members 156, 158, bottom members 160, 162, and forward members 164, 166 are connected together to form respective right and left rear triangles 152, 154. Because the right and left rear triangles are substantially mirror images of each other, descriptions with reference to FIG. 6, which shows only the right rear triangle 152, are applicable to the left rear triangle 154. As shown in FIG. 6, a rear end portion of the top member 156 is connected with a rear end portion of the bottom member 160. In addition, the rear end portions of the top and bottom members 156, 160 are connected with a triangularly-shaped rear joint member 168. Right and left rear joint members 168, 170 include rear axle apertures 172 adapted to receive and rotatably support the rear axle 138 of the rear wheel 106. A forward end portion of the top member 156 is connected with an upper end portion of the forward member 164 through a triangularly-shaped first pivot joint member 174. The right and left first pivot joint members 174, 176 include first pivot apertures 178 adapted to receive a first pivot axle 180 defining a first pivot 182, as discussed in more detail below. A forward end portion of the bottom member 160 is connected with bottom portion of the forward member 164 through a triangularly-shaped second pivot joint member 184. The right and left second pivot joint members 184, 186 include second pivot apertures 188 adapted to receive a second pivot axle 190 defining a second pivot 192, as discussed in more detail below. It is to be appreciated that the rear frame can be constructed from various types of material, such as aluminum, carbon, and titanium. The members used to construct the rear frame may also define a hollow tubular structure, or may have a solid construction.

As previously mentioned, the rear frame 114 is coupled with the front frame 112 through first and second pivot translating assemblies 116, 118. In one embodiment discussed in more detail below with reference to FIGS. 1-5, the first pivot translating assembly 116 includes a forward track assembly 194 adapted to guide the first pivot 182 along a range of motion, and the second pivot translating assembly 118 includes right and left guide rails 196, 198 adapted to guide the second pivot 192 along a range of motion. As such, the front frame 112 may include various structural elements used to support portions of the first and second pivot translating assemblies 116, 118. For example, as shown in FIGS. 2-5, right and left track brackets 200, 202 and rail brackets 204, 206 connected with the front frame 112 are used to support the forward track assembly 194 and the guide rails 196, 198 of the first and second pivot translating assemblies 116, 118, respectively.

Figure 7:
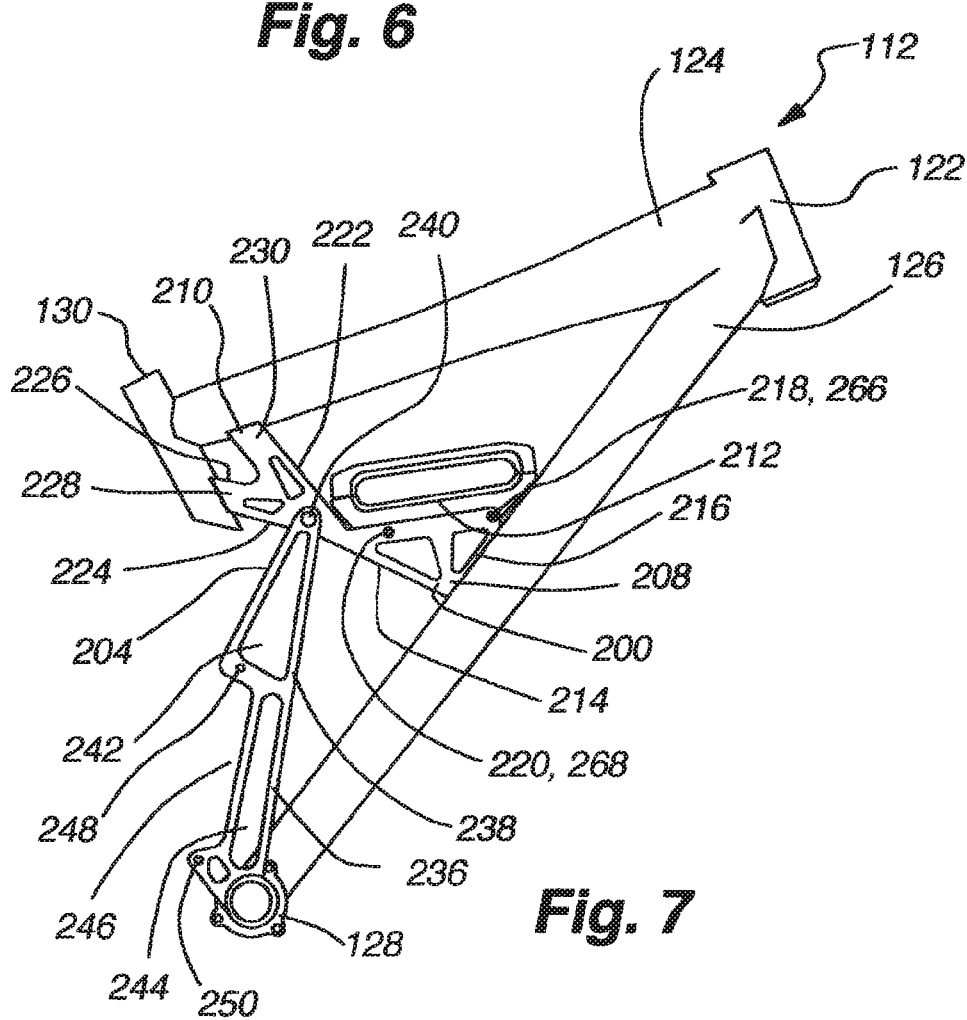
FIG. 7 is a right side view of the front frame of the bicycle depicted in FIG. 1.

As shown in FIGS. 2-5 and 7, the right and left track brackets 200, 202 are connected with and extend from the top tube 124 and seat tube 130 to connect with the down tube 126. Because the right and left track brackets 200, 202 are substantially mirror images of each other, descriptions with reference to FIG. 7, which shows only the right track bracket 200, are applicable to the left track bracket 202. The right and left track brackets are formed from plates and are laterally spaced apart from each other when connected with the frame so as to define a gap between the brackets. Referring to FIG. 7, each track bracket 200, 202 is defined by a generally triangularly-shaped forward portion 208 and a generally Y-shaped rear portion 210. The forward portion 208 of each track bracket includes generally flat upper and lower edges 212, 214, and a forward edge 216 connected with the down tube 126. In addition, forward and rear track connection apertures 218, 220 are located near the upper edge 212 of the forward portions 208 of each track bracket. The rear portion 210 of each track bracket 200, 202 includes upper and lower edges 222, 224 and a rear edge 226 having a recess 228 that defines an upper extension 230 and a lower extension 232. The upper extension 230 is connected with the top tube 124, and the lower extension 228 is connected with the seat tube 130. To reduce the weight of the track brackets without sacrificing strength, the forward and rearward portions may be defined by a webbed structure. For example, as shown in FIG. 7, webbed structures are defined by triangularly-shaped portions 234 of material removed from the forward and rearward portions 208, 210 of the track brackets 200, 202. It is to be appreciated that the track brackets may be connected with the frame in various ways, such as by welding or bolting. As discussed more detail below with reference to FIG. 10, the forward track assembly 194 is connected with and supported by the right and left track brackets.

Referring again to FIGS. 2-5 and 7, the right and left rail brackets 204, 206 are connected with and extend from the bottom bracket 128 to connect with respective right and left track brackets 200, 202. Because the right and left rail brackets 204, 206 are substantially mirror images of each other, descriptions with reference to FIG. 7, which shows only the right rail bracket 204, are applicable to the left rail bracket 206. As shown in FIG. 7, the rail brackets 204, 206 include a lower portion 236 connected with the bottom bracket 128 and an upper portion 238 connected with the track brackets 200, 202. As illustrated, the lower portions 236 of the rail brackets 204, 206 are welded to the bottom bracket 128 and the upper portions 238 of the rail brackets are bolted to the rear portions 210 of respective track brackets 200, 202 at a bracket connection point 240. As discussed in more detail below with reference to FIGS. 11, 13A, and 13B, the shock assembly 120 is also connected between the right and left track brackets 200, 202 at the bracket connection point 240 where the rail brackets 204, 206 are bolted to the track brackets. It is to be appreciated that the rail brackets need not be connected with the frame and the track brackets in the manner illustrated. For example, the rail brackets can be welded to the track brackets and/or bolted to the bottom bracket. Similar to the right and left track brackets 200, 202, the rail brackets 204, 206 are formed from plates and are laterally spaced apart from each other when connected with the front frame 112 so as to define a gap between the brackets. The upper portion 238 of each rail bracket 204, 206 is generally shaped like a triangle with a hollow center portion 242, and the lower portion 236 of each rail bracket is generally shaped like a rectangle with a hollow center portion 244. The upper and lower portions of the rail brackets also define a recessed area 246 extending along a rear edge of the lower portion 236 which includes a top rail connection aperture 248 and a bottom rail connection aperture 250. As discussed more detail below with reference to FIG. 11, the right and left guide rails 196, 198 are connected with and supported by the right and left rail brackets 204, 206.

As previously mentioned, the first pivot translating assembly 116 and the second pivot translating assembly 118 couple the rear frame 114 with the front frame 112. More particularly, the first pivot translating assembly couples the right and left first pivot joints 174, 176 of the rear triangles 152, 154 with the forward track assembly 194, and the second pivot translating assembly 118 couples the right and left second pivot joints 184, 186 of the rear triangles with the right and left guide rails 196, 198.

Figure 2:
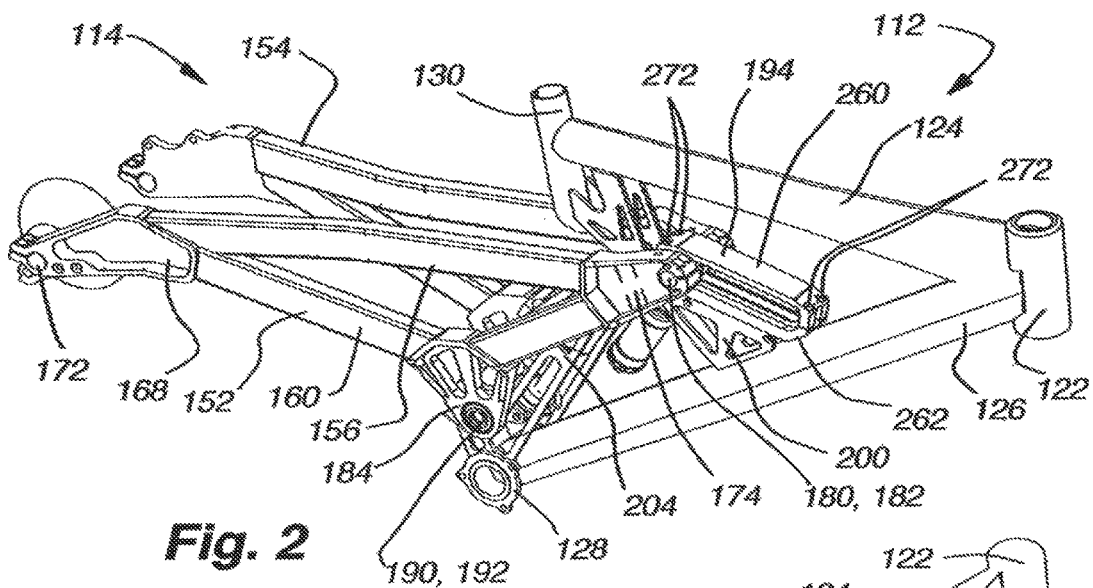
FIG. 2 is a right-front isometric view of a front frame and rear suspension system of the bicycle depicted in FIG. 1.
Figure 3:
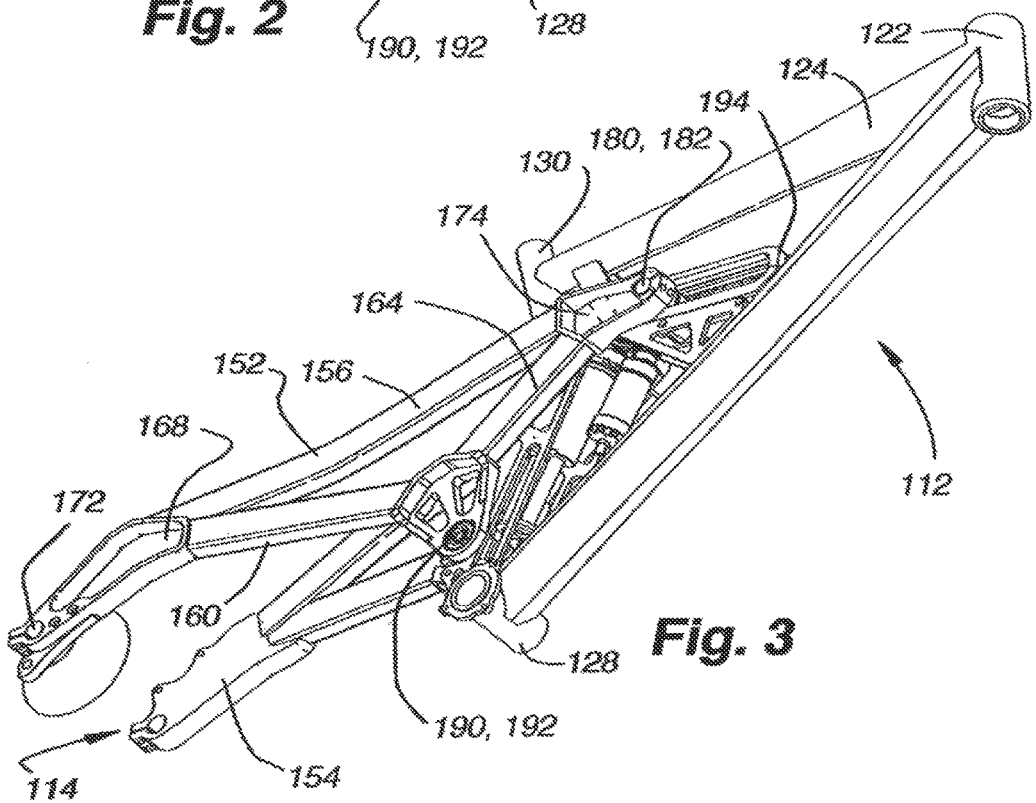
FIG. 3 is a right-bottom isometric view of the front frame and rear suspension system of the bicycle depicted in FIG. 1.
Figure 4:
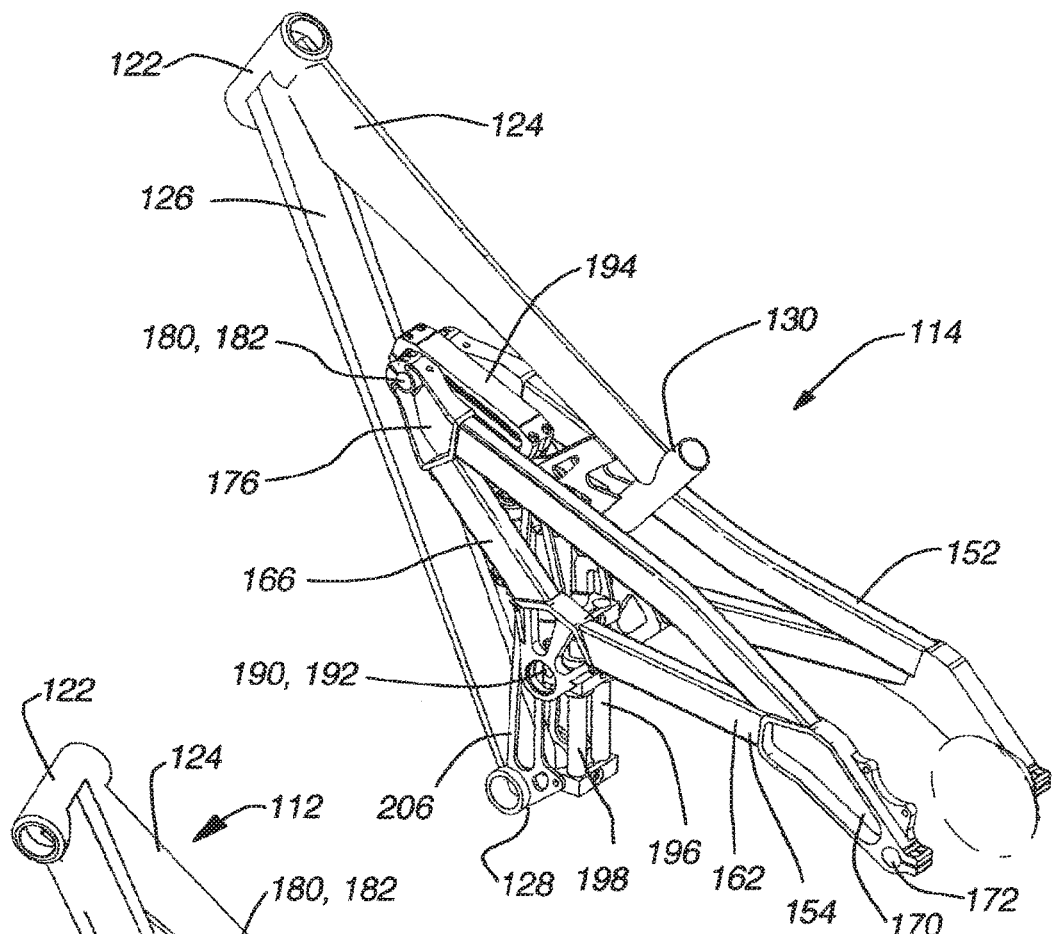
FIG. 4 is a left-rear isometric view of the front frame and rear suspension system of the bicycle depicted in FIG. 1.
Figure 5:
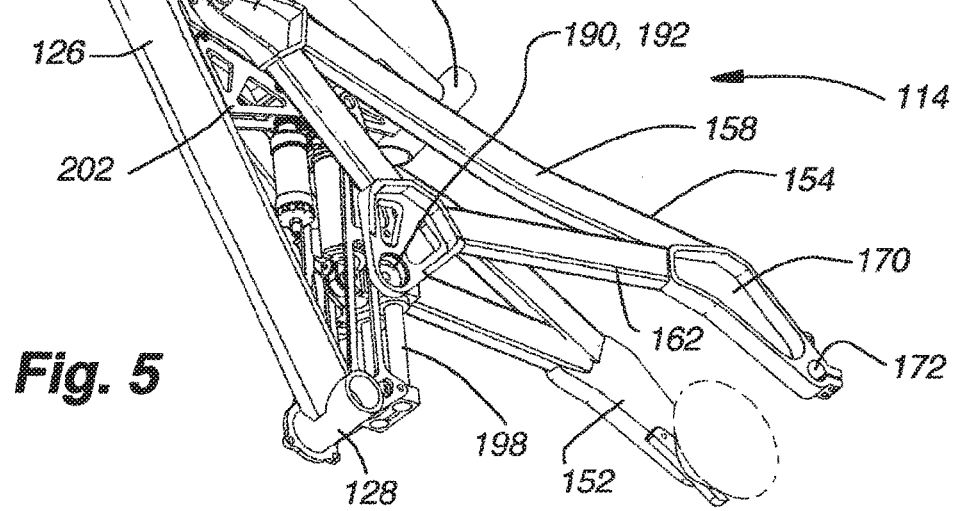
FIG. 5 is a left-bottom isometric view of the front frame and rear suspension system of the bicycle depicted in FIG. 1.
Figure 8:
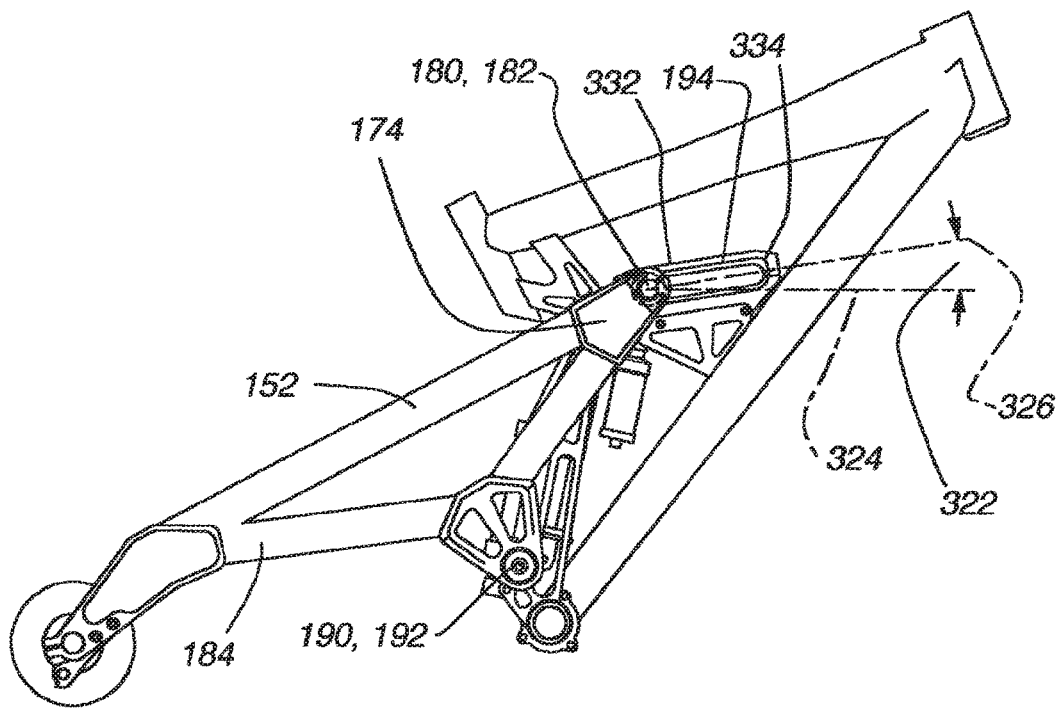
FIG. 8 is a right side view of the front frame and rear suspension system of the bicycle depicted in FIG. 1.
Figure 9:
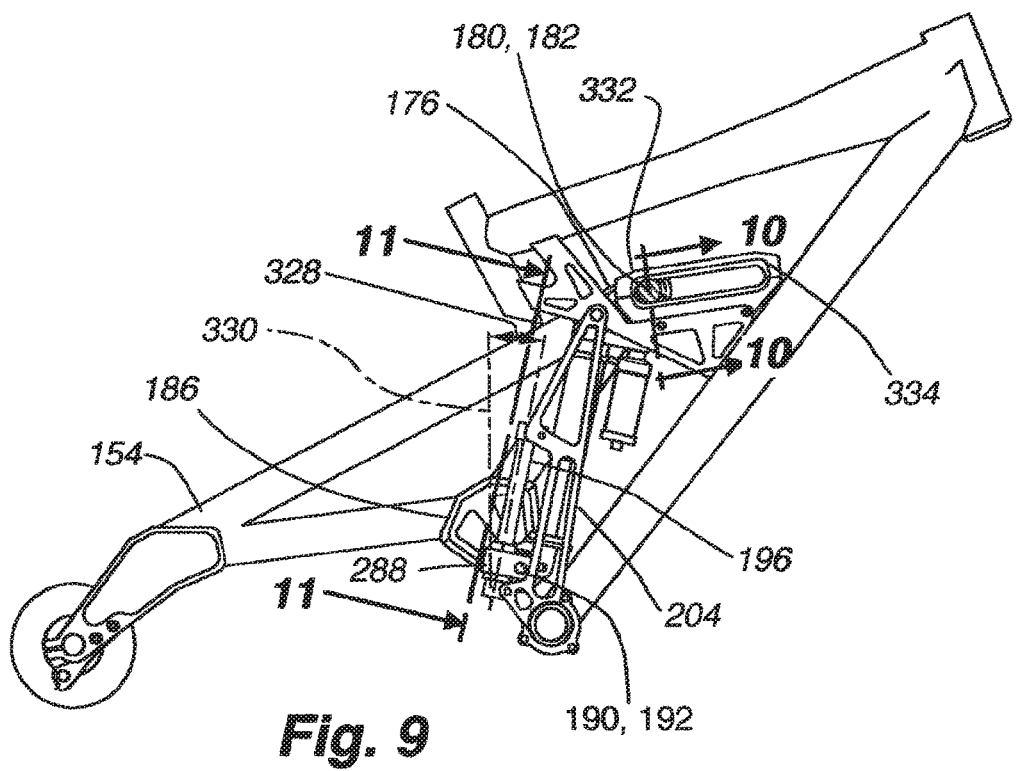
FIG. 9 is a right side view of the front frame and rear suspension system of the bicycle depicted in FIG. 1 with a right rear triangle removed.
Figure 10:
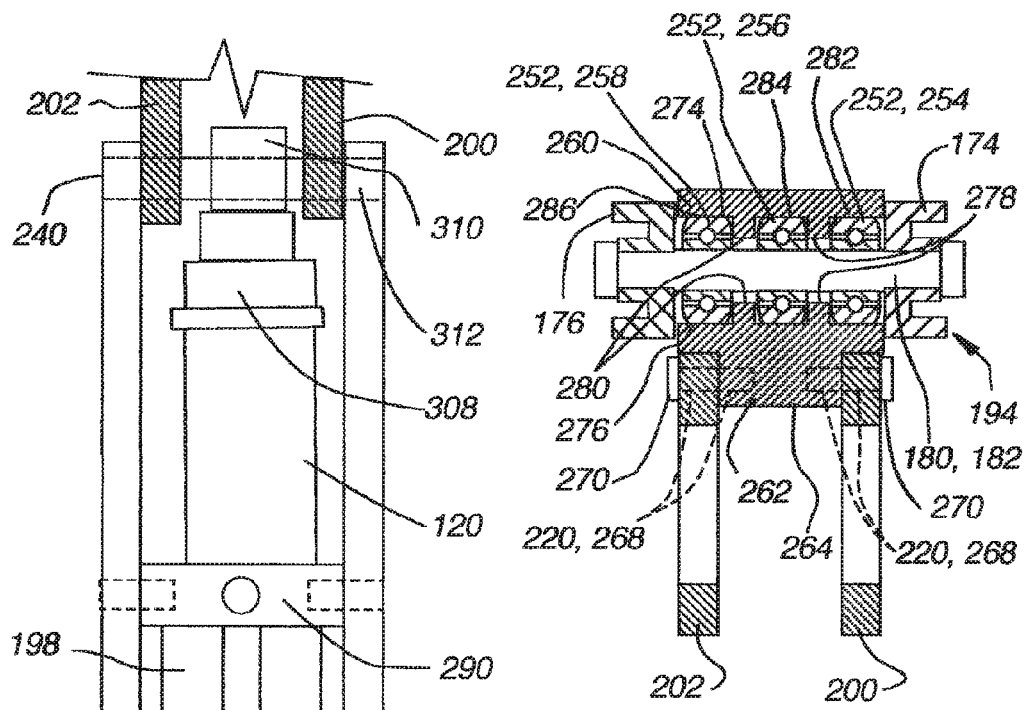
FIG. 10 is a cross-sectional view of a first pivot translating assembly depicted in FIG. 9, taken along line 10-10.

The structural and cooperative relationship between the rear frame 114 and the front frame 112 through the first pivot translating assembly 116 is illustrated in FIGS. 2 and 8-10. As shown in FIGS. 8-10, the right and left first pivot joints 174, 176 of the rear triangles 152, 154 are coupled with the forward track assembly 194 through roller bearings 252 rotatably connected with the first pivot axle 180. The roller bearings 252, which include a right bearing 254, a middle bearing 256, and a left bearing 258, are adapted to roll back and forth along the forward track assembly 194. As shown in FIGS. 2 and 10, the forward track assembly 194 includes a top track member 260 bolted to a bottom track member 262. A lip 264 extending along a bottom side of the bottom track member 262, which includes forward and rear track connection apertures 266, 268, is used to connect the bottom track member 262 with the right and left track brackets 200, 202. More particularly, the bottom track member 262 is connected with the front frame 112 by inserting the lip 264 between the right and left track brackets 200, 202 to place the forward and rearward track connection apertures 266, 268 on the bottom track member in alignment with the track connection venture 218, 220 on the track brackets. Bolts 270 can then inserted into the track connection apertures to connect the bottom track member with the track brackets. As shown in FIG. 2, four bolts 272 inserted at opposing end portions of the forward track assembly 194 are used to connect the top track member 260 with the bottom track member 262. Referring back to FIG. 10, a bottom side of the top track member 260 defines an upper track surface 274 and a top side of the bottom track member 262 defines a lower track surface 276. When the top track member is connected with the bottom track member, the upper track surface 274 and the lower track surface 276 are separated by a distance that is slightly larger than the diameter of the roller bearings 252. It is to be appreciated that the forward track assembly and associated bearings can be constructed from various types of material, such as stainless steel and titanium.

As illustrated in FIGS. 8-10, the first pivot axle 180 extends from the first pivot aperture 178 of the right first pivot joint 174, between the upper and lower track surfaces 274, 276 of the forward track assembly 194, and connects with the first pivot aperture 178 of the left first pivot joint 176. As such, the three roller bearings 252 connected with the first pivot axle 180 are positioned between the upper and lower track surfaces of the forward track assembly. The three roller bearings 252 are generally cylindrically-shaped and define substantially flat rolling surfaces adapted to engage the track surfaces of the forward track assembly. As shown in FIG. 10, the upper and lower track surfaces 274, 276 have corresponding right and left raised ledges 278, 280 that define a right track 282, a middle track 284, and left track 286. The widths of the right 282, middle 284, and left tracks 286 are slightly larger than the corresponding widths of the right 254, middle 256, and left roller bearings 258. As previously mentioned, the distance between the upper and lower track surfaces of the forward track assembly is slightly larger than the corresponding diameters of the roller bearings.

As described in more detail below, the roller bearings 252 roll back and forth along respective tracks as the rear suspension system 102 moves in response to displacement of the rear wheel 106. Although the roller bearings are free to roll back-and-forth along respective tracks, forces exerted on the rear suspension system can act on the first pivot axle in upward and downward directions. In response upward and downward forces exerted on the first pivot axle, the roller bearings 252 can engage the upper and lower track surfaces 274, 276. Further, should the first pivot axle 182 be subjected to forces in a lateral direction, either right or left with respect to the forward track assembly 194, the roller bearings 252 will engage respective right and left ledges 278, 280 located in the upper and lower track surfaces 274, 276, which will act to prohibit the rolling bearings from disengaging the forward track assembly.

It is to be appreciated that different embodiments of the present invention can utilize different roller bearing and forward track assembly configurations to provide desired strength and motion characteristics. For example, in one embodiment of the present invention, the left and right roller bearings 254, 258 are configured to normally roll along the lower track surface 276 of the forward track assembly 194, while the middle bearing 256 is configured to normally roll along the upper track surface 274 of the forward track assembly. In another embodiment, only the middle bearing 284 is configured to engage the right and left ledges 278, 280 of the track surfaces in response to laterally directed forces acting on the first pivot axle 180. It is also to be appreciated that other embodiments may utilize more or less than three roller bearings. It is to be further appreciated that the first pivot translating assembly is not limited to the use of a forward track assembly and associated bearings, and as such, other devices can be used. For example, other embodiments of the first pivot translating assembly 116 can include a guide rail and slider link configuration, while others may include a pin and slot configuration.

Figure 11:
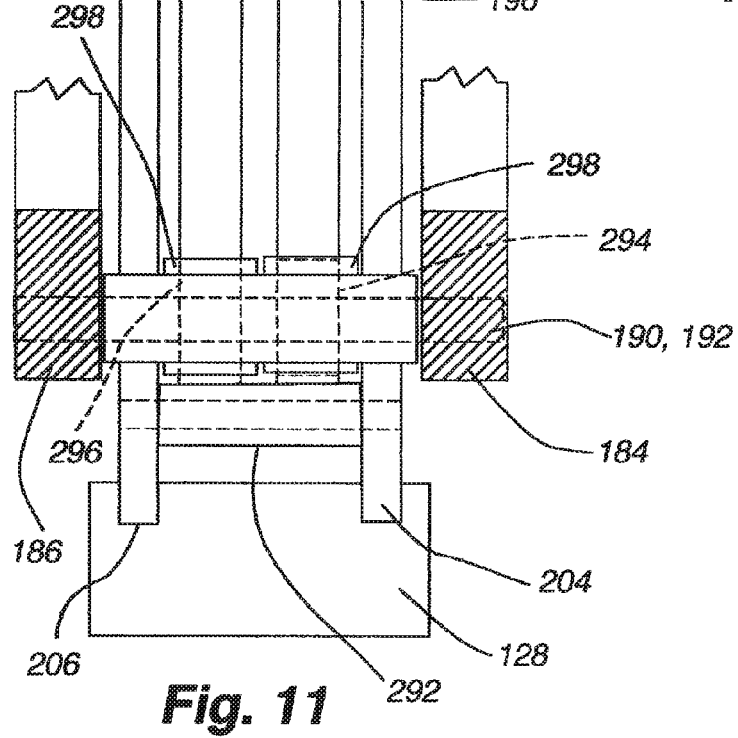
FIG. 11 is a cross-sectional view of a second pivot translating assembly depicted in FIG. 9, taken along line 11-11.

The structural and cooperative relationship between the rear frame 114 and the front frame 112 through the second pivot translating assembly 118 is illustrated in FIGS. 8-9 and 11. As shown in FIGS. 8-9 and 11, the right and left second pivot joints 184, 186 of the rear triangles 152, 154 are coupled with the right and left guide rails 196, 198 through a slider link 288 that is pivotally connected with the second pivot axle 190. As previously mentioned, the second pivot axle 190 also defines the second pivot 192. As described in more detail below, as the rear suspension system 102 moves in response to displacement of the rear wheel 106, the slider link 288 moves back and forth (or up and down) along the right and left guide rails 196, 198. As shown in FIGS. 8-9 and 11, the second pivot axle 190 extends from the second pivot aperture 188 of the right second pivot joint 184, through the slider link 288, and to the second pivot aperture 188 of the left second pivot joint 186. As such, the slider link can pivot about the second pivot relative to the right and left second pivot joints.

As shown in FIGS. 9 and 11, the right and left guide rails 196, 198 are supported by and connected with the right and left rail brackets 204, 206. More particularly, top and bottom rail stops 290, 292 are connected with the top and bottom end portions of the right and left guide rails. In addition, the rail stops 290, 292 are connected with the rail brackets 204, 206 with bolts inserted through the top rail connection apertures 248 and bottom rail connection apertures 250 into the corresponding top and bottom rail stops. Although the rear suspension system can be configured such that the slider link is free to move back-and-forth along the guide rails without making contact with the rail stops, the top and bottom rail stops can act to limit the range of movement of the slider link and prohibit the slider link from disengaging the guide rails.

As shown in FIG. 11, the right and left guide rails 196, 198 are cylindrically-shaped and have a circular cross section. The slider link 288 is coupled with the right and left guide rails by inserting the respective guide rails through corresponding right and left slider apertures 294, 296 located in the slider link 288. As such, the slider apertures 294, 296 move back and forth along outer surfaces of the guide rails 196, 198 as the slide link moves along the lengths of the guide rails. To reduce friction between the slider link and the guide rails, the slider apertures 294, 296 may be lined with bearings 298 adapted to rollingly engage the outer surface of the guide rails 196, 198. It is to be appreciated that various types of bearings can be used. One example of a bearing assembly suitable for use with the present invention is the Super Smart Ball Bushing Bearing™ made by Thomson Industries, Inc. Instead of using bearings, other embodiments of the present invention include bushings that line the inside the of the slider apertures. Two exemplary types of bushings suitable for use with the present invention are the models TJUM03 and RJUM01 made by Igus, Inc. It is to be appreciated that other various other means may also be utilized to reduce friction between the slider link and the guide rails, such as a lubricant. It is also to be appreciated that the guide rails and slider link can be constructed from various types of material, such as stainless steel, aluminum, and titanium.

It is to be appreciated that different embodiments of the present invention can utilize different guide rail and slider link configurations. For example, other embodiments may utilize more or less than two guide rails. In addition, the guide rails are not limited to having a circular cross section. For example, one embodiment utilizes a guide rail 300 and slider link 302 with the cross sectional shape shown in FIG. 12. It is also to be appreciated that second pivot translating assembly 118 is not limited to the use of guide rails 196, 198 and the associated slider link 288, and as such, other devices can be used. For example, other embodiments of the second pivot translating assembly 118 can include a track and bearing arrangement similar to that described above with reference to the first pivot translating assembly 116, while others may include a pin and slot configuration.

As mentioned above, the rear suspension system 102 can also include a shock assembly. FIGS. 13A and 13B show one example of a shock assembly 120, which includes a fluid reservoir 304 and a cylinder body 306, both connected with a body cap 308. An eyelet 310 located on the top portion of the body cap 308 is adapted to receive a bolt 312 used to connect the rail brackets 204, 206 with the track brackets 200, 202 at the bracket connection point 240 (see FIG. 11). As such, the shock assembly 120 is pivotally connected with the rail and track brackets, and therefore, can pivot relative to the front frame 112. The shock assembly 120 also includes a piston shaft 314 connected with a piston head (not shown) located within the cylinder body 306. An eyelet 316 located on the bottom portion of the piston shaft is adapted to receive a bolt 318 connecting the shock assembly 120 with the slider link 288. Therefore, the shock assembly can pivot relative to the slider link. The piston head (not shown) is adapted to move back and forth along the inside length of the cylinder body 306 in response to tension and/or compression forces applied to eyelets 310, 316 on the body cap 308 and piston shaft 314. For example, FIG. 13A shows the shock assembly 120 in a relatively uncompressed state. When compression forces are applied to the eyelets on the body cap and piston shaft, such as when the slider link 288 moves upward along the right and left guide rails 196, 198, the piston shaft 314 is forced upward and inside the cylinder body 306 as shown in FIG. 13B.

As shown in FIGS. 13A and 13B, the shock assembly 120 also includes a compression spring 320. Some embodiments of the shock assembly allow the user to adjust the initial compression setting of the spring. The compression spring 320 of the shock assembly 120 acts to resist displacement of the rear wheel 106 and consequential relative movements between the rear 114 and front frames 112 and acts to return the rear wheel to its pre-displacement position. Fluid contained within fluid reservoir 304 and cylinder body 306 acts to dampen the movement of the piston head within the cylinder body. As such, the shock assembly dampens the tensile and/or compressive forces exerted on the body cap 308 and piston shaft 314. Therefore, the shock assembly acts as a dampener by resisting forces from the initial displacement of the rear wheel 106 as well as forces from the compression spring 320 acting to return the rear wheel to its pre-displacement position. It is to be appreciated that shock assemblies are known in the art and that various types of shock assemblies can be utilized with the present invention, such as oil and air shocks. One example of a shock assembly suitable for use with the present invention is the DHX-5.0 made by FOX Racing Shox.

It is to be appreciated that the shock assembly 120 need not be connected with the bicycle in the manner described and depicted above. For example, the piston shaft 314 of the shock assembly 120 can be connected with the front frame 112, and the body cap 308 can be connected with the slider link 288. In addition, the shock assembly 120 can be configured to elongate (or decompress) as the slider link moves upward along the lengths of the guide rails. Further, although the shock assembly 120 can be configured to couple the front frame 112 with the rear frame 114, the shock assembly need not directly couple the front frame with the rear frame. For example, in other embodiments of the present invention, the shock assembly can be connected with the front frame and the first pivot translating assembly 116 or with the front frame 112 and the second pivot translating assembly 118.

When a rider encounters rough terrain or jumps the bicycle 100, impact forces can act in a generally upward direction on the rear wheel 106. In turn, the impact forces are translated to the rear frame 114 through the rear wheel axle 138. More particularly, the impact forces cause displacement of the rear frame 114 in directions dictated by the geometric parameters and structure of the rear suspension system 102. Geometric parameters that might have an effect on the displacement path of the rear frame and rear wheel can include the location of the first pivot 182; the location of the second pivot 192; the shape and size of the rear triangles 152, 154; the shape and orientation of the front track assembly 194; and the shape and orientation of the guide rails 196, 198.

In the rear suspension system 102 described above, displacement of the rear wheel 106 causes displacement of the rear triangles 152, 154, which, in turn, results in displacement of the first and second pivots 182, 192. The first pivot 182 is defined by the first pivot axle 180, which moves back and forth along the forward track assembly 194 in response to displacement of the rear triangles. As such, movement of the first pivot 182 is dictated in part by the shape and orientation of the forward track assembly 194. The second pivot 192 is defined by the slider axle 288, which moves back and forth along the right and left guide rails 196, 198 in response to displacement of the rear triangles 152, 154. As such, movement of the second pivot 192 is dictated in part by the shape and orientation of the right and left guide rails. In the rear suspension system 102 discussed above with reference to FIGS. 1-5, the forward track assembly 194 includes track surfaces that are flat and the guide rails that are straight. As such, the first and second pivots 182, 192 travel back and forth along straight travel paths. As shown in FIGS. 1 and 8-9, the forward track assembly 194 is tilted upward so as to define a track angle 322 between a horizontal reference line 324 and a center line 326 of the track 194. In addition, the guide rails 196, 198 are tilted forward so as to define a rail angle 328 between a vertical reference line 330 and the guide rails. Depending on the particular rear suspension system configuration, the track and rail angle can vary. For example, in one embodiment, the track angle 322 is 10 degrees above the horizontal reference line 324 and the rail angle 328 is 10 degrees forward of the vertical reference line 330. As discussed in more detail below, the track and rail angles can also be adjustable.

As previously mentioned, embodiments of the rear suspension system according to the present invention can provide for an adjustable wheel path. In one embodiment, the first pivot 182 travel path, and, in turn, the rear wheel path can be adjusted by changing the shape and/or orientation of the forward track 194. As previously described, the top track member 260 of the forward track assembly 194 is bolted to the bottom track member 262. In turn, the bottom track member 262 is bolted to the left and right track brackets 200, 202. As such, the forward track can be removed by unbolting the top track member from the bottom track member, and unbolting the bottom track member from the track brackets. Once the bottom track member is unbolted from the track brackets, the first pivot axle 180 and associated roller bearings 252 can be lifted upward to allow removal of the bottom track member. An alternate forward track assembly can then be placed in position under the first pivot axle and roller bearings and bolted to the track brackets. A top track member of the alternate forward track assembly can then be bolted to the bottom track.

Figure 14A:
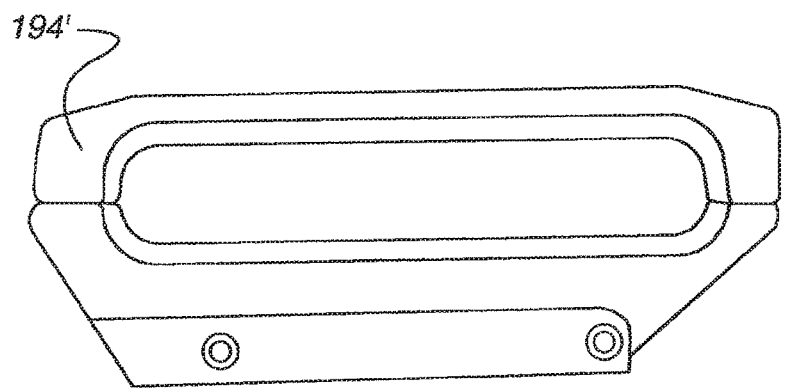
FIG. 14A is a right side view of a first forward track assembly.
Figure 14B:
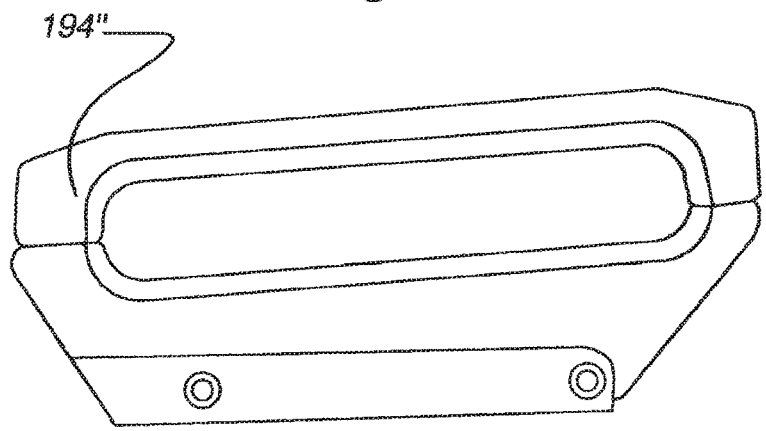
FIG. 14B is a right side view of a second forward track assembly.
Figure 14C:
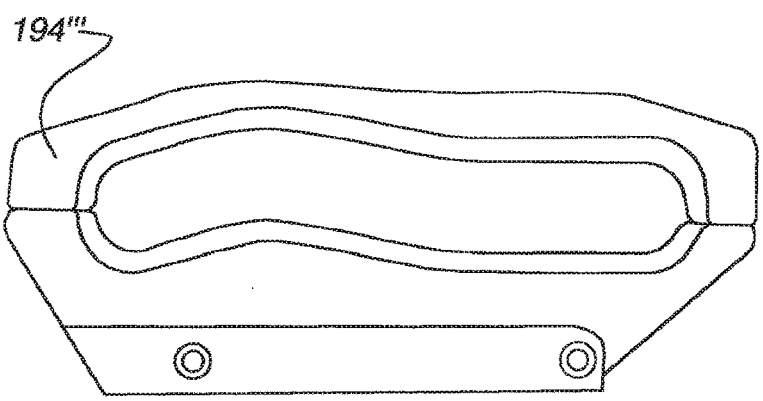
FIG. 14C is a right side view of a third forward track assembly.

FIGS. 14A-14C show three different configurations of the forward track assembly that when installed on the bicycle, will provide different travel paths of the track axle, which, in turn, affects the travel path of the rear wheel. A first forward track assembly 194' shown in FIG. 14A when installed on the bicycle will cause the first pivot axle 180 (first pivot 182) to travel back and forth along a straight path at a first track angle 322'. A second forward track assembly 194" shown in FIG. 14B defines a track surface with a steeper upward slope than the first forward track assembly 194' shown in FIG. 14A. As such, the second track assembly 194" shown in FIG. 14B when installed on the bicycle will cause the first pivot axle (first pivot) to travel back and forth along a straight path at a second track angle 322" that is greater than the first track angle 322'. A third forward track assembly 194''' shown in FIG. 14C defines a track surface with a varying slope along its length. As such, the third track assembly 194''' shown in FIG. 14C when installed on the bicycle will cause the first pivot axle (first pivot) to travel back and forth along a path with varying track angles 322'''. For example, as the first pivot axle 180 (first pivot 182) begins movement from a rear end 332 of the third track assembly 194''', the initial track angle is relatively large. Then, as the track axle (first pivot) continues to move toward a front end 334 of the third track assembly, the track angle decreases. Further, as the track axle (first pivot) nears the front end 334 of the third track assembly, the track angle increases again. It is to be appreciated other configurations of forward track assemblies can be utilized with the present invention and should not be construed to be limited to what is depicted herein. It is also to be appreciated that the forward track assembly shapes and/or orientations can be modified without the need for removal and replacement. For example, a screw or worm gear-type arrangement connected between the frame and the forward track assembly can be used to maneuver the forward track assembly into various orientations with respect to the frame.

In addition to affecting the rear wheel path by changing the shape and/or orientation of the forward track assembly, the travel path of the second pivot 192, and, in turn, the rear wheel path can also be adjusted by changing the shape and/or orientation of the guide rails 196, 198. For example, in one embodiment, the rail brackets 204, 206 are configured with additional top rail connection apertures 248 and bottom rail connection apertures 250 to allow a user change the orientation of the guide rails by bolting the top and bottom rail stops 290, 292 to the rail brackets at different locations. In other embodiments, straight guide rails are replaced with arcuately-shaped guide rails to alter the rear wheel path. Other embodiments provide a screw or worm gear-type arrangement connected between the frame and the guide rails to maneuver the guide rails into various orientations with respect to the frame.

Figure 15A:
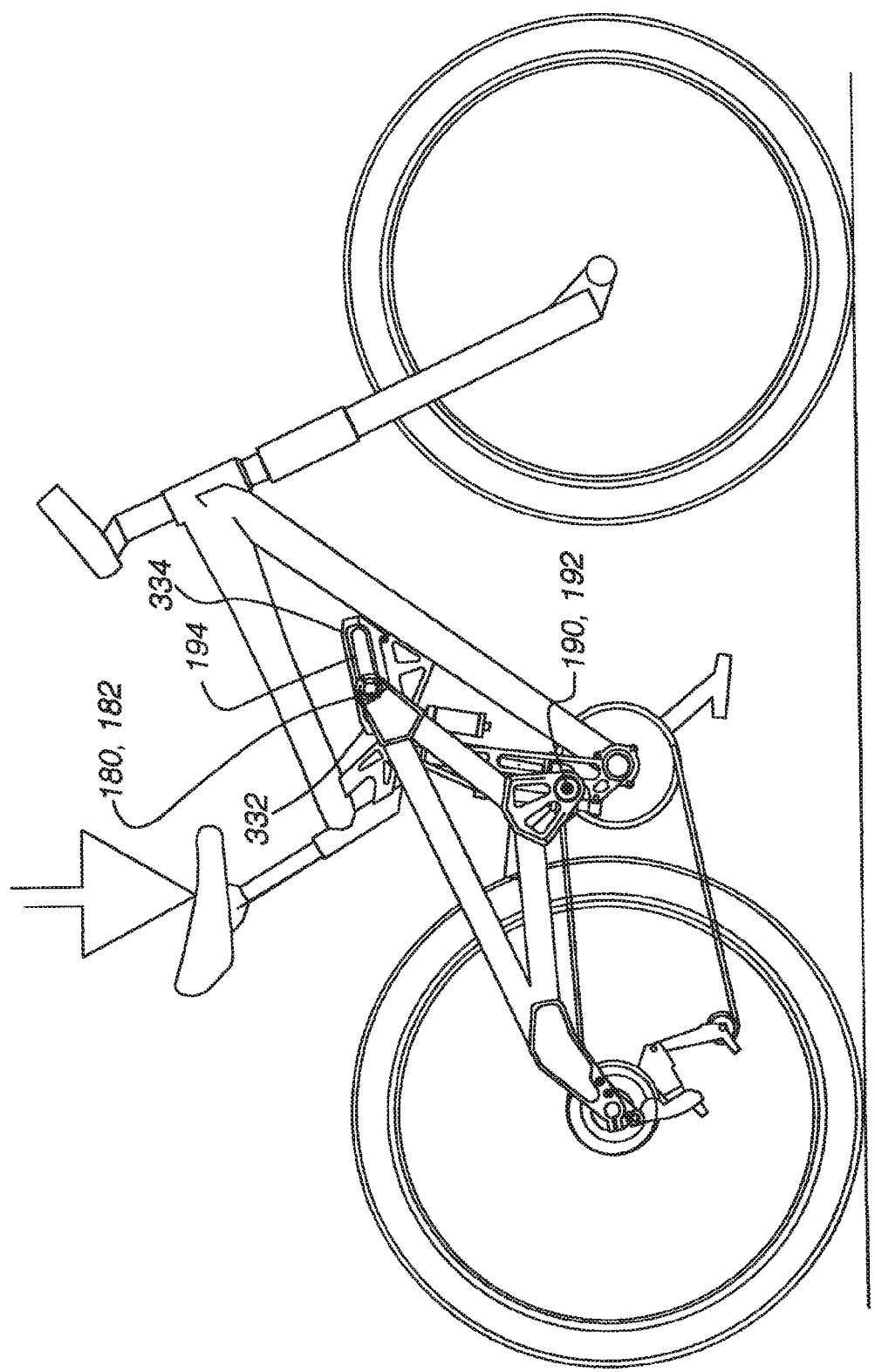
FIG. 15A is a right side view of the bicycle in FIG. 1 showing the rear suspension system in a partially compressed stage.

FIGS. 1, 15A, and 16A show the rear suspension system 102 in varying stages of compression. More particularly, FIGS. 1 and 8-9 show the rear wheel 106 and rear suspension system 102 is a first relatively non-compressed stage. As illustrated, the first pivot axle 180 (first pivot 182) is in a first position near a rear end 332 of the forward track assembly 194. The second pivot axle 190 (second pivot 192) is in a first position near a bottom end 336 of the guide rails 196, 198. In addition, the shock assembly 120 is shown in a first stage of compression. An upward force applied to the rear wheel 106 or a downward force applied to the seat 110, such as when a rider sits on the bicycle 100, can place the rear suspension system 102 in a second partially compressed stage as shown in FIGS. 15A-15C.

Figure 15B:
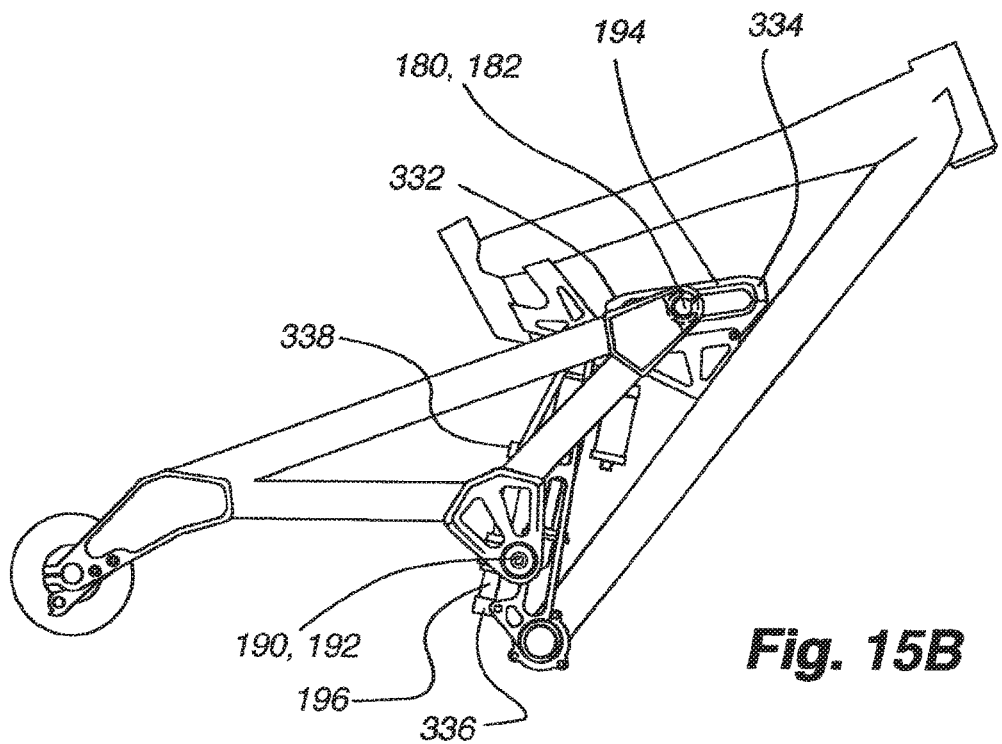
FIG. 15B is a right side view of the frame and rear suspension system of FIG. 15A.
Figure 15C:
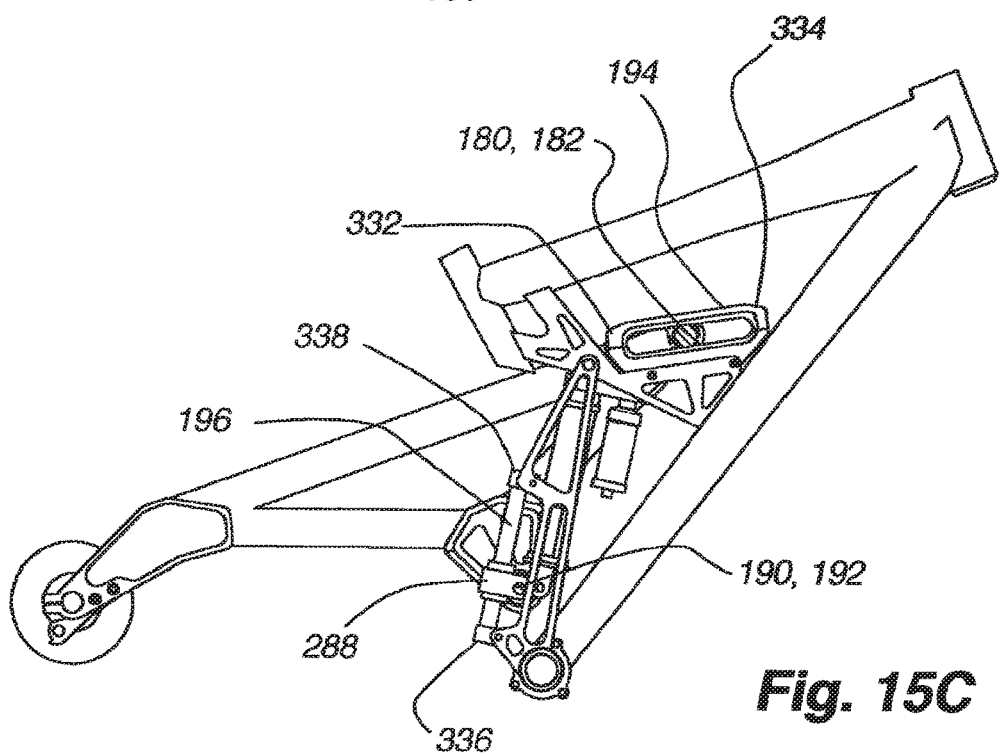
FIG. 15C is a right side view of the frame and rear suspension system shown in FIG. 15B with the right rear triangle removed.

A comparison of FIGS. 1 and 8-9 with FIGS. 15A-15C, shows that the first pivot axle 180 (first pivot 182) has moved forward along the length the forward track assembly 194 to a second position between the rear 332 and forward ends 334 of the forward track assembly 194. At the same time, the slider link 288 and second pivot axle 190 (second pivot 192) has moved upward along the length of the guide rails 196, 198 to a second position between the bottom 336 and top ends 338 of the guide rails. The upward movement of the slider link 288 also forces the piston shaft 314 of the shock assembly 120 upward and into the cylinder body 306 to place the shock assembly in a second stage of compression. In addition, as the rear suspension system 102 moves from the first non-compressed stage to the second partially non-compressed stage, the rear triangles 152, 154 of the rear frame 114 pivot around the first 182 and second pivots 192 in a clockwise direction (as view from the right side of the bicycle). A relatively large upward force applied to the rear wheel 106 or a large downward force applied to the seat 110, such as when the rider and the bicycle land on the ground after riding over a jump, can place the rear suspension system in a third fully compressed stage as shown in FIGS. 16A-16C.

Figure 16B:
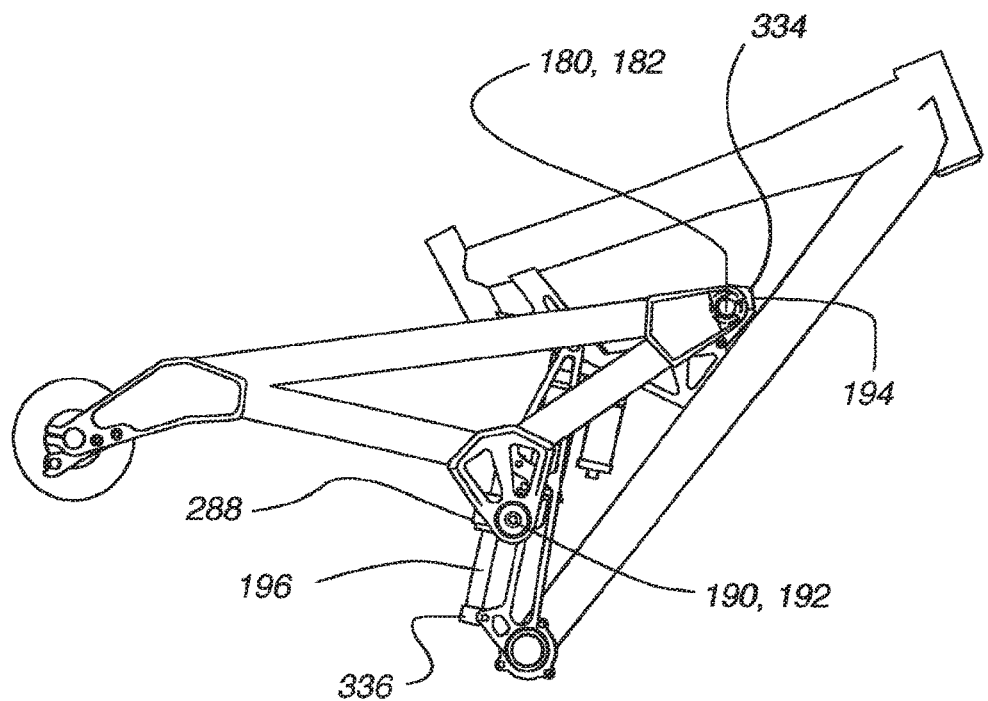
FIG. 16B is a right side view of the frame and rear suspension system of FIG. 16A.
Figure 16C:
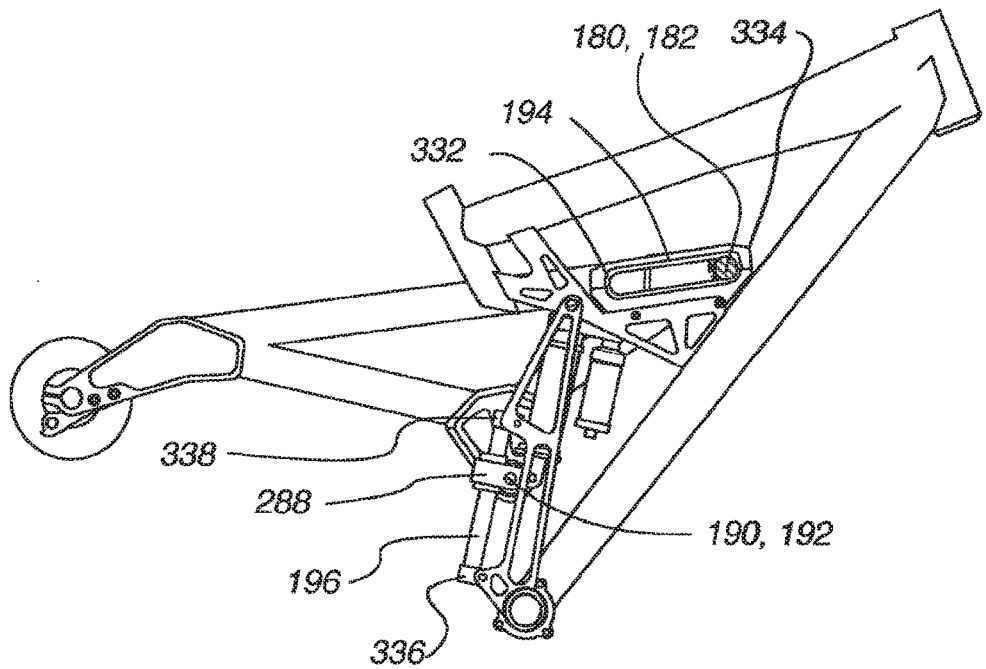
FIG. 16C is a right side view of the frame and rear suspension system shown in FIG. 16B with the right rear triangle removed.

A comparison of FIGS. 15A-15C with FIGS. 16A-16C, shows that the first pivot axle 180 (first pivot 182) has moved further forward along the length of the forward track assembly 194 to a third position near the forward end 334 of the forward track assembly 194. At the same time, the slider link 288 and second pivot axle 190 (second pivot 192) have moved further upward along the length of the guide rails 196, 198 to a third position near the top ends 338 of the guide rails. The additional upward movement of the slider link 288 also forces the piston shaft 314 of the shock assembly 120 further upward and into the cylinder body 306 to place the shock assembly a third stage of compression. In addition, as the rear suspension system 102 moves from the second partially non-compressed stage to the third fully compressed stage, the rear triangles 152, 154 of the rear frame 114 pivot further around the first 182 and second pivots 192 in a clockwise direction (as view from the right side of the bicycle).

By allowing the rear wheel 106 and the rear frame 114 to move relative to the front frame 112 through the first and second pivots 182, 192 as described above, the rear suspension system 102 acts to absorb forces impacting on the bicycle 100 that can be caused from riding over rough terrain (such as rocks, holes in the ground, and the like). As previously mentioned, the shock assembly 120 acts to resist displacement of the rear wheel 106 and acts to return the rear wheel to its pre-displacement position. In addition, the shock assembly 120 acts as a dampener by resisting forces from the initial displacement of the rear wheel as well as forces from the compression spring 320 acting to return the rear wheel to its pre-displacement position. Therefore, the shock assembly can, for example, act to return the rear suspension from the third fully compressed stage shown in FIGS. 16A-16C to the second partially compressed stage shown in FIGS. 15A-15C.

The above comparison further illustrates how the first and second pivot translating assemblies 116, 118 couple the rear frame with the front frame 112 through pivotal connections that can also translate along respective travel paths. The distances in which the first and second pivots 182, 192 travel as the rear suspension system 102 moves from the non-compressed stage and the fully compressed stage are called the effective travel distances. It is to be appreciated that various embodiments of the present invention can provide for different effective travel distances of the first and second pivots between the non-compressed stage and the fully compressed stage of the rear suspension system. For example, in one embodiment, the forward track assembly 194 is 5.8 inches long and provides an effective travel distance of the first pivot axle 180 (first pivot 182) of 5 inches. In another example, the effective travel distance of the first pivot axle (first pivot) is 2 inches. In yet another example, the guide rails 196, 198 are 5.5 inches long and provide an effective travel distance of the second pivot axle 190 (second pivot 192) of 3 inches.

Figure 17:
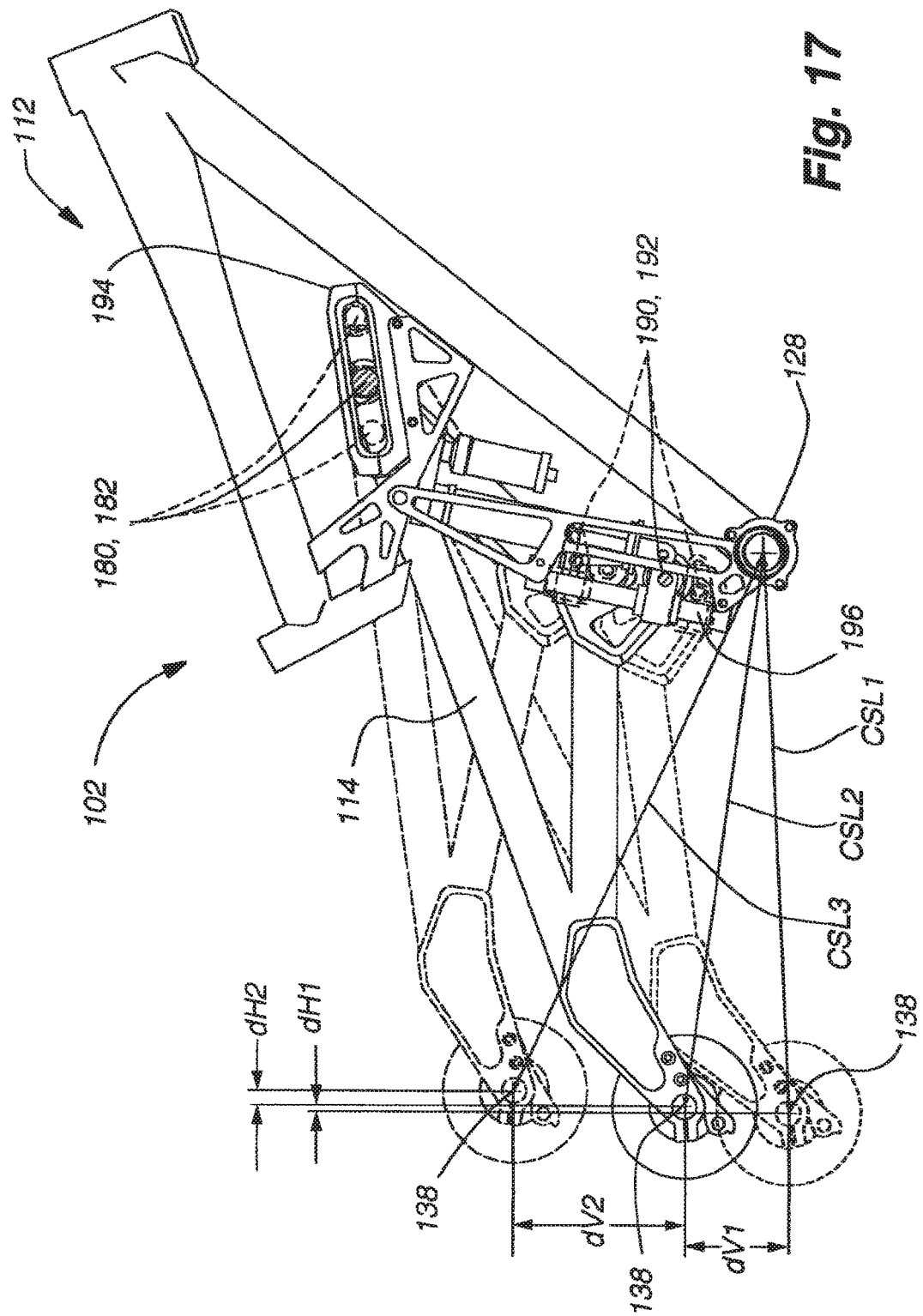
FIG. 17 is a right side view of the rear suspension system in an uncompressed stage and a fully compressed stage shown in dash, and in a partially compressed stage shown in solid lines.

FIG. 17 illustrates the movement of the rear frame 114 with respect to the front frame 112 as the rear suspension system 102 moves from the first non-compressed stage, to the second partially compressed stage, and to the third fully compressed stage. The rear frame 114 is shown in solid lines in the second partially compressed stage and is shown in dashed lines in the first non-compressed and third fully compressed stages. As previously mentioned, the rear triangles are shown to pivot in a clockwise direction around the first pivot axle 180 (first pivot 182) and the second pivot axle 190 (second pivot 192) as the rear suspension moves from the first non-compressed stage to the third fully compressed stage. At the same time, the first pivot axle (first pivot) moves forwardly along the forward track assembly 194 and the first pivot axle (second pivot) and slider link move upwardly along the guide rails 196, 198.

FIG. 17 also illustrates changes in the horizontal and vertical positions of the rear wheel as the rear suspension system 102 moves from the first non-compressed stage, to the second partially compressed stage, and to the third fully compressed stage. The distances labeled dH1 and dV1 represent the change in horizontal and vertical positions of the rear axle 138 as the rear suspension system moves from the first non-compressed stage to the second partially compressed stage, and the distances labeled dH2 and dV2 represent the change in horizontal and vertical positions, respectively, of the rear axle as the rear suspension system moves from the second partially compressed stage to the third fully compressed stage. As shown in FIG. 17, dV1 and dV2 are much longer than dH1 and dH2, respectively, which shows that the rear wheel moves a greater distance in a vertical direction than in a horizontal direction as the rear suspension system is compressed. Although FIG. 17 shows the rear axle 138 moving in a generally forward horizontal direction as the rear axle moves upward, it is to be appreciated that the rear axle may also move in a rearward horizontal direction during travel as the rear suspension system moves from the first non-compressed stage to the second partially compressed stage as well as the third fully compressed stage.

As discussed above with reference to FIG. 1, when the rider applies forces to the pedals 144, the forces are translated through the sprocket 146 and chain 148 to the rear sprocket assembly 150, causing the rear wheel 106 to rotate. With some rear suspension systems, a portion of energy exerted by the rider on the pedals and through the chain causes rear suspension system to actuate or compress. This results in wasted energy that could otherwise be used to rotate the rear wheel. The rear suspension system according to the present invention helps to mitigate such losses in energy, because the second pivot and rear frame shown in FIG. 17 moves mainly in a direction that is perpendicular with respect to the forces exerted by the chain on the rear wheel from the rider. As such, less energy exerted by the rider is needlessly wasted on actuation or compression of the rear suspension system.

FIG. 17 further illustrates changes in a chainstay length as the rear suspension system moves from the first non-compressed stage, to the second partially compressed stage, and to the third fully compressed stage. The chainstay length can be defined as the distance between the center of the bottom bracket 128 and the center of the rear axle 138. As discussed below, the chainstay length changes as the rear wheel 106 is displaced. Typically, the longer the chainstay length becomes, the longer the chain must become, and vice versa. A rear derailer, as known in the art, coupled with the chain 148 and rear sprocket assembly 150 can help maintain proper tension in the chain while at the same time allowing for variations in chainstay length. As shown in FIG. 17, the distances labeled CSL1, CLS2, and CSL3 represent the chain stay lengths when the rear suspension system in the first non-compressed stage, the second partially compressed stage, and the third fully compressed stage, respectively. Because the rear axle 138 shown in FIG. 17 moves farther vertically than horizontally as the rear suspension is compressed, the distance between the rear axle 138 and the bottom bracket 128 (i.e. chainstay length) increase as the rear suspension system is compressed.

Figure 18A:
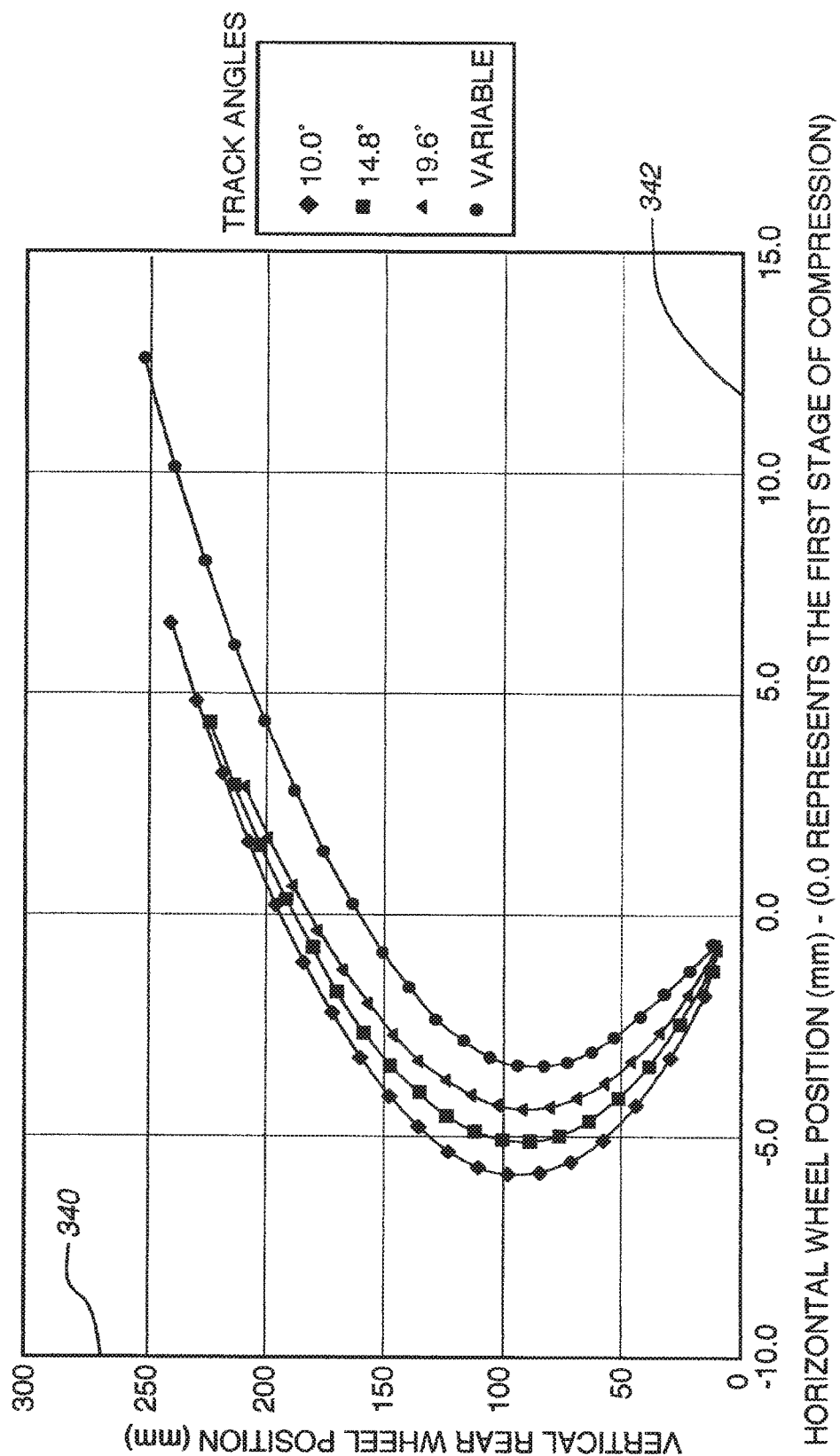
FIG. 18A is a graphical representation of the rear wheel path for four different forward track assembly orientations.
Figure 18B:
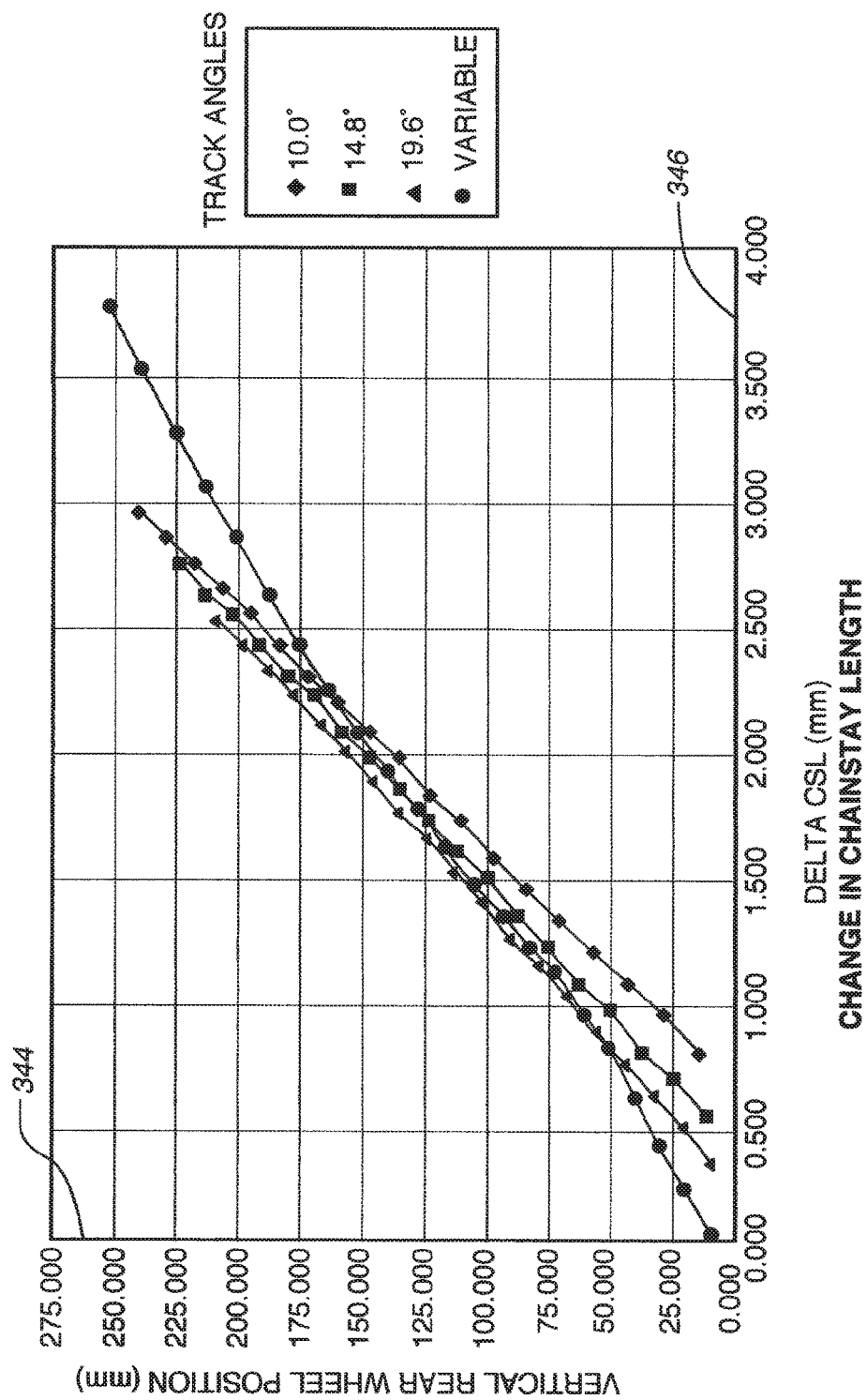
FIG. 18B is a graphical representation showing the change in chainstay length as the vertical position of the rear wheel changes for four different forward track assembly orientations.
Figure 18C:
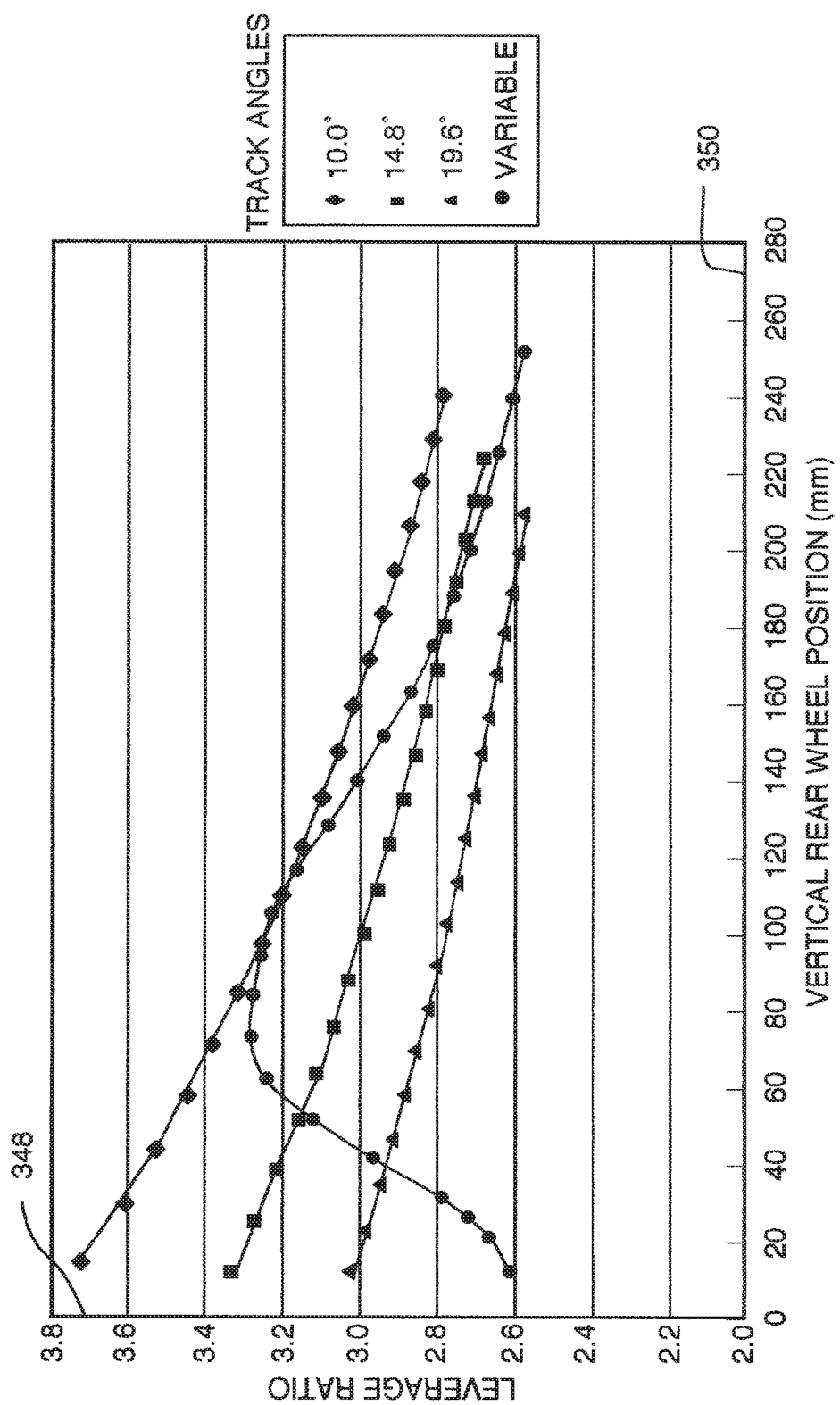
FIG. 18C is a graphical representation showing the change in leverage ratio as the vertical position of the rear wheel changes for four different forward track assembly orientations.

As described above, various components of the rear suspension system 102 of the present invention can be adjusted by the user to affect the travel path of the rear wheel 106 of the bicycle 100 to suit the rider's preference. The graphs shown in FIGS. 18A-18C are illustrative of how the rear wheel path, chain stay length (CSL), and leverage ratio can be affected by varying the shape and/or orientation of the forward track assembly 194. More particularly, FIGS. 18A-18C each contain four sets of data corresponding to three different track angles 322 (i.e. 10 degrees, 14.8 degrees, and 19.6 degrees above the horizontal reference 324 line as shown in FIG. 8) similar to the track assemblies 194, 194', 194" described above with reference to FIGS. 8 and 14A-14B as well as one set of data corresponding with a variable slope track assembly similar to the track assembly 194''' described above with reference to FIG. 14C.

FIG. 18A graphically illustrates four different rear wheel paths corresponding with the four different forward track orientations described above as the rear suspension system moves from a first stage of relative low compression to a second stage of relative high compression. The Y-axis 340 of the graph shown in FIG. 18A represents the vertical rear wheel position in millimeters and the X-axis 342 represents the horizontal rear wheel position in millimeters. As shown in FIG. 18A, all four track configurations provide similarly shaped rear wheel paths. More particularly, as the rear wheel 106 begins to move vertically, it also moves in a rearward horizontal direction relative to the front frame 112 for all four track configurations. Once the rear wheel is displaced vertically by approximately 100 mm, the rear wheel begins to travel in a forward horizontal direction for the remainder of its travel path. As shown in FIG. 18A, the forward track angle of 10 degrees provides the greatest amount rearward horizontal travel, while forward track angles of 14.8 and 19.6 degrees provide progressively less rearward horizontal travel, and the variable track configuration provides the least amount rearward horizontal travel. As such, as the track angle 322 increases (i.e. the more the forward track assembly 194 is tilted upward), the rear wheel 106 travels less in a rearward horizontal direction relative to the front frame as the rear wheel moves upward in a vertical direction. Correspondingly, as the track angle decreases (i.e. the more the forward track assembly is tilted downward), the rear wheel travels more in a rearward horizontal direction relative to the front frame as the rear wheel moves upward in a vertical direction. It is to be appreciated that embodiments of the rear suspension system can be configured to provide different rear wheel paths than those illustrated in FIG. 18A. For example, some embodiments of the rear suspension system can be configured such that the rear wheel travels in a rearward horizontal direction during the entire vertical movement of the rear wheel.

FIG. 18B graphically illustrates four sets of data showing how the change in chainstay length (CSL) changes with the four different forward track orientations described above, as the rear suspension system moves from a first stage of relative low compression to a second stage of relative high compression. The Y-axis 344 of the graph shown in FIG. 18B represents the vertical rear wheel position in millimeters and the X-axis 346 represents the change in chainstay length in millimeters. As shown in FIG. 18B, for all four track configurations, as the rear wheel moves vertically, the change in chain stay length increases. Of the constant track angle configurations, the forward track angle of 10 degrees provides the greatest increase in change in chainstay length, while forward track angles of 14.8 and 19.6 degrees provide progressively less increases in change in chainstay length. In addition, the data corresponding with the forward track angles of 10, 14.8, and 19.6 degrees shows an almost constant rate of increase in change in chainstay length as the rear wheel moves vertically. However, the variable track configuration results in varying changes in chainstay length as the rear wheel moves vertically. More particularly, with the variable track configuration, the change in chainstay length increases less between vertical rear wheel displacements of 50-175 millimeters than during other rear wheel displacement positions.

FIG. 18C graphically illustrates four sets of data showing how the leverage ratio changes with the four different forward track orientations described above, as the rear suspension system moves from a first stage of relative low compression to a second stage of relative high compression. As previously mentioned, the leverage ratio can be defined as the total rear wheel travel divided by the total shock stroke. As such, for a given shock assembly, a relatively high leverage ratio corresponds with a "softer" suspension system as felt by the rider, and a relatively low leverage ratio corresponds with a "stiffer" suspension system as felt by the rider. In other words, for a given amount force applied to the rear wheel, a suspension system with a higher leverage ratio will allow the rear wheel to be displaced a greater distance than a suspension system with a lower leverage ratio. Embodiments of the present invention allows the rider to vary the forward track assembly orientation and/or shape to provide a desired leverage ratio, and hence, "feel" of the rear suspension system as the rear wheel moves along a path of travel. For example, the forward track assembly can be configured to provide the rider with a rear suspension system that is "stiffer" during initial stages of compression, "softer" during partial stages of compression, and "stiffer" during final stages of compression.

The Y-axis 348 of the graph shown in FIG. 18C represents the leverage ratio and the X-axis 350 represents the vertical position of the rear wheel 106 in millimeters. As shown in FIG. 18C, the 10.0, 14.8, and 19.6 degree track configurations provide a relatively high initial leverage ratios that decrease as the rear wheel is displaced upward in a vertical direction. As such, the rear suspension system configured with the 10, 14.8, and 19.6 degree forward track configurations would feel "soft" during the initial rear wheel displacements and would progressively feel "stiffer" as the rear wheel moves vertically upward. As shown in FIG. 18C, the forward track angle of 10 degrees provides the greatest leverage ratios as the rear wheel is displaced, while forward track angles of 14.8 and 19.6 degrees provide progressively lower leverage ratios. Therefore, as the track angle increases (i.e. the more the forward track assembly is tilted upward), the rear suspension system will provide a correspondingly "stiffer" feel. The data shown in FIG. 18C corresponding with the variable track configuration shows that the leverage ratio is relatively low during initial rear wheel displacements, but increases as the rear wheel is displaced vertically by approximately 80 millimeters. The leverage ratio then begins to decrease as the rear wheel continues its vertical movement beyond 80 millimeters. As such, the rear suspension system configured with the variable track configuration would feel relatively "stiff" during initial stages of compression, "softer" during partial stages of compression, and "stiffer" during final stages of compression.

It is to be appreciated that the orientation and/or geometric configuration of various components of the rear suspension 102 can be adjusted and/or selected to provide a desired rear wheel path and/or leverage ratio. As such, the operation of the present invention should not be construed to be limited to the graphical data shown in FIGS. 18A-18C. For example, embodiments of the present invention can utilize forward and rear track assemblies defining other shapes and orientations to provide other track angles. As such, embodiments of the present invention allow the user to select a desired leverage ratio curve for the rear suspension system.

Figure 19:
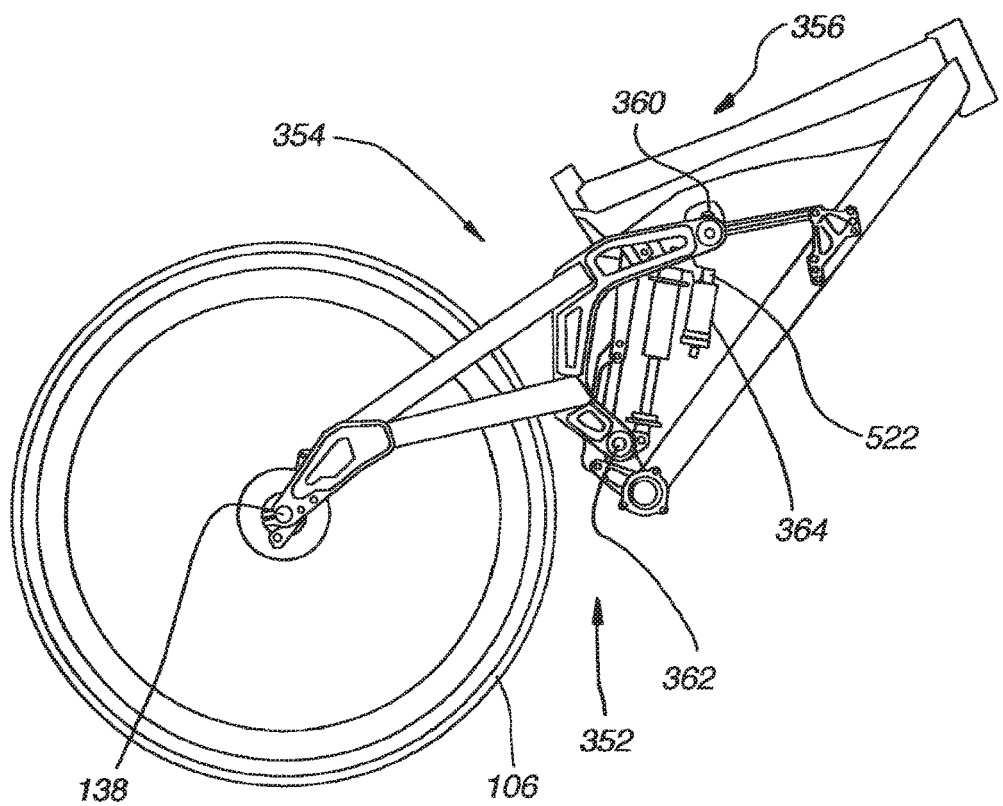
FIG. 19 is a right side view of a frame, rear suspension system, and rear wheel according to a third embodiment of the invention.

A bicycle 352 including a second embodiment of a rear suspension system 354 according to aspects of the present invention is shown in FIG. 19. More particularly, FIG. 19 is a right side view showing a front frame 356, rear suspension system 352, and the rear wheel 106 of the bicycle 352. Although not depicted in FIG. 19, it is to be appreciated that the bicycle 354 shown in FIG. 19 can include other component parts described above with reference to FIG. 1, such as the front wheel 104, steering system 108, seat 110, pedals 144, and front and rear sprocket assemblies 146, 150 coupled with each other through the chain 148.

Similar to the first embodiment described above, the rear suspension system 354 shown in FIG. 19 includes a rear frame 358 coupled with the front frame 356 of the bicycle 352 through a first pivot translating assembly 360 and a second pivot translating assembly 362. The rear suspension system 354 shown in FIG. 19 also includes a shock assembly 364, which is similar to the shock assemblies described above. Although the first and second embodiments of the rear suspension system function in a similar way, the second embodiment 354 structurally varies from the first in several ways. In particular, the first and second pivot translating assemblies 360, 362 of the second embodiment differ structurally from the first and second pivot translating assemblies 116, 118 of the first embodiment 102 discussed above. For example, the second rear suspension system 354 includes a first pivot 366 operably coupled with a different bearing and track configuration than the track and bearing configuration described above with reference to the first embodiment. In addition, a second pivot 368 of the second embodiment 354 is operably coupled with a bearing and track configuration, as opposed to the slider link and rail configuration as discussed above with reference to the first embodiment.

Figure 20:
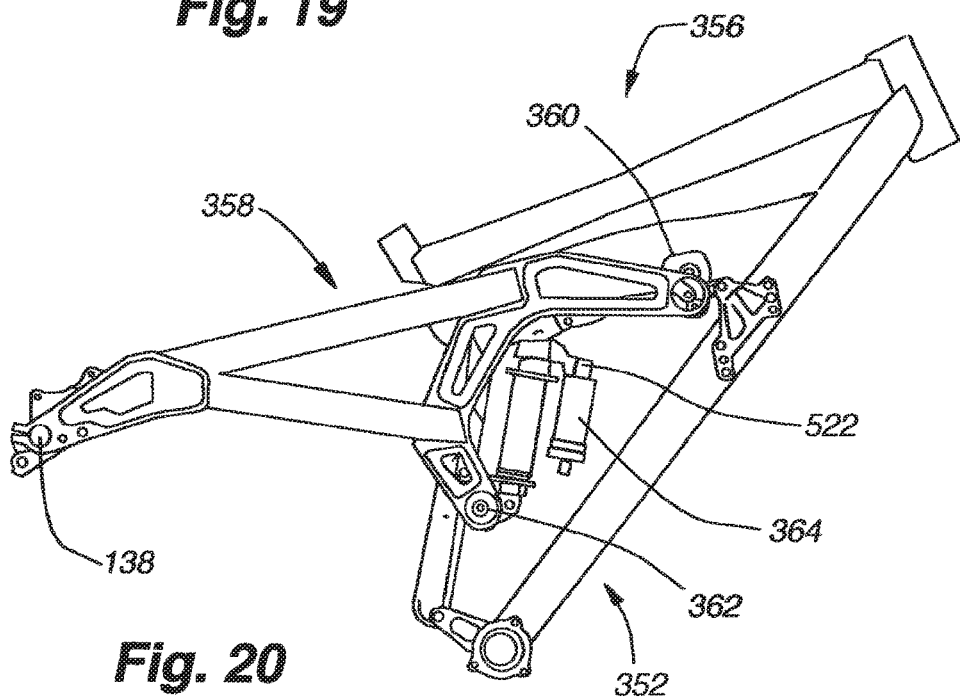
FIG. 20 is a right side view of the front frame and rear suspension system shown in FIG. 19 in a compressed stage with the rear wheel removed.
Figure 21:
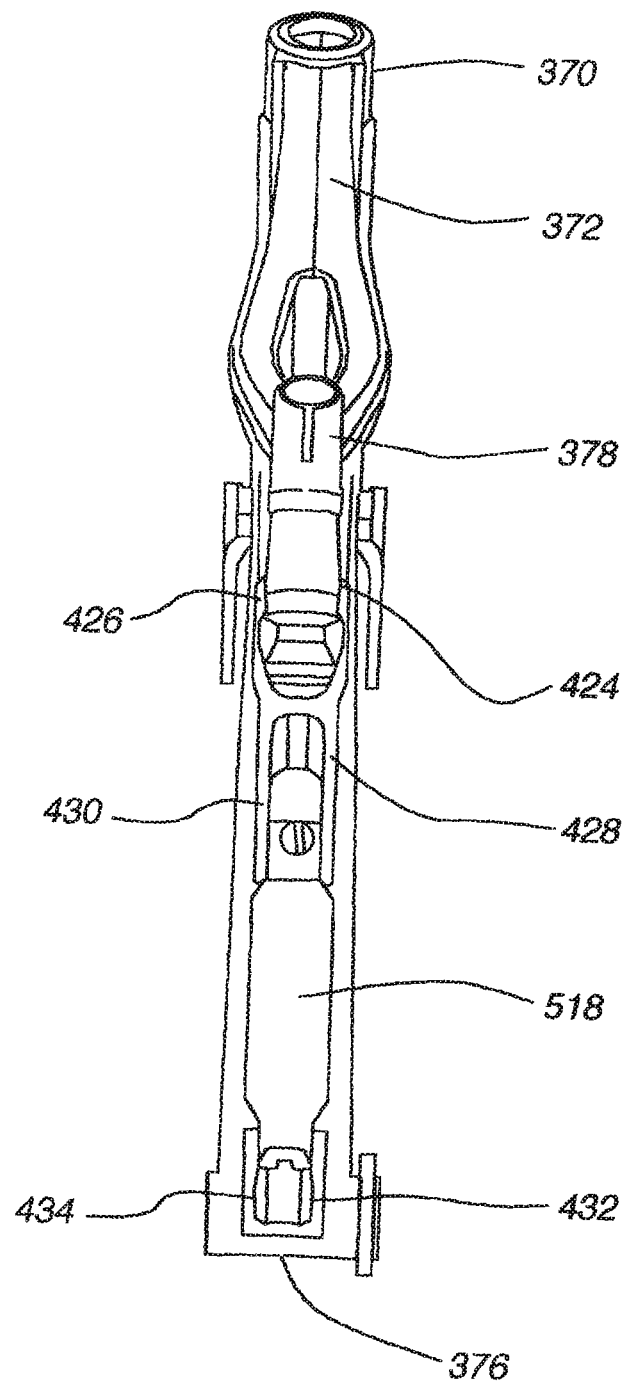
FIG. 21 is a rear side view of the front frame shown in FIG. 20 with the rear frame removed.
Figure 22:
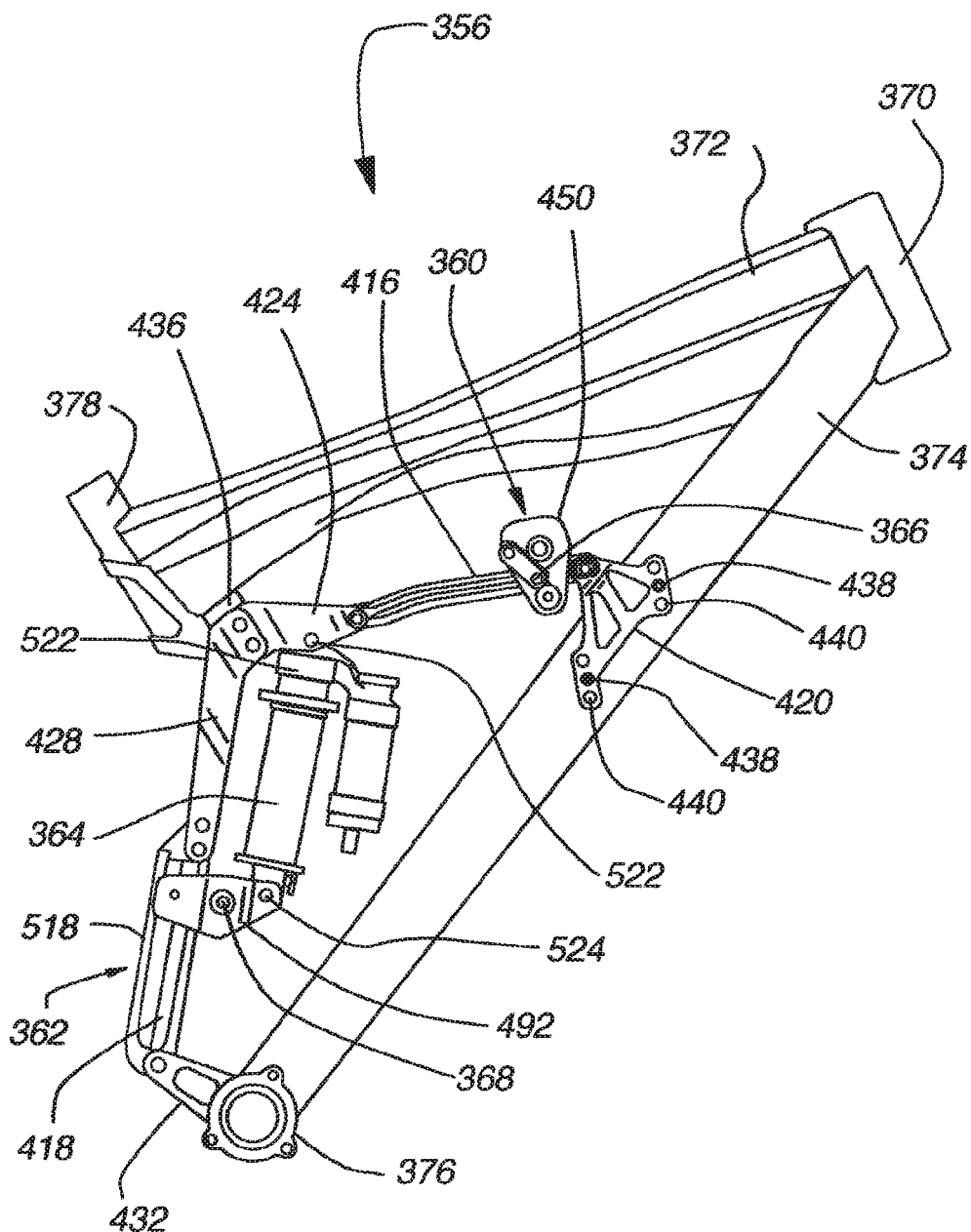
FIG. 22 is a right side view of the front frame shown in FIG. 20 with the rear frame removed.

The front frame 356 shown in FIGS. 20-22 is similar to the front frame 112 described above with reference to FIGS. 1-5. As such, the front frame 356 includes a head tube 370, a top tube 372, a down tube 374, a bottom bracket 376, and a seat tube 378. The top tube 372 extends rearwardly from the head tube 370 to connect with an upper portion of the seat tube 378, and the down tube 374 extends rearwardly and downwardly from the head tube 370 to connect with the bottom bracket 376. Although the front frame 356 shown in FIG. 22 also utilizes an "interrupted seat tube" design, it is to be appreciated that in other frame configurations, the seat tube 378 can extend from the top tube 372 and connect with the bottom bracket 376.

Figure 23:
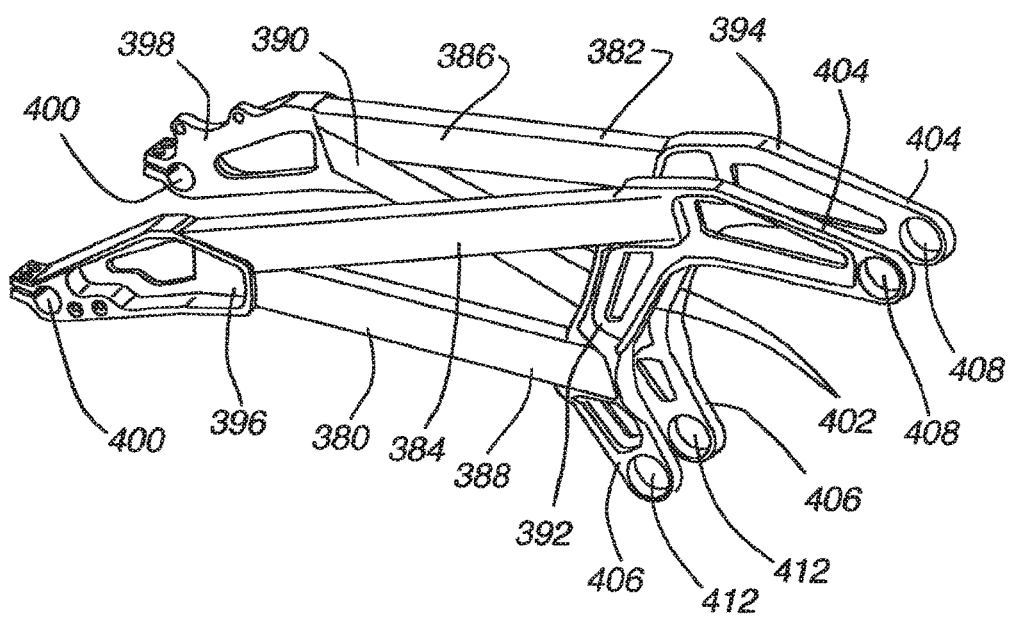
FIG. 23 is a right side view of the right rear triangle shown in FIG. 21.

Similar to the first embodiment described above, the rear frame 358 shown in FIGS. 20 and 23 also includes right and left rear triangles 380, 382. As such, right and left top members 384, 386, bottom members 388, 390, and forward members 392, 394 are connected together to form respective the right and left rear triangles. However, the rear triangles 380, 382 of the second embodiment are constructed somewhat differently than the first embodiment. As shown in FIG. 23, rear end portions of the top members 384, 386 are connected with rear end portions of the bottom members 388, 390. In addition, the rear end portions of the top and bottom members are connected with triangularly-shaped rear joint members 396, 398. The right and left rear joint members 396, 398 include rear axle apertures 400 adapted to receive and rotatably support the rear axle 138 of the rear wheel 106. Forward end portions of the top members 384, 386 are connected with upper portions of the forward members 392, 394, and forward end portions of the bottom members 388, 390 are connected with lower portions of the forward members 392, 394. Each forward member is generally C-shaped and includes a base portion 402 with an upper forward extension 404 and a lower forward extension 406. The upper forward extensions 404 of the right and left forward members 392, 394 include first pivot apertures 408 adapted to couple with first pivotal connections 410 defining the first pivot 366, as discussed in more detail below. The lower forward extensions 406 of the right and left forward members include second pivot apertures 412 adapted to couple with second pivot connections 414 defining the second pivot 368, as discussed in more detail below. It is to be appreciated that the rear frame 358 can be constructed from various types of material, such as aluminum, carbon, and titanium. The members used to construct the frame may also define a hollow tubular structure, or may be have a solid construction.

As with the first embodiment, the rear frame 358 of the second embodiment of the rear suspension system shown in FIG. 19 is coupled with the front frame 356 through first and second pivot translating assemblies 360, 362. As shown in FIG. 22, the first pivot translating assembly 360 includes a forward track 416 adapted to guide the first pivot 366 along its range of motion, and the second pivot translating assembly 360 includes a rear track 418 adapted to guide the second pivot 368 along a range of motion. Therefore, the front frame 356 may include various structural elements to support portions of the first and second pivot translating assemblies. For example, as shown in FIGS. 21 and 22, right and left front track brackets 420, 422 and right and left rear track brackets 424, 426 connected with the front frame support the forward track 416. In addition, the rear track 418 is supported by right and left top track brackets 428, 430 and right and left bottom track brackets 432, 434 connected with the front frame. Although FIG. 22 only shows right track brackets, left track brackets that are substantially mirror images of the right side, are also connected with the frame.

As previously mentioned, the front track brackets 420, 422 and the rear track brackets 424, 426 support the forward track 416 on the front frame 356. As shown in FIGS. 21 and 22, a bracket support post 436 extends downward from a rear portion of the top tube 372 and is used to help support the rear track brackets 424, 426 and the top track brackets 428, 430. The front track brackets 420, 422 are connected with bracket studs 438 extending from the right and left sides of the down tube 374. As discussed in more detail below, the front track brackets 420, 422 include six stud apertures 440 adapted to receive the bracket studs 438, which allow a user to connect the forward track 416 in different orientations relative to the front frame 356. A front end portion 442 of the forward track 416 is bolted between the right and left front track brackets 420, 422, and a rear end portion 444 of the forward track is bolted between the right and left rear track brackets 424, 426.

As previously mentioned, the top track brackets 428, 430 and the bottom track brackets 432, 434 support the rear track 418 on the front frame 356. Referring to FIG. 22, the top track brackets 428, 430 extend downward from the bracket support post 436. The bottom track brackets 432, 434 are connected with and extend upward and rearward from the bottom bracket 376. A top end portion 446 of the rear track 418 is bolted between the right and left top track brackets 430, 432, and a bottom end portion 448 of the rear track is bolted between the right and left bottom track brackets 432, 434.

As with the first embodiment of the rear suspension system 102, the first pivot translating assembly 360 and the second pivot translating assembly 362 of the second rear suspension system 354 couple the rear frame 358 with the front frame 356. More particularly, the first pivot translating assembly 360 couples the upper forward extensions 404 of the right and left forward members 392, 394 of the rear triangles 380, 382 with the forward track 316. In addition, the second pivot translating assembly 362 couples the lower forward extensions 406 of the right and left forward members of the rear triangles with the rear track 418.

Figure 25A:
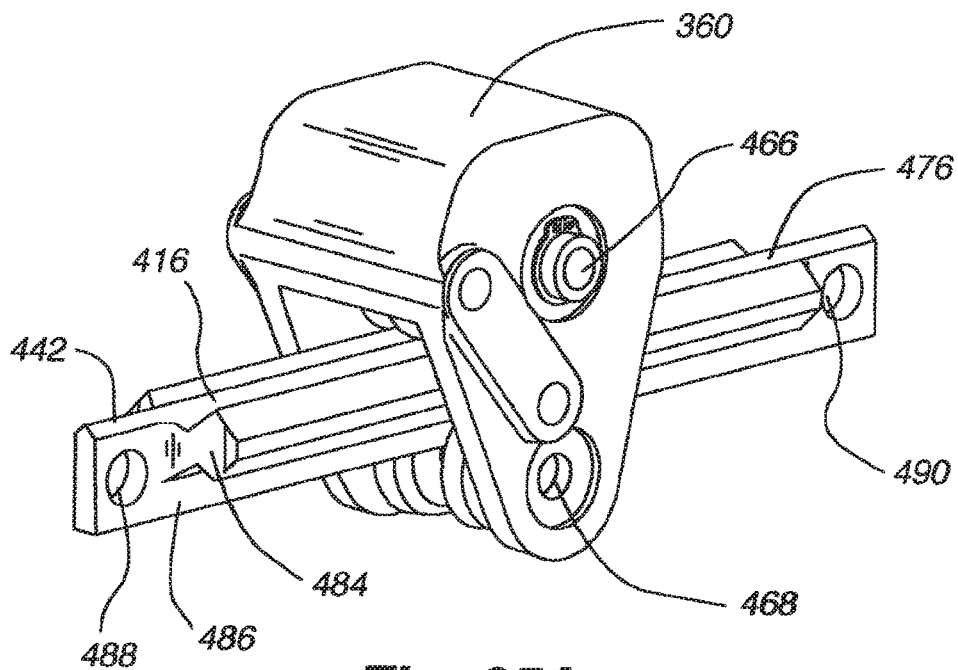
FIG. 25A is a left-front isometric view of the forward track shown in FIG. 24.
Figure 25B:
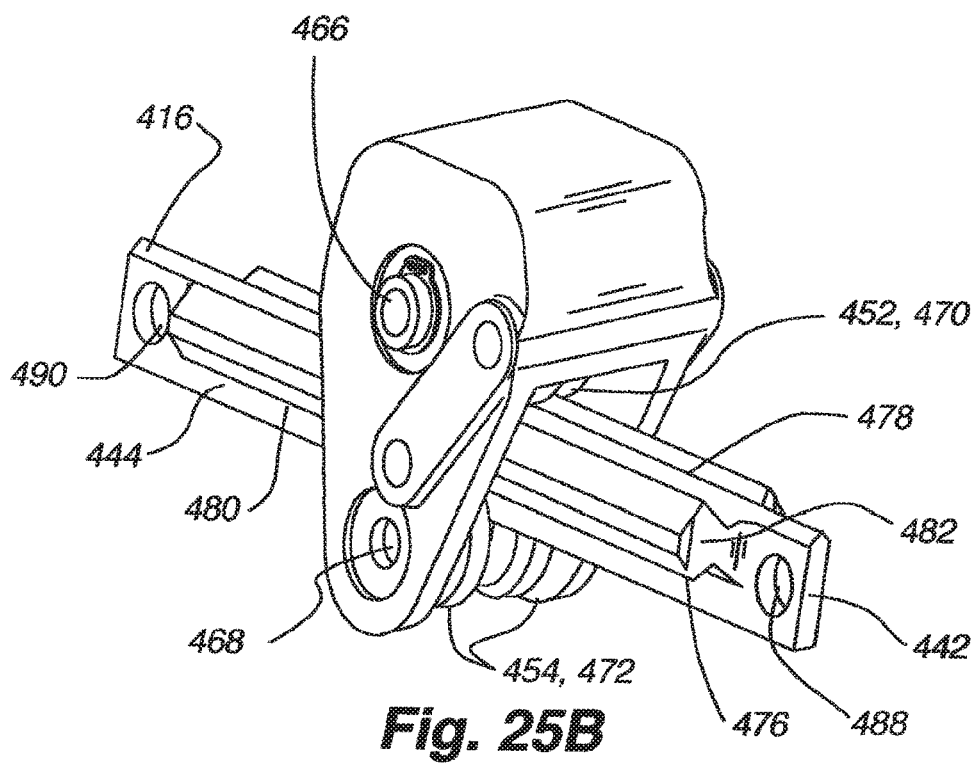
FIG. 25B is a right-rear isometric view of the forward track shown in FIG. 24.
Figure 25C:
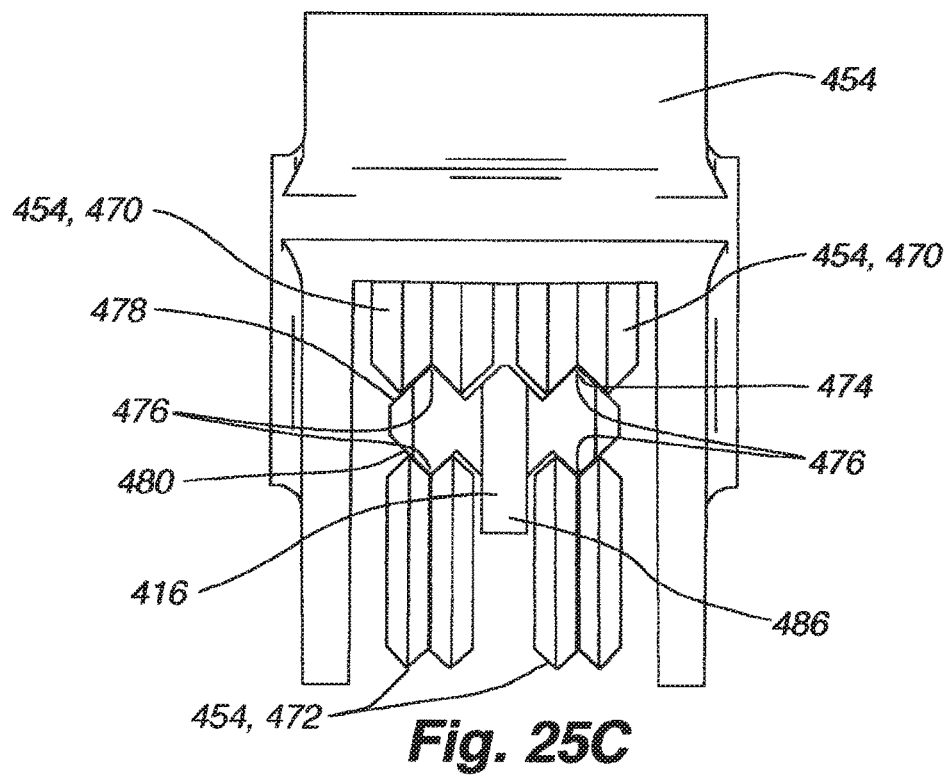
FIG. 25C is a front view of the forward track assembly shown in FIG. 24.
Figure 25D:
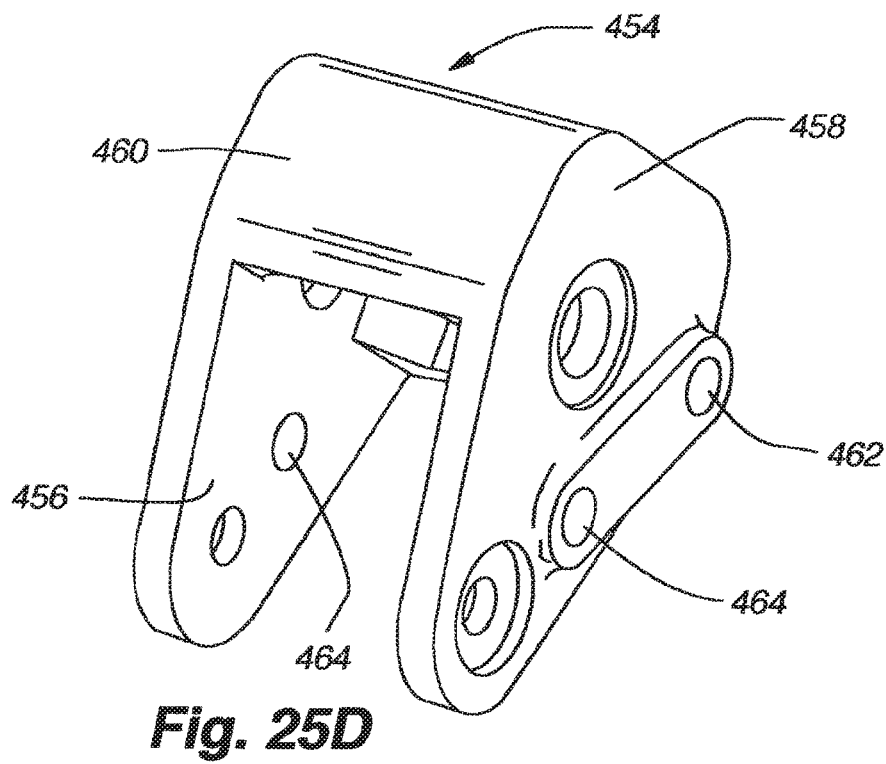
FIG. 25D is an isometric view of the forward track link body.

As previously mentioned, the first pivot translating assembly 360 of the second rear suspension system 354 utilizes a different bearing and track configuration than described above with reference to the first embodiment. As shown in FIGS. 19 and 24-25D, the first pivot translating assembly includes a forward track link 450 that rotatably supports four roller bearings 452 adapted to roll back and forth along the forward track 416. As such, the upper forward extensions 404 the forward members 392, 394 of the rear triangles 380, 382 are coupled with the forward track 416 through the forward track link 450. As shown in FIG. 25D, the forward track link 450 includes a body 454 having substantially parallel first and second sides 456, 458 separated by and connected with a guard structure 460 that partially encloses a top side as well as front and rear sides of the forward track link body 454. The guard structure 460 provides strength to the forward track link body as well as helping to prevent inadvertent contact with the roller bearings 452. Upper and lower first pivot apertures 462, 464 are located on each side of the forward track link body 454 to provide alternative locations for the first pivot connections 410 with the rear triangles 380, 382. As such, the upper forward extensions 404 of the right and left forward members 392, 394 of the rear triangles can be pivotally coupled with either the upper or lower first pivot apertures 462, 464. Therefore, the rear triangles can be connected with either pair of first pivot apertures on the forward track link so as to a yield different frame geometries to suit a rider's preference.

As previously mentioned, the forward track link 450 is rollingly coupled with the forward track 416 through roller bearings 452. As shown in FIGS. 24-25B, a first track axle 466 and a second track axle 468 extend between the first and second sides 456, 458 of the forward track link body 454. As such, a first pair of relatively large roller bearings 470 are rotatably connected with the first track axle 466, and a second pair of relatively small roller bearings 472 are rotatably connected with the second track axle 468. The rolling surfaces of the first and second pairs roller bearings are separated by a distance that is slightly larger than a corresponding thickness of the forward track 416. Instead of having flat rolling surfaces, the rolling surfaces of the roller bearings 452 each define a wedge-shaped recess 474 located generally in the center of the rolling surface of each bearing.

The wedge-shaped recesses 474 of the bearings 452 are adapted to engage corresponding raised wedge-shaped protrusions 476 extending along top and bottom track surfaces 478, 480 of the forward track 416. As shown in FIGS. 25A-25C, the forward track 416 includes a first side portion 482 and a second side portion 484 separated by a middle portion 486, which in combination, define the upper and lower track surfaces 478, 480. The middle portion 486 includes forward and rear track connection apertures 488, 490 adapted to receive bolts used to connect the forward track 416 with the front track brackets 420, 422 and the rear track brackets 424, 426. As previously mentioned, the upper track surface 478 and the lower track surface 480 define raised wedge-shaped protrusions 476 extending the length of the forward track. When the forward track link 360 is coupled with the forward track 416, the rolling surfaces of the first pair of roller bearings 470 engage the upper track surface 478, and the rolling surfaces of the second pair of roller bearings 472 engage the lower track surface 480.

As described above with reference to the first embodiment, the roller bearings 452 of the first pivot translating assembly 360 roll back and forth along forward track 416 as the rear suspension system 354 moves in response to displacement of the rear wheel 106. Although the roller bearings are free to roll back-and-forth along the forward track, forces exerted on the rear suspension system can act on the first forward track link 360 in upward or downward directions. In response to a downward force exerted on the forward track link, the first pair of roller bearings 470 will engage the upper track surface 478. In response to an upward force exerted on the forward track link, the second pair of roller bearings 472 will engage the lower track surface 480. In this manner, the rolling bearings 452 are prevented from disengaging the forward track 416. Further, should the forward track link 360 be subjected to forces in a lateral direction, either right or left with respect to the forward track, the roller bearings 452 will engage respective wedges 476 on the upper and lower track surfaces 478, 480, which will act to prohibit the roller bearings from disengaging the forward track 416.

Figure 26:
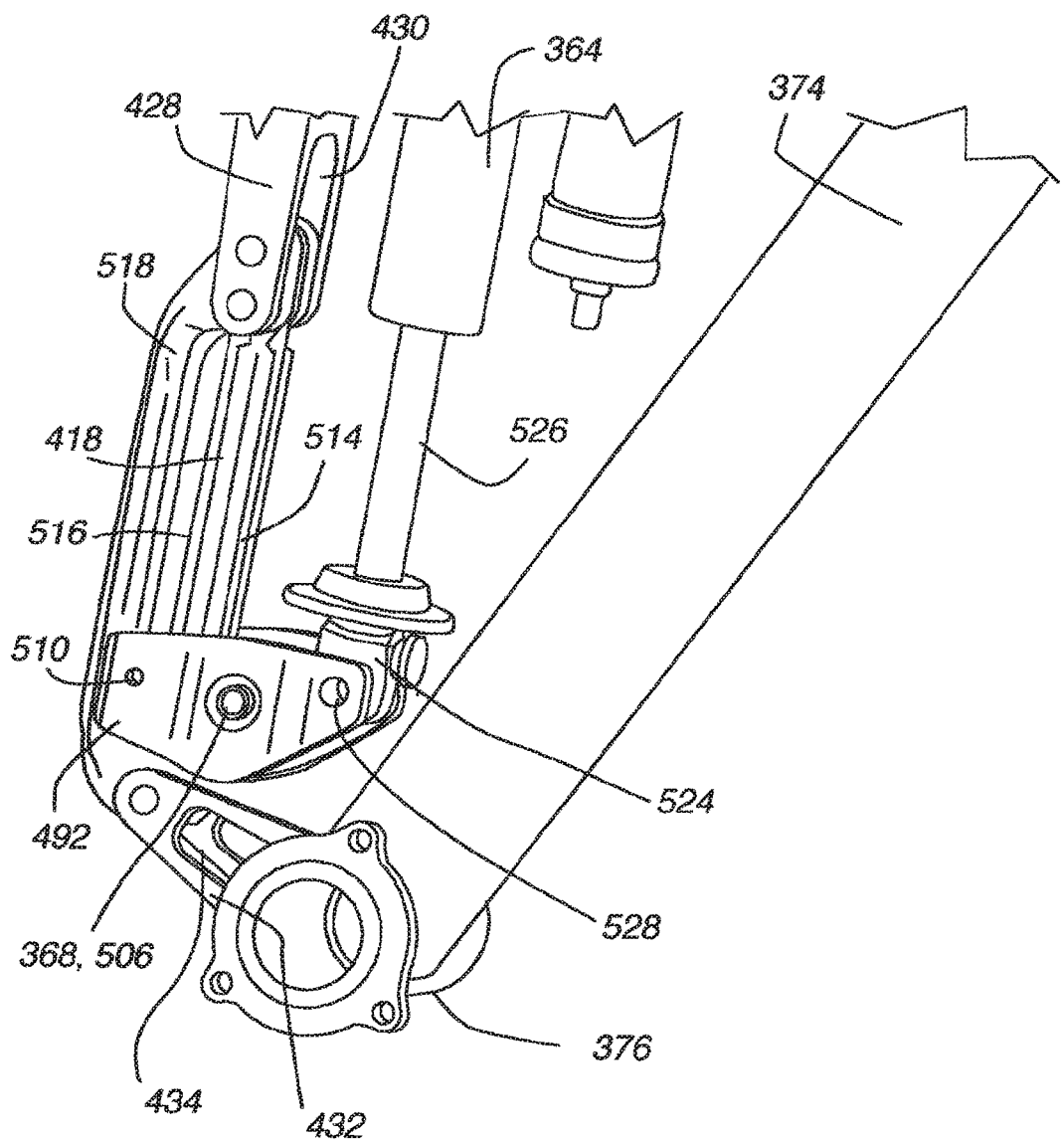
FIG. 26 is a detailed view of the second pivot translating assembly shown in FIG. 19.

As previously mentioned, the second pivot translating assembly 362 couples the lower forward extensions 406 of the right and left forward members of the rear triangles with the rear track 418. As described in more detail below, the second pivot translating assembly 362 of the second rear suspension system 354 utilizes a bearing and track configuration as opposed to the slider link and guide rail configuration described above with reference to the first embodiment. As shown in FIGS. 19 and 26, the second pivot translating assembly includes a rear track link 492 that rotatably supports four roller bearings 494 adapted to roll back and forth along the rear track 418. The rear track link 492 and rear track 418 have a similar bearing and track surface configuration to that discussed above with respect to the forward track link 450 and forward track 416. However, the rear track link includes a rear track link body 496 is constructed differently than the first track link body 454.

Figure 27A:
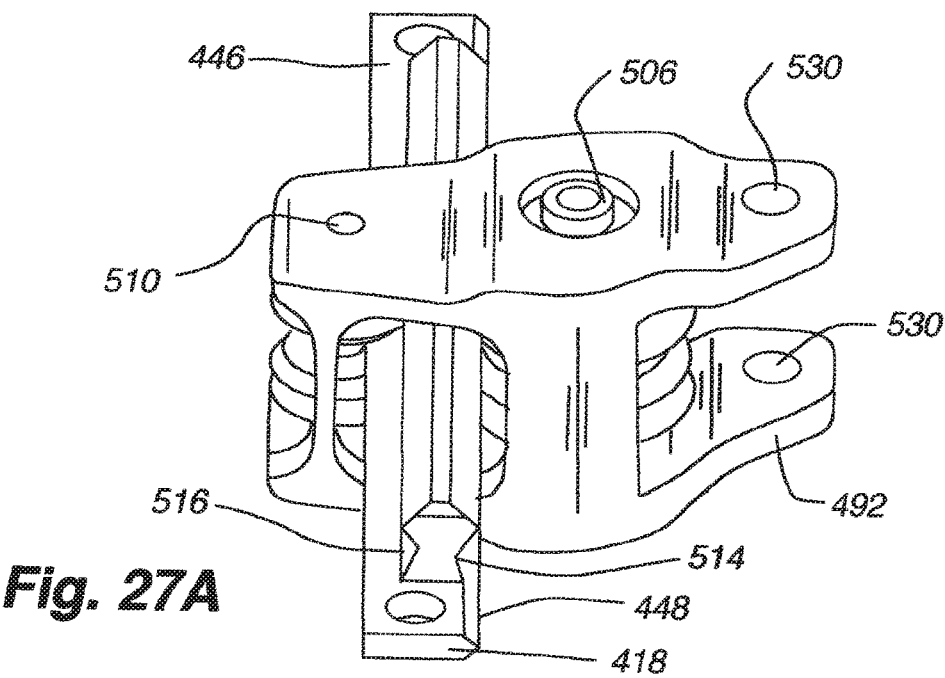
FIG. 27A is a front-bottom isometric view of the rearward track shown in FIG. 26.
Figure 27B:
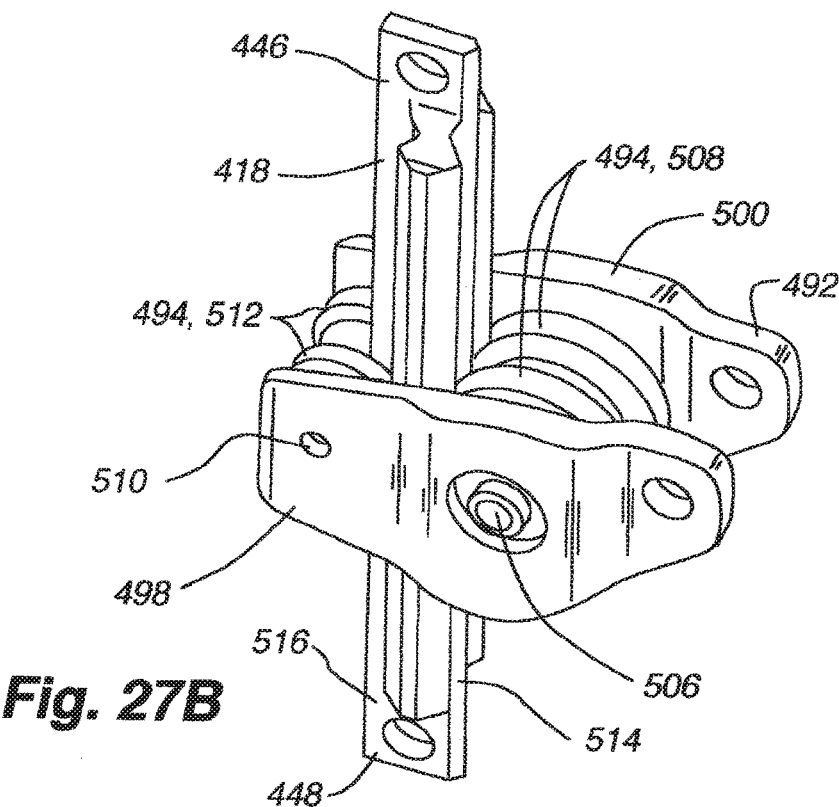
FIG. 27B is a front-top isometric view of the rearward track shown in FIG. 26.
Figure 27C:
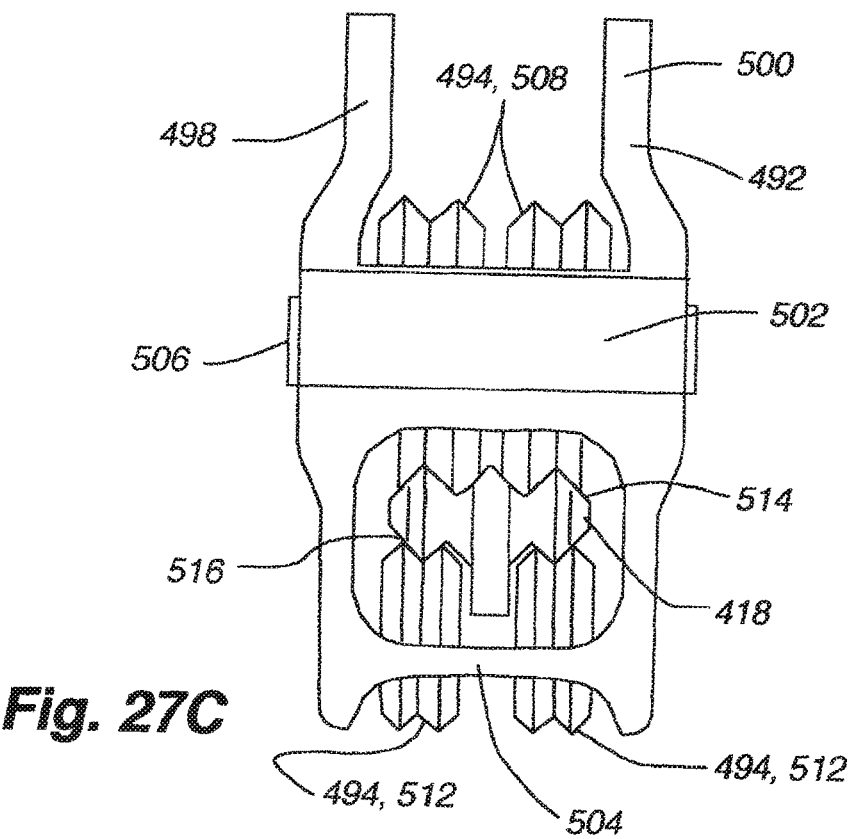
FIG. 27C is a bottom view of the rearward track shown in FIG. 26.
Figure 27D:
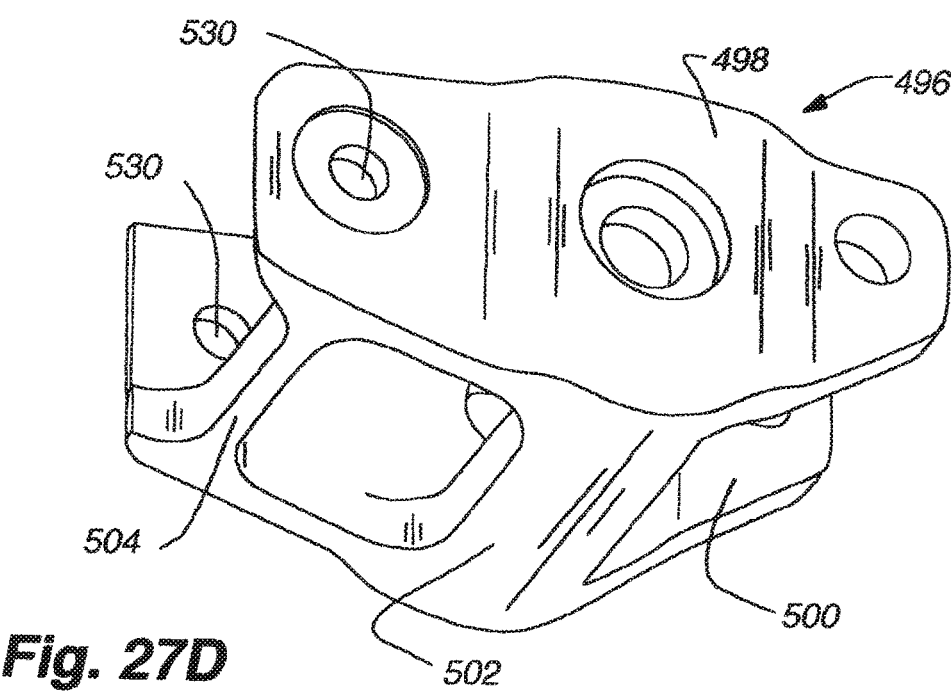
FIG. 27D is an isometric view of the rear track link body.

As shown in FIGS. 26-27D, the rear track link body 496 includes substantially parallel first and second sides 498, 500 separated by and connected with first and second web structures 502, 504. Similar to the forward track link 450, the rear track link 492 includes a first track axle 506 rotatably supporting a first pair of relatively large roller bearings 508 and a second track axle 510 rotatably supporting a second pair of relatively small roller bearings 512. The second pivot connections 414 between the lower forward extensions 406 of the right and left forward members 392, 394 of the rear triangles 380, 382 and the first track axle 506 on the rear track link 492 defines the second pivot 368. As such, the lower forward extensions 406 the forward members 392, 394 of the rear triangles 380, 382 are pivotally coupled with the rear track 418 through the rear track link 492.

As shown in FIGS. 27A-27C, the roller bearings 494 and rear track 418 are configured with wedge-shaped recesses 474 and protrusions 476 as described above with reference to the roller bearings 452 and forward track 416. Because the rear track 418 is substantially vertically oriented, the rear track 418 defines a forward track surface 514 and a rear track surface 516. As such, the first pair of roller bearings 508 of the rear track link 492 rollingly engage the forward track surface 514 and the second pair of roller bearings 512 engage the rear track surface 516. As shown in FIGS. 21-22 and 26, a rear guard 518 connected with the top track brackets 428, 430 and the bottom track brackets 432, 434. As such, the rear guard 518 extends along the length of rear track surface 516 to prevent inadvertent contact with the second pair of roller bearings 512.

As previously mentioned, the shock assembly 364 of the rear suspension system 354 shown in FIG. 19 is similar to the shock assembly 120 described above with reference to FIGS. 13A-13B. As such, the shock assembly 364 includes many of the same component parts described above with reference to FIGS. 13A-13B. Although not shown in FIG. 19, it is to be appreciated that the shock assembly 364 can also include a compression spring. As shown in FIG. 22, an eyelet 520 located on a body cap is connected between the right and left rear track brackets 424, 426. As such, the shock assembly can pivot relative to the front frame 356. As shown in FIGS. 22 and 26, an eyelet 524 located on the bottom portion of a piston shaft 526 of the shock assembly is adapted to receive an axle 528 extending through apertures 530 in the first and second sides 498, 500 of the rear track link body 496. As such, the axle 528 pivotally connects the shock assembly 364 with the rear track link 492. As such, when the rear track link 492 moves up and down along the rear track 418, the piston shaft 526 of the shock assembly is pushed upward and pulled downward.

As described above with respect to the first embodiment, it is to be appreciated that the shock assembly 364 shown in FIG. 19 need not be connected in the manner described and depicted above. As such, although the shock assembly can be configured to couple the front frame with the rear frame, the shock assembly need not directly couple the front frame with the rear frame. For example, in other embodiments of the present invention, the shock assembly 364 can be connected with the front frame 356 and the first pivot translating assembly 360 or with the front frame and the second pivot translating assembly 362.

Figure 28:
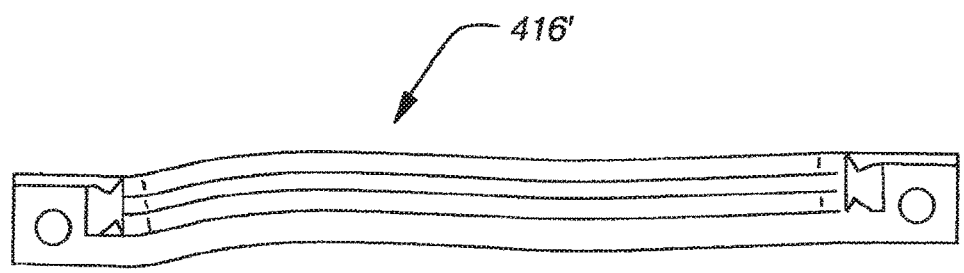
FIG. 28 is a right side view of a variable radius track.

As previously mentioned, the first and second pivot translating assemblies 360, 362 according to the second embodiment 354 of the rear suspension system operate and/or move similarly to that described above with respect to the first embodiment. In addition, the second embodiment of the rear suspension system can also provide for adjustable wheel paths and/or leverage ratios. As such, as described above, the travel path of the first pivot 366, and, in turn, the rear wheel path can be adjusted by changing the shape and/or orientation of the forward track 416. For example, the forward track 416 can be unbolted from the front frame 356 and replaced with a forward track having a different shape and/or orientation, such as the forward track 416' shown in FIG. 28. In addition, the forward track orientation can also be adjusted by connecting the front track brackets 420, 422 with the down tube 374 through different stud apertures 440 as shown in FIGS. 22 and 24. More particularly, the stud apertures 440 located in the front track brackets can correspond with different forward track orientations. For example, in one embodiment, bottom apertures 532, middle 534, and top stud apertures 536 shown in FIG. 24 correspond with forward track angles (as defined above with reference to FIG. 8) of 5, 10, and 15 degrees, respectively. As with the first embodiment, the rear suspension system can also include a track having variable track angles. Similar to the forward track 416, the rear track 418 can also be replaced with rear tracks having different shapes and/or orientations. It is also to be appreciated that the forward and rear track shapes and/or orientations can be modified without the need for removal and replacement. For example, a screw or worm gear-type arrangement connected between the front frame and the forward and/or rear tracks can be used to maneuver the tracks into various orientations with respect to the front frame.

FIGS. 29A-30C show a bicycle 538 including a third embodiment 540 of the rear suspension system according to aspects of the present invention. The bicycle 538 includes component parts described above with reference to FIG. 1, such as the front wheel 104, rear wheel 106, steering system 108, seat 110, pedals 144, and front and rear sprocket assemblies 146, 150 coupled with each other through the chain 148. Similar to the embodiments described above, the bicycle 538 shown in FIGS. 29A-30A includes a rear frame 542 coupled with a front frame 544 of the bicycle 538 through a first pivot translating assembly 546 and a second pivot translating assembly 548. The rear suspension system shown in FIGS. 29A-30A also includes a shock assembly 550. Although the third rear suspension system 540 functions in a similar way as described above with respect to other embodiments, the third embodiment structurally varies from the others in several ways. In particular, the first and second pivot translating assemblies of the third embodiment differ structurally from the first and second pivot translating assemblies of the first and second embodiments discussed above. For example, the first pivot translating assembly 546 of the third embodiment includes a slider link and rail configuration that is different from the bearing and track configurations described above. In addition, the second pivot translating assembly 548 of the third embodiment includes a different slider link and rail configuration than that described above with respect to the first embodiment.

Figure 29A:
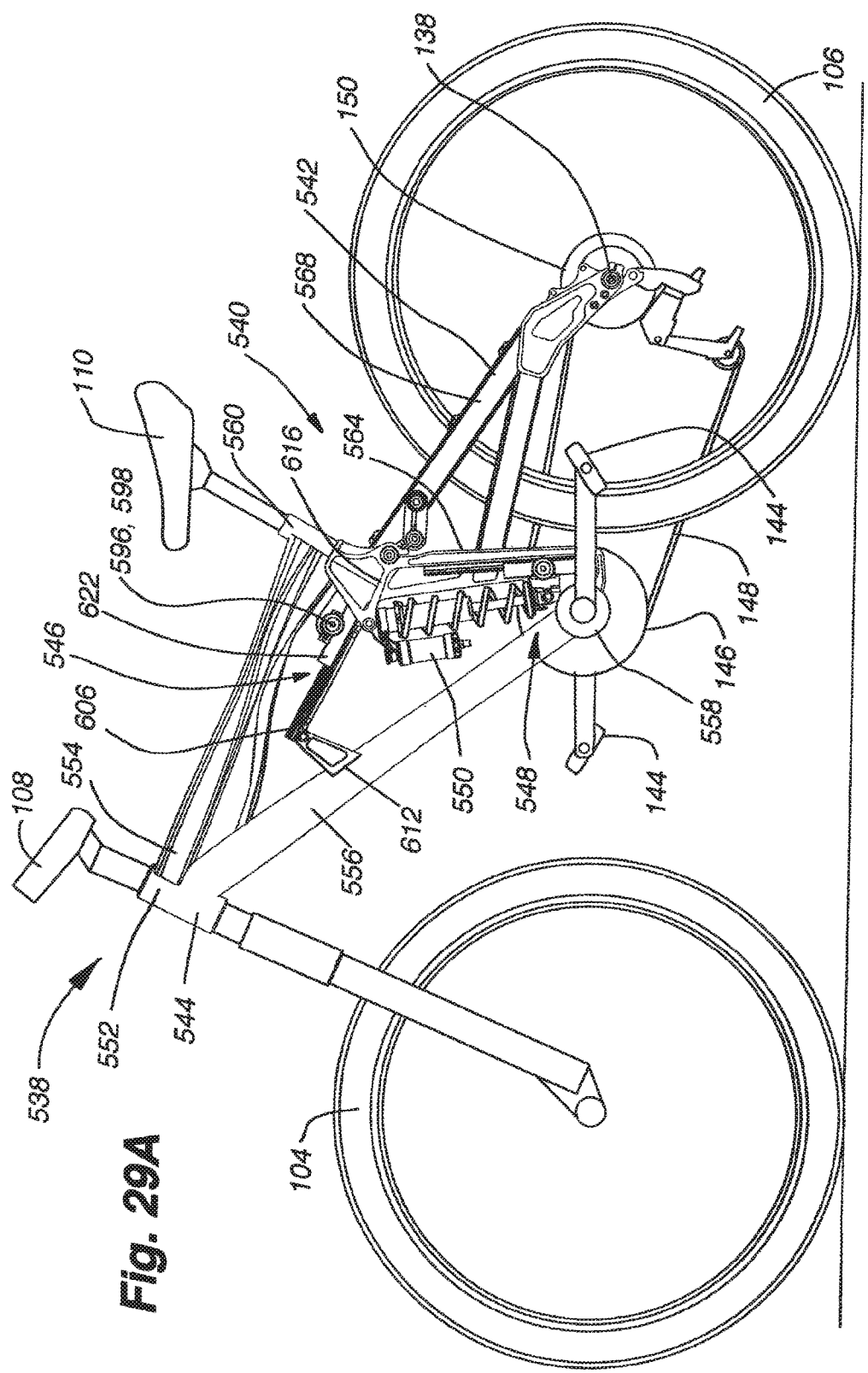
FIG. 29A is a left side view of a bicycle including a third embodiment of a rear suspension system with a left rear triangle removed.
Figure 29B:
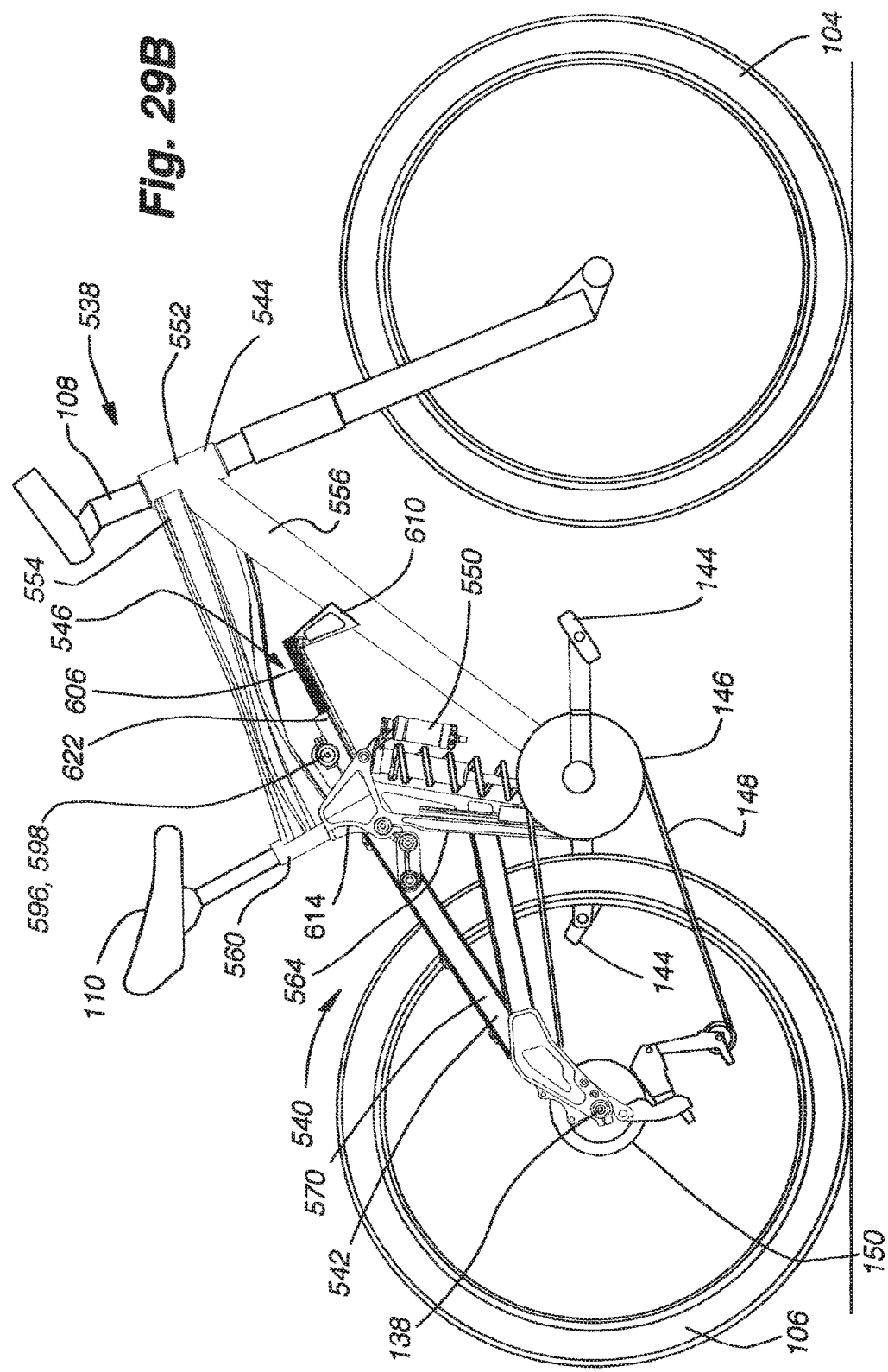
FIG. 29B is a left side view of a bicycle including a third embodiment of a rear suspension system with a right rear triangle removed.
Figure 30A:
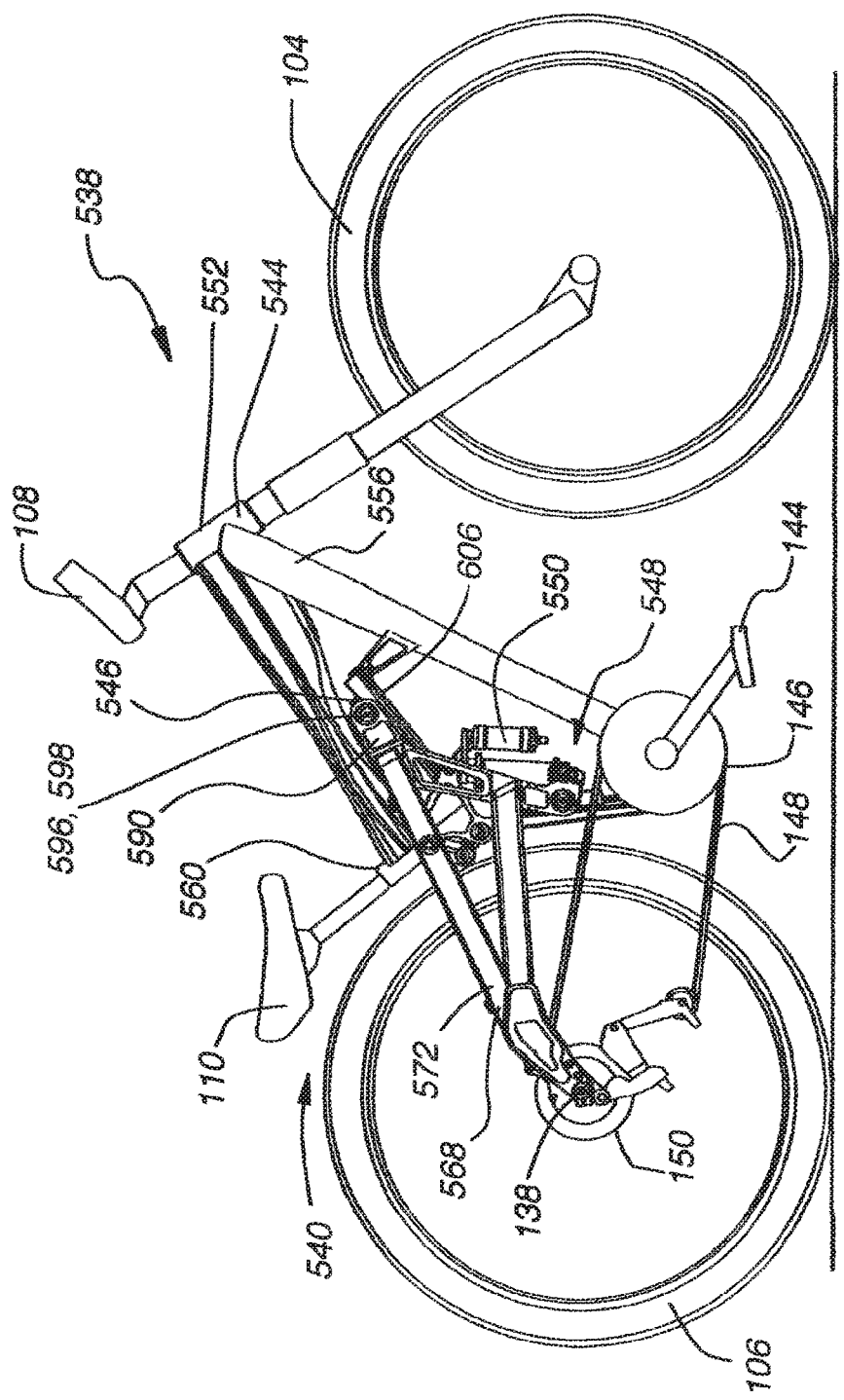
FIG. 30A is a right side view of the bicycle shown in FIGS. 29A and 29B with the rear suspension system in a relatively compressed stage.
Figure 30B:
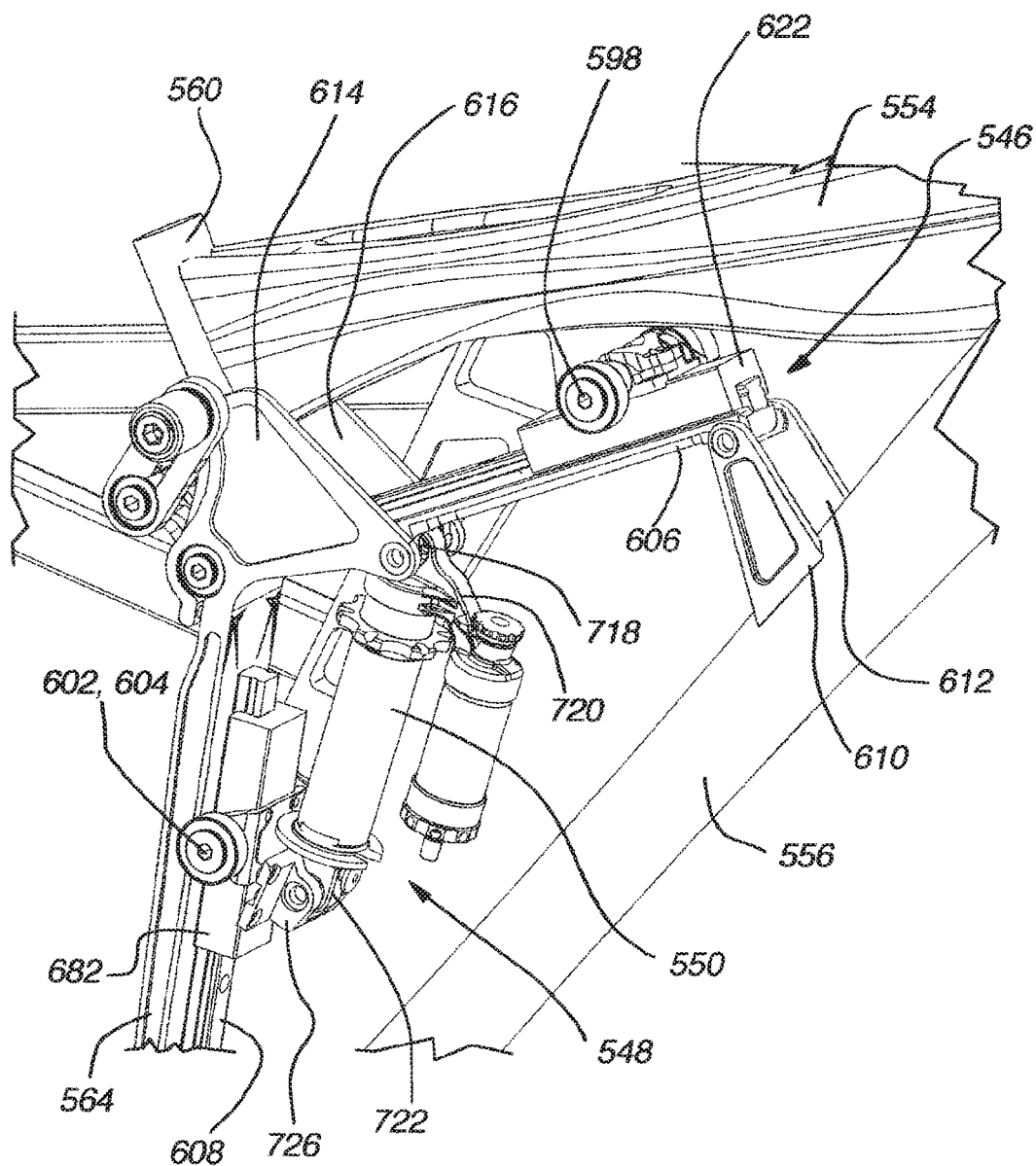
FIG. 30B is a detailed view of the rear suspension system shown in FIG. 30A with the right rear triangle removed.
Figure 30C:
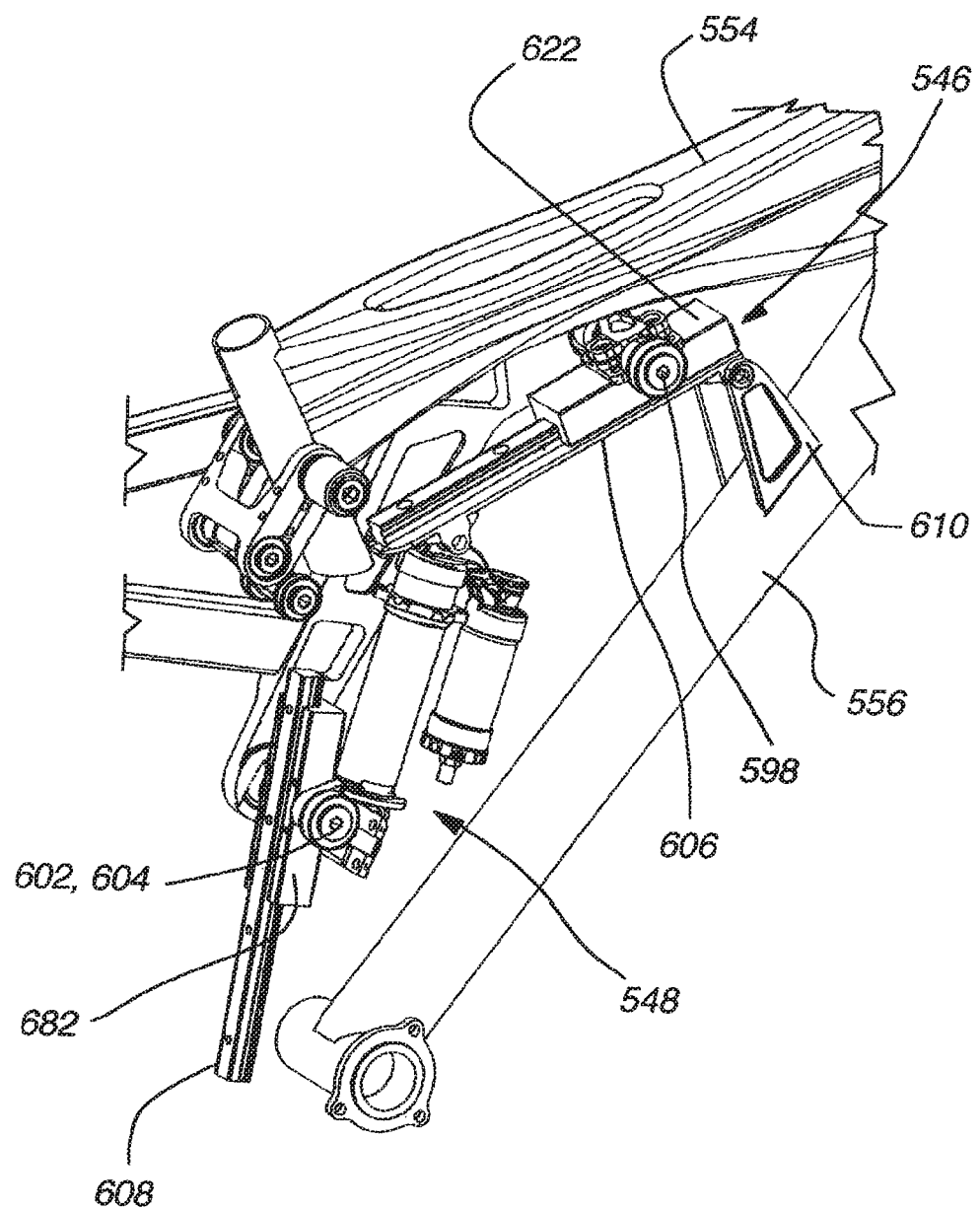
FIG. 30C is a detailed view of the rear suspension system shown in FIG. 30A with the right rear triangle removed.
Figure 31A:
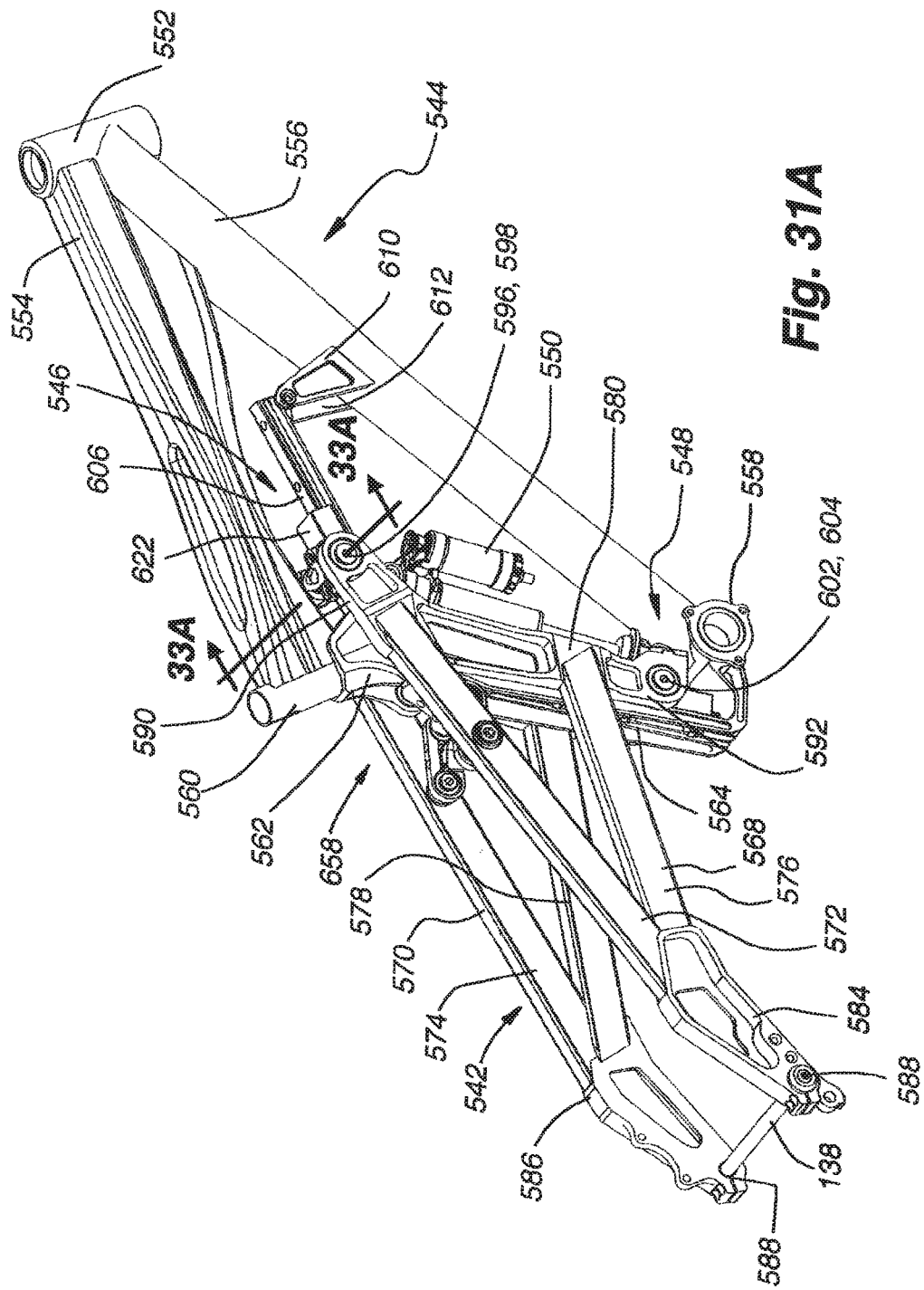
FIG. 31A is a right side isometric view of a front frame, rear frame, and rear suspension system shown in FIGS. 29A and 29B.
Figure 32B:
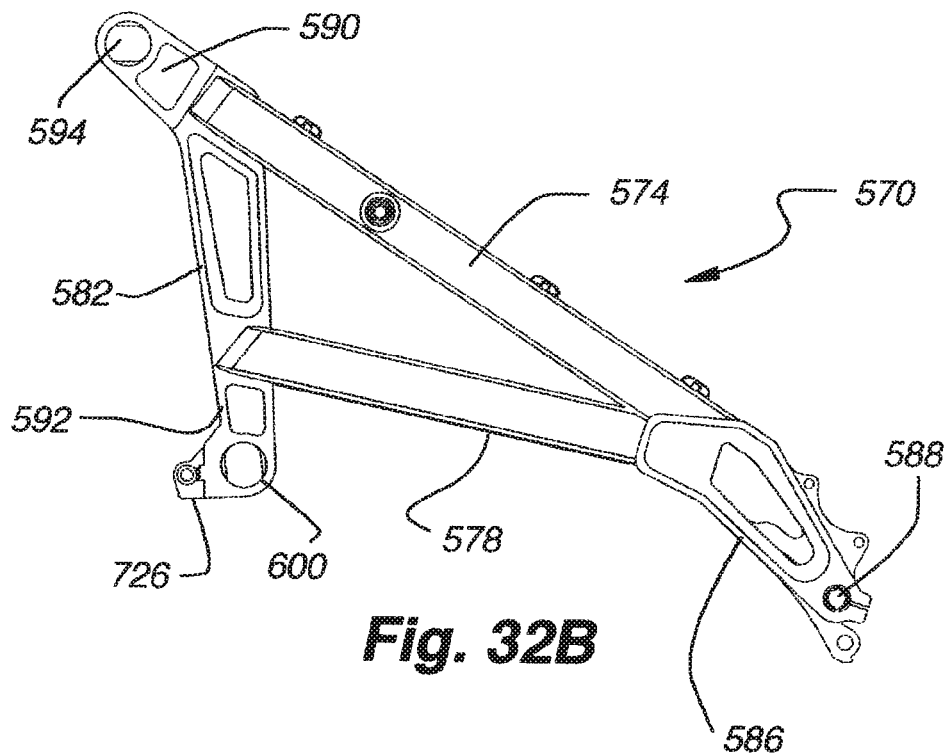
FIG. 32B is a left side view of a left rear triangle of the bicycle in FIG. 31A.
Figure 32A:
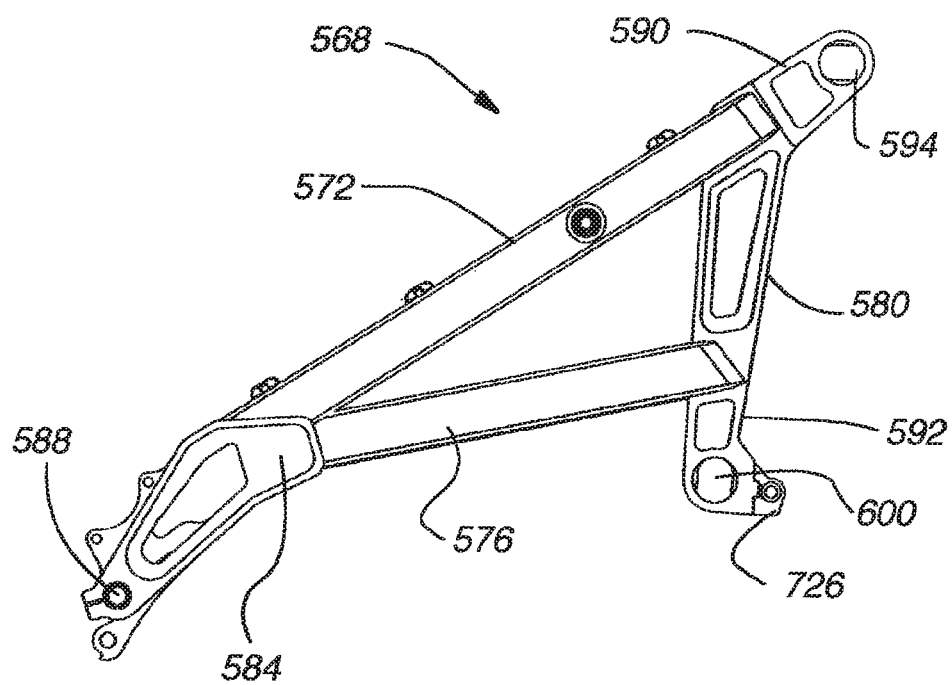
FIG. 32A is a right side view of a right rear triangle of the bicycle in FIG. 31A.
Figure 32C:
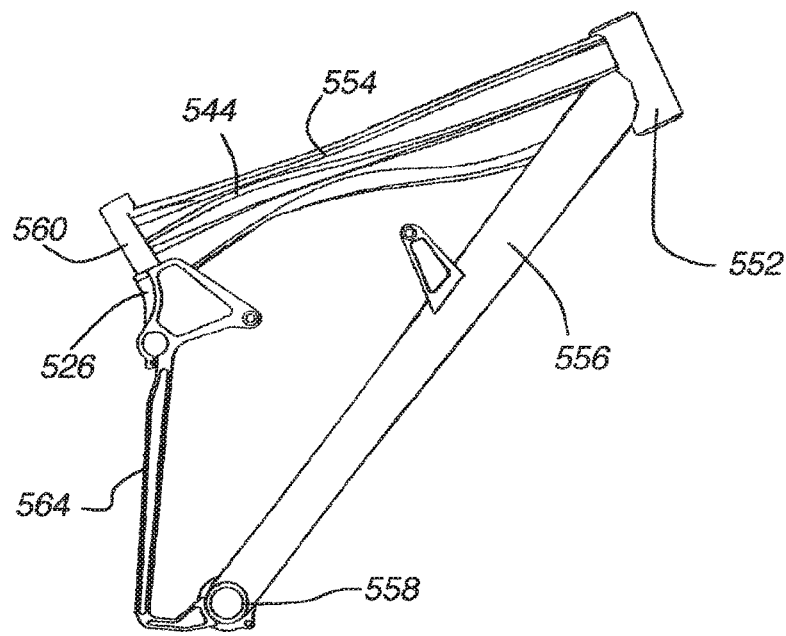
FIG. 32C is a right side view of a front frame of the bicycle in FIG. 31A.

The front frame 544 shown in FIGS. 29A-30A, 31A, and 32C is similar to the front frames described above. As such, the front frame includes a head tube 552, a top tube 554, a down tube 556, a bottom bracket 558, and a seat tube 560. The top tube 554 extends rearwardly from the head tube 552 to connect with the seat tube 560, and the down tube 556 extends rearwardly and downwardly from the head tube 552 to connect with the bottom bracket 558. As shown in FIGS. 31A and 32C, a hollow tubular upper portion 562 of the seat tube 560 extends downward from the top tube 554 and transitions to a solid lower portion 564 that connects with the bottom bracket 558. The seat or saddle 110 used to support the rider can be connected with the upper portion of the seat tube 560 as described above with reference to other embodiments.

Similar to the embodiments described above, the rear frame 542 shown in FIGS. 31A, 32A, and 32B also includes right and left rear triangles 568, 570. As such, right and left top members 572, 574, bottom members 576, 578, and forward members 580, 582 are connected together to form the respective right and left rear triangles. As shown in FIGS. 31A, 32A, and 32B, rear end portions of each top member 572, 574 are connected with rear end portions of each bottom member 576, 578. In addition, rear end portions of the top and bottom members are connected with triangularly-shaped rear joint members 584, 586. The right and left rear joint members each include rear axle apertures 588 adapted to receive and rotatably support the rear axle 138 of the rear wheel 106. As shown in FIGS. 31A, 32A, and 32B, the right and left forward members 580, 582 each includes an upper forward extension 590 connected with a base portion 592. Forward end portions of the top members 572, 574 are connected with the forward members 580, 582 near the intersection of the upper forward extensions 590 and the base portions 592. Forward end portions of the bottom members 576, 578 are connected with the base portions 592 of the forward members 580, 582. As discussed in more detail below, the upper forward extensions 590 of the right and left forward members 580, 582 each include a first pivot aperture 594 adapted to couple with a first pivot axle 596 defining a first pivot 598. In addition, the base portions 592 of the right and left forward members 580, 582 each include a second pivot aperture 600 adapted to couple with a second pivot bearing support 602 defining a second pivot 604, as discussed in more detail below. It is to be appreciated that the rear frame can be constructed from various types of material, such as aluminum, carbon, and titanium. The members used to construct the frame may also define a hollow tubular structure, or may be have a solid construction.

As with the previously described embodiments, the rear frame 542 of the rear suspension system 540 is coupled with the front frame 544 through first and second pivot translating assemblies 546, 548. As shown in FIGS. 30B-30C and 31A-31B, the first pivot translating 546 assembly includes a forward guide rail 606 adapted to guide the first pivot 598 along a range of motion, and the second pivot translating assembly 548 includes a rear guide rail 608 adapted to guide the second pivot 604 along a range of motion. As such, it is to be appreciated that the front frame 544 may include various structural elements used to support various components of the first and second pivot translating assemblies.

As shown in FIGS. 30B-30C and 31A-31B, the forward guide rail 606 is supported by right and left front rail brackets 610, 612 and right and left rear rail brackets 614, 616. As shown in FIG. 30B, the rear rail brackets 614, 616 are connected with and extend downward and forward from the intersection of the seat tube 560 and top tube 554. As discussed in more detail below, the shock assembly 550 is pivotally connected between the rear rail brackets. As shown in FIGS. 30B-30C, the right and left front rail brackets 610, 612 are connected with right and left sides of the down tube 556. A front end portion 618 of the forward guide rail 606 is connected with the right and left front track brackets 610, 612, and a rear end portion 620 of the forward guide rail 606 is connected with the right and left rear track brackets 614, 616.

As previously mentioned, the first pivot translating assembly 546 and the second pivot translating assembly 548 couple the rear frame 542 with the front frame 544. More particularly, the first pivot translating assembly 546 couples the upper forward extensions 590 of the right and left forward members 580, 582 of the rear triangles 568, 570 with the forward guide rail 606, and the second pivot translating assembly 546 couples the base portions 592 of the right and left forward members of the rear triangles with the rear guide rail 608.

Figure 33A:
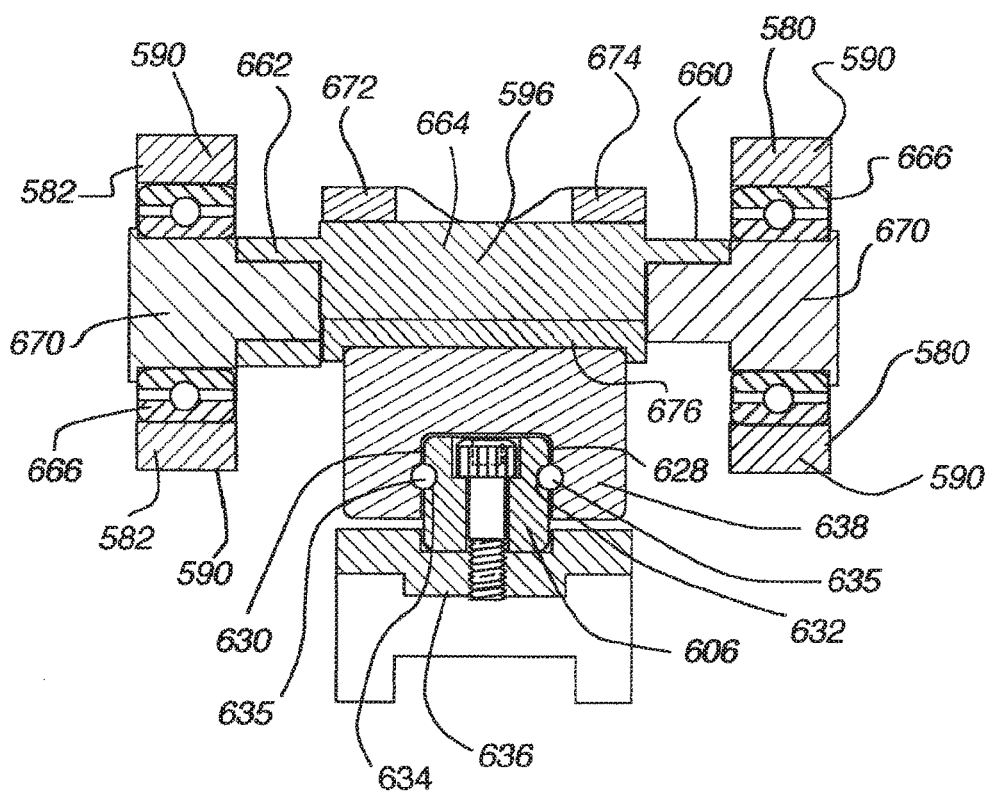
FIG. 33A is a cross-sectional view of a first pivot translating assembly depicted in FIG. 31A, taken along line 33A-33A.
Figure 33B:
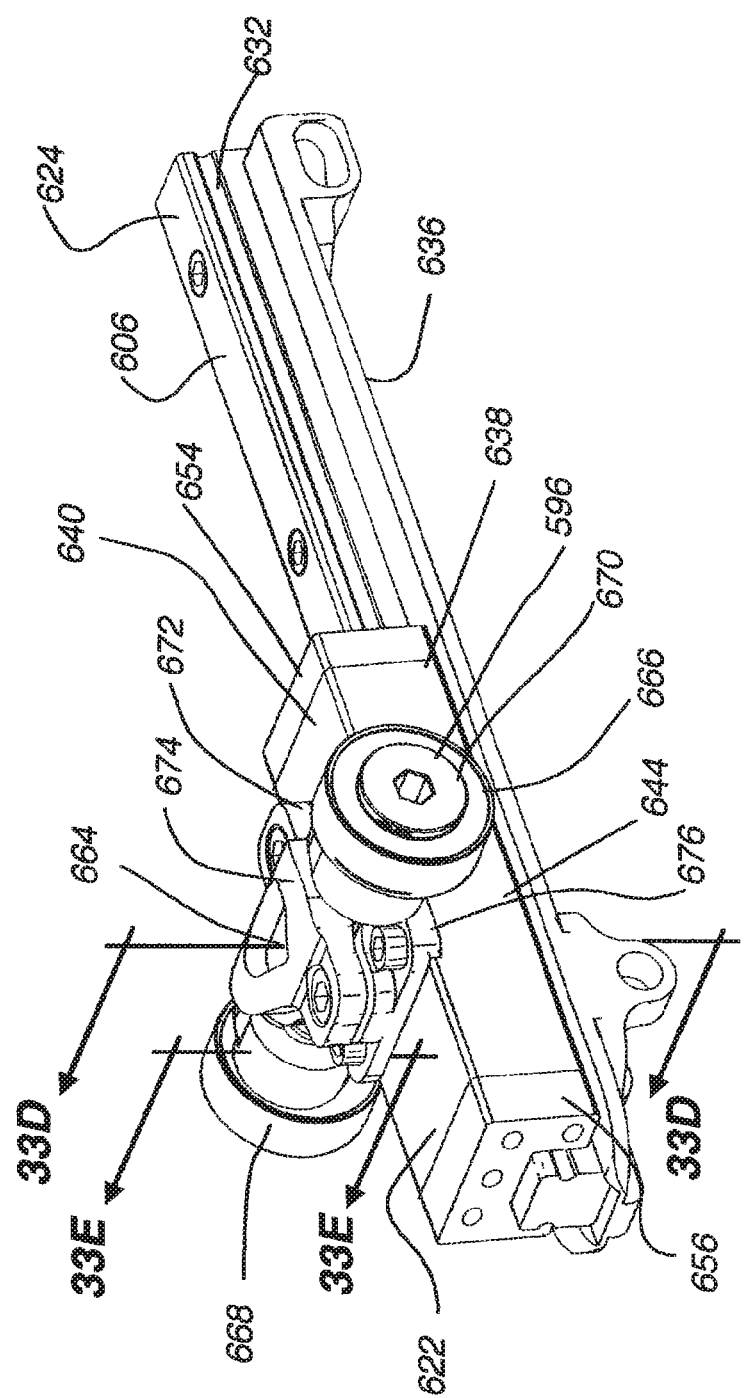
FIG. 33B is an isometric view of a forward track and forward slider link of the bicycle in FIG. 31A.
Figure 33C:
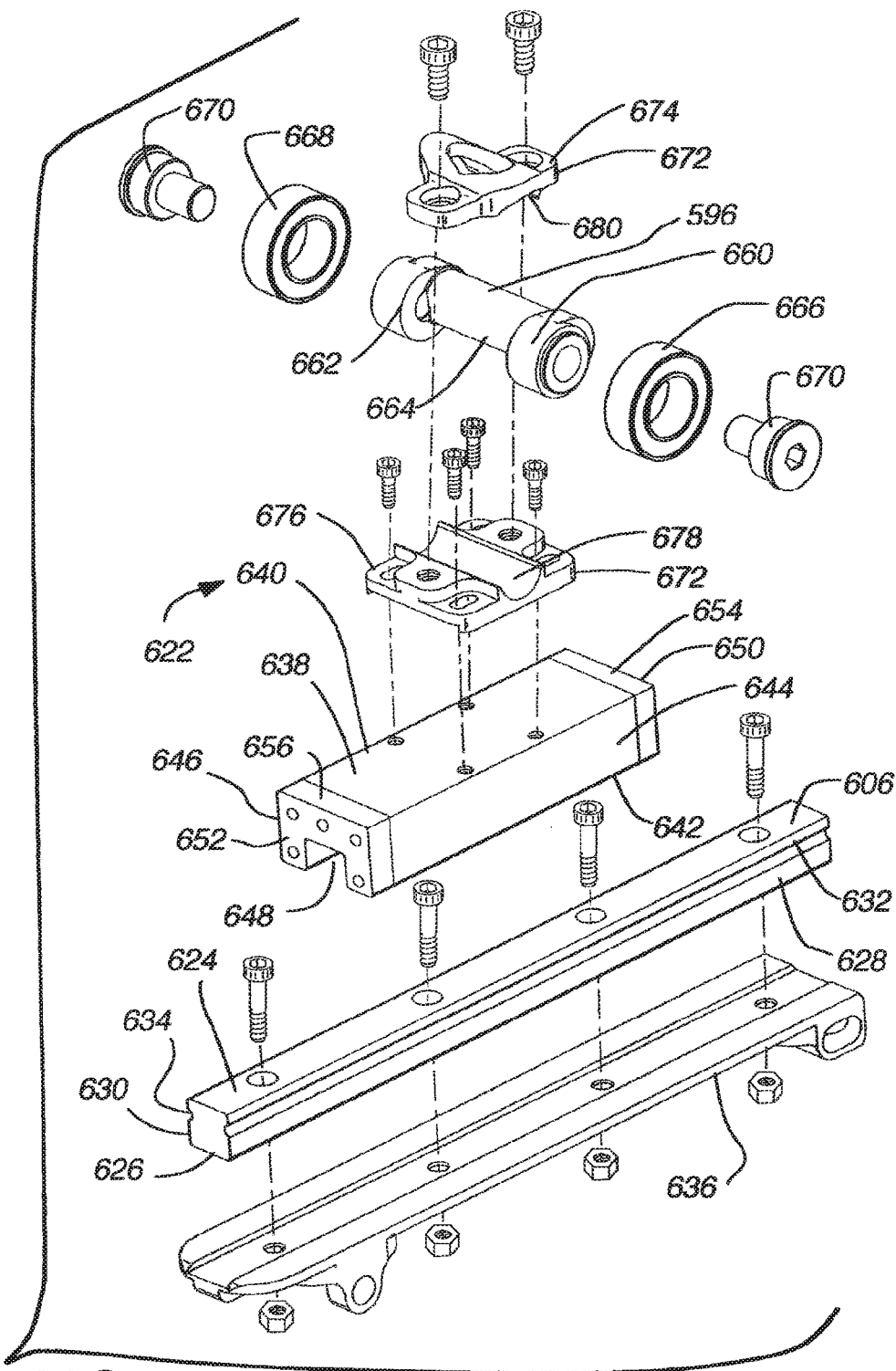
FIG. 33C is an exploded view of the forward track and forward slider link shown in FIG. 33B.
Figure 33D:
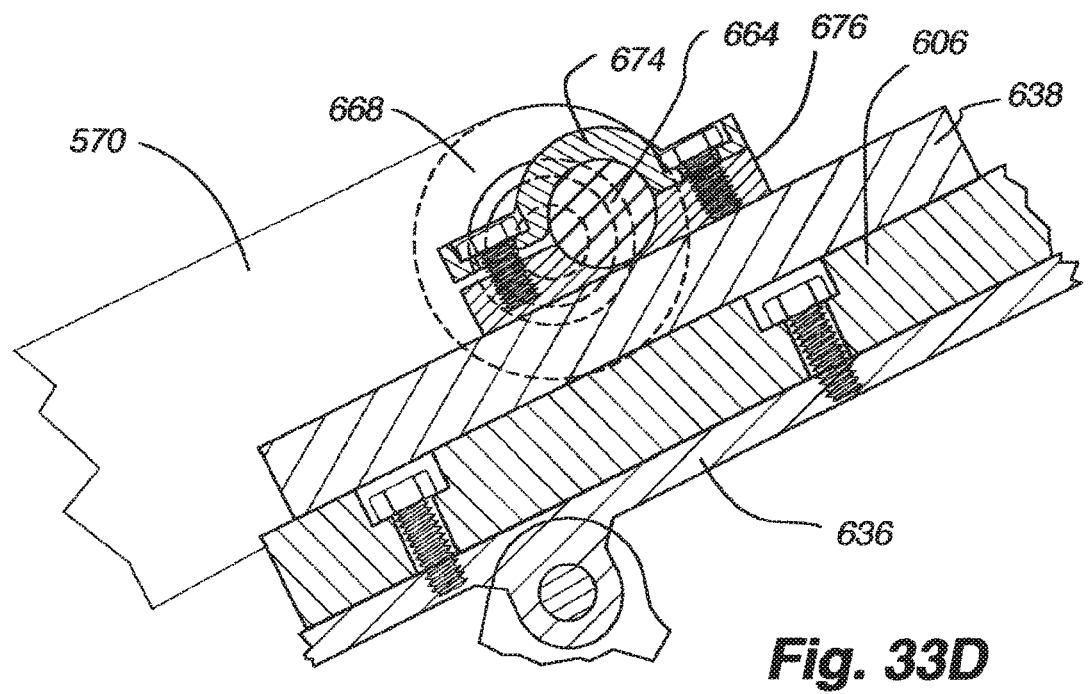
FIG. 33D is a cross-sectional view of a first pivot translating assembly depicted in FIG. 33B, taken along line 33D-33D.
Figure 33E:
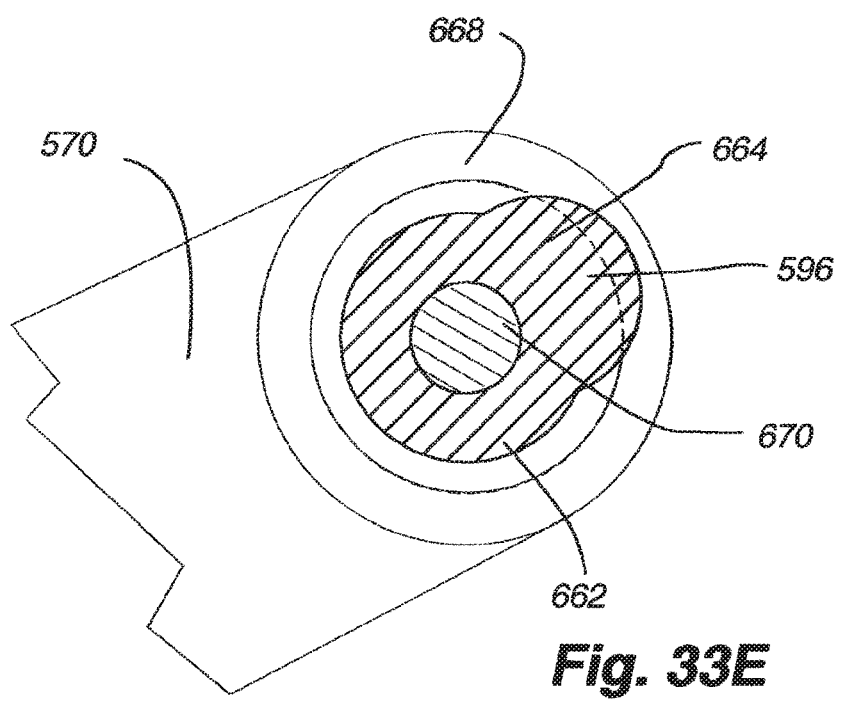
FIG. 33E is a cross-sectional view of a first pivot translating assembly depicted in FIG. 33B, taken along line 33E-33E.

As shown in FIGS. 29A-30A and 31A, the upper forward extensions 590 of the right and left forward members 580, 582 of the rear triangles 568, 570 are coupled with the forward guide rail 606 through a forward slider link 622. More particularly, the rear triangles are pivotally connected with the forward slider link 622, which is adapted to move back and forth along the forward guide rail 606. As shown in FIGS. 33A-33C, the forward guide rail 606 includes substantially flat top and bottom sides 624, 626 connected with and separated by right and left sides 628, 630. The right side 628 includes a right bearing groove 632, and the left side 630 includes a left bearing groove 634. As discussed below, the bearing grooves 632, 634 are adapted to rollingly receive bearings 635 in the forward slider link. The forward guide rail is connected with a guide rail support member 636, which in turn, is connected with the front rail brackets 610, 612 and the rear rail brackets 614, 616. As shown in FIGS. 33B and 33C, the forward slider link 622 includes a body 638 having relatively long and narrow top side 640, bottom side 642, right side 644, and left side 646 defining an elongated block shape. A groove 648 in the bottom side 642 of the forward slider link body 638 extends from a front side 650 to a rear side 652 and is adapted to receive a portion of the forward guide rail 606.

As previously mentioned, the forward slider link 622 is rollingly coupled with the forward rail 606 through bearings 635 supported in the groove 648 of the body 638. As such, the forward slider link can include seals and/or wipers to help prevent dust and dirt from reaching the bearings 635 inside the body 638. As shown in FIGS. 33B and 33C, a front seal assembly 654 is connected with the front side 650 of the forward slider link body 638, and a rear seal assembly 656 is connected with the rear side 652 of the forward slider link body. It is to be appreciated that various types of seal assemblies can be used with the forward slider link 622 to provide various degrees of protection to the bearings. For example, in one embodiment, the seal assemblies include a metal scraper for removing large particles from the guide rail and a laminated contact scraper for removing fine dust and fluids. Other embodiments include lubricators to lubricate the bearings and guide rail. It is also to be appreciated that the guide rail and slider link can be made from various types of materials. For example, in one embodiment, the guide rail is made from carbon steel and has a black chrome and fluorine resin coating. In another embodiment, the slider link body is made from carbon steel and includes a black chrome coating. As such, various combinations of slider links and rails can be used with the rear suspension system and is not limited that which is depicted and described herein. For example, one embodiment of the rear suspension system utilizes a guide rail and slider link from THK America, Inc. and having model number SHS15V1QZKKHHC1FM+ 220LF.

As previously mentioned, as the rear suspension system 540 moves in response to displacement of the rear wheel 106, the forward slider link 622 may move back and forth along a portion of the length of the forward guide rail 606. A comparison of the FIGS. 29A-29B with FIGS. 30A-30C shows how the forward slider link can move along the length of the forward guide rail. More particularly, FIGS. 29A-29B show the rear suspension system 540 in a relatively uncompressed stage and FIGS. 30A-30C show the rear suspension system in a relatively compressed stage. As such, the forward slider link 622 is shown in FIGS. 29A-29B as being located near a rear end portion of the forward guide rail 606, whereas FIGS. 30A-30C show the forward slider link near a front end portion of the forward guide rail. As the forward slider link 622 moves back and forth along the forward guide rail 606, the ball bearings 635 in the slider link body 638 roll back and forth along the grooves 632, 634 in the sides 628, 630 of the forward guide rail 606. It is to be appreciated that various types of bearings can be used to rollingly couple the forward slider link 622 with the forward guide rail 606. For example, one embodiment includes ball bearings made from martensitic stainless steel, which is similar to 440 stainless steel.

Although the bearings in the forward slider link 622 are free to roll back-and-forth along the right and left sides 628, 630 of the forward guide rail, forces acting on the rear suspension system 540 can result in forces that act on the forward slider link 622 in upward, downward, and lateral directions. Should the forward slider link 622 be subjected to forces in a lateral direction, either right or left with respect to the forward guide rail 606, the bearings will engage respective right and left sides 628, 630 of the forward guide rail 606, which will act to prohibit the forward slider link from disengaging the guide rail. Further, in response to upward and downward forces exerted on the forward slider link 622, the bearings will engage the upper and lower edges of the grooves 632, 634 on the sides 628, 630 of the forward guide rail 606. In this manner, the forward slider link is prevented from disengaging the forward guide rail. As described below, the bicycle 538 can also include a stiffener 658 connected with the front frame 544 and rear frame 546 that is adapted to absorb moment loads that would otherwise be exerted on the forward slider link and associated bearings.

As previously mentioned, the forward slider link 622 is pivotally connected with the right and left rear triangles 568, 570 through the first pivot axle 596. As described in more detail below with reference to FIGS. 33B-33E, the right and left rear triangles 568, 570 are connected with eccentric end portions of the first pivot axle 596. As such, rotation of the first pivot axle and the eccentric end portions can raise or lower the upper forward extensions 590 of the right and left forward members 580, 582, which in turn, raises or lowers the height of the bottom bracket 558 relative to the ground. In addition, rotation of the first pivot axle and eccentric end portions can affect the slope of the head tube 552 relative to the ground. Therefore, depending on the rider's preference, the first pivot axle 596 can be rotated to a yield a different frame geometry as well as different performance characteristics of the bicycle. For example, a recreational rider may prefer a relatively high bottom bracket height for riding over rough terrain so as to help avoid contact with rocks and the like. In another example, a professional rider may prefer a relatively low bottom bracket height providing a relatively lower center of gravity, which in turn, allows for better cornering at higher speeds.

As shown in FIGS. 33B-33E, the first pivot axle 596 includes right and left disk-shaped end portions 660, 662 that are eccentrically connected with opposing ends of a cylindrically-shaped central portion 664. More particularly, centers of the disk-shaped end portions 660, 662 are aligned with each other, but are offset from a longitudinal axis of the central portion 664 of the first pivot axle 596. As shown in FIGS. 33B and 33C, right and left pivot 666, 668 bearings which are adapted to connect with the first pivot apertures 594 in the right and left rear triangles 568, 570 are rotatably supported by end bolts 670 connected with the right and left end portions 660, 662 of the first pivot axle. As such, the right and left rear triangles 568, 570 can pivot relative to the first pivot axle 596.

As shown in FIGS. 33B-33E, the first pivot axle 596 is rotatably connected with the top side 640 of the forward slider link body 638 through an axle support 672. The axle support 672 includes a top portion 674 and a bottom portion 676. The bottom portion 676 includes a lower groove 678 and is bolted to the top side 640 of the slider link body 638 with the lower groove 678 facing upward. The top portion 674 of the axle support 672 includes an upper groove 680 and is bolted to the bottom portion 676 with the upper groove 680 facing downward. When the top and bottom portions 674, 676 of the axle support 672 are connected, the upper groove 680 and the lower groove 678 form a cylindrically-shaped aperture adapted to rotatably receive and support the central portion 664 of the first pivot axle 596.

As previously mentioned, the first pivot axle 596 can be rotated to adjust the height of the bottom bracket 558 relative to the ground. Because the end portions 660, 662 of the first pivot axle 596 are eccentrically connected with opposing ends of the central portion 664, the end portions move along arcuate paths as the first pivot axle rotates. As such, the first pivot apertures 594 in the right and left rear triangles 568, 570 move along with the end portions of the first pivot axle 596, which in turn, raises or lowers the height of the bottom bracket relative to the ground. It is to be appreciated that the first pivot axle 596 can be configured in various ways to provide different ranges of bottom bracket height adjustments. For example, in one embodiment with no rider seated on the bicycle, a first rotational position of the first pivot axle provides for a maximum bottom bracket height of 15 inches and a second rotational position of the first pivot axle provides a minimum bottom bracket height of 13.75 inches. It is also to be appreciated that other embodiments of the first pivot translating assembly do not provide for bottom bracket height adjustments, and as such, the first pivot axle need not include eccentrically connected end portions.

Figure 34A:
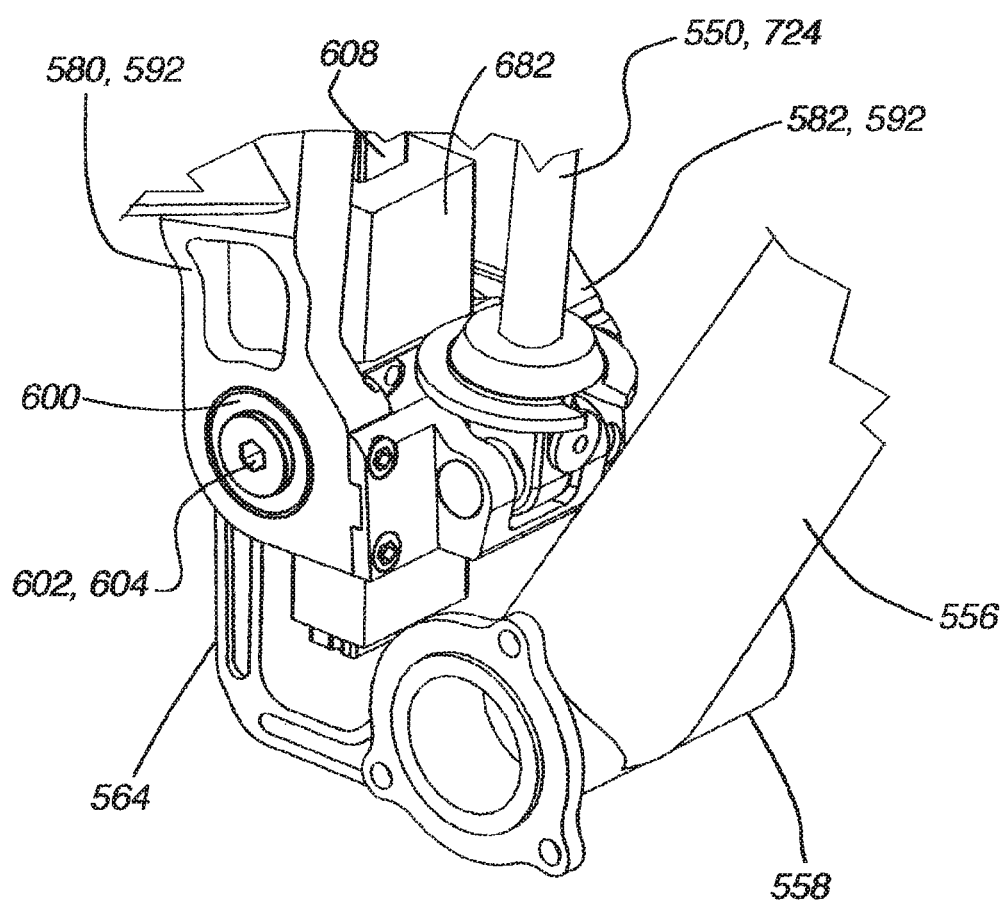
FIG. 34A is a detailed view of a rear guide rail and rear slider link of the bicycle in FIG. 31A.
Figure 34B:
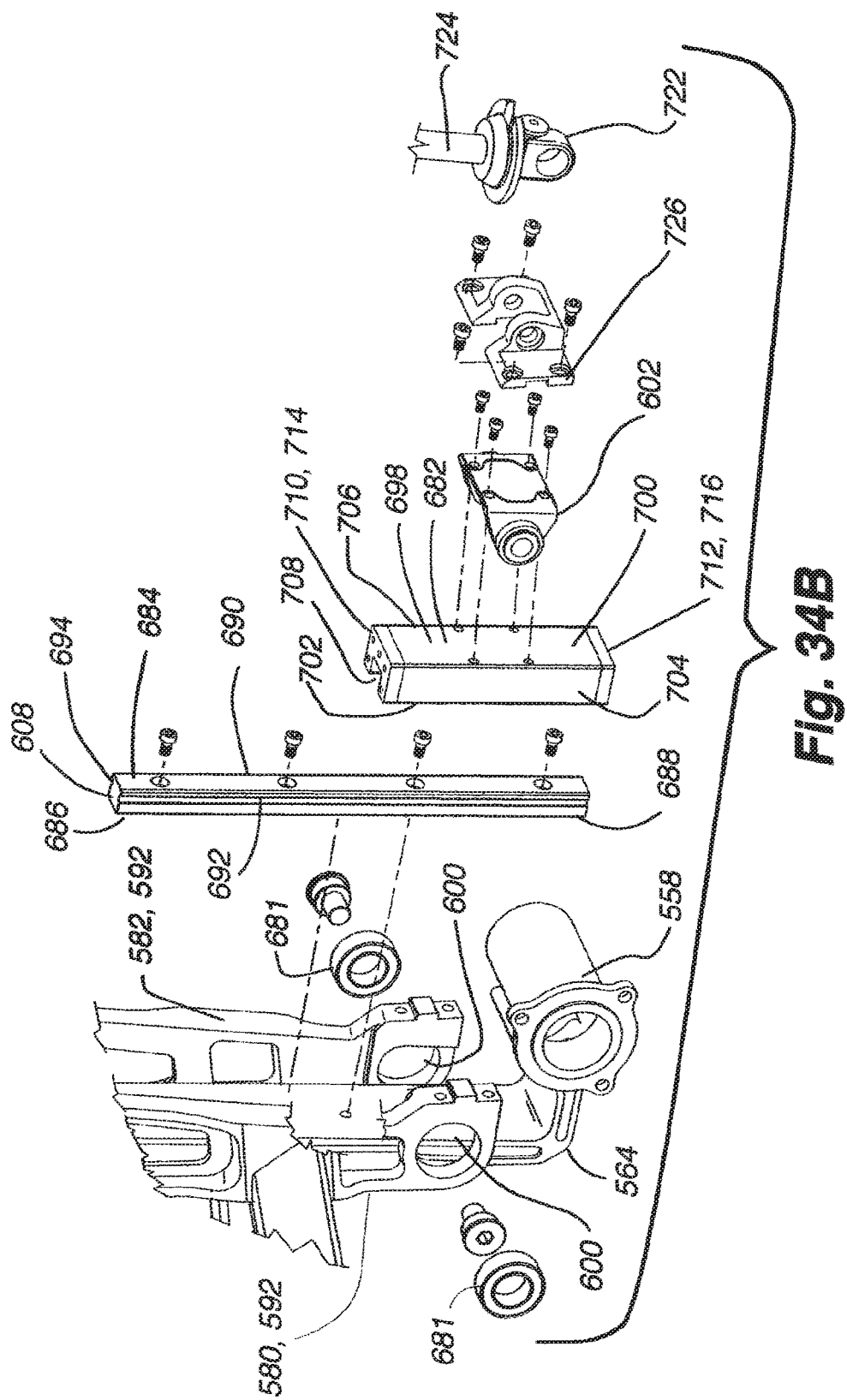
FIG. 34B is an exploded view of the rear guide rail and rear slider link shown in FIG. 34A.

As previously mentioned, the second pivot translating assembly couples the base portions 592 of the right and left forward members 580, 582 of the rear triangles 568, 570 with the rear guide rail 608. As shown in FIGS. 34A and 34B, the base portions 592 of the forward members 580, 582 are coupled with the rear guide rail 608 through a rear slider link 682. As shown in FIGS. 34A and 34B, bearings 681 received within the second pivot apertures 600 in the base portions of the forward members 580, 582 pivotally couple the rear triangles with the rear pivot bearing support member 602, which in turn, is bolted to the rear slider link 682. As such, the rear triangles 568, 570 are pivotally connected with the rear slider link 682, which is adapted to move back and forth along the rear guide rail 608. As shown in FIGS. 30B and 34A-34B, the rear guide rail 608 is bolted to the lower portion 564 of the seat tube 560. The rear guide rail 608 is similar to the forward guide rail 606, and as such, includes substantially flat front and rear sides 684, 686 connected with and separated by right and left sides 688, 690. The right side 688 includes a right bearing groove 692, and the left side 690 includes left bearing groove 694. As discussed below, the bearing grooves 692, 694 are adapted to rollingly receive bearings in the rear slider link. As shown in FIGS. 34A and 34B, the rear slider link 622 includes a body 698 having a relatively long and narrow front side 700, rear side 702, right side 704, and left side 706 defining an elongated block shape. A groove 708 in the rear side 702 of the rear slider link body 698 extends from a top side 710 to a bottom side 712 and is adapted to receive a portion of the rear guide rail 608.

The rear slider link 682 and rear guide rail 608 have a similar bearing configuration to that discussed above with respect to the forward slider link 622 and forward guide rail 606. As such, the rear slider link 682 is rollingly coupled with the rear guide rail 608 through bearings supported in the groove 708 of the body 698. As discussed above with reference to the forward slider link, the rear slider link can include seals and/or wipers to help prevent dust and dirt from reaching the bearings inside the body 698. As shown in FIGS. 34A and 34B, a top seal assembly 714 is connected with the top side 710 of the rear slider link body 698, and a bottom seal assembly 716 is connected with the bottom side 712 of the rear slider link body. As discussed above with reference to the forward slider link, it is to be appreciated that various types of seal assemblies can be used with the rear slider link to provide various degrees of protection to the bearings. Also, as described above with reference to the forward slider link and forward guide rail, it is to be appreciated that the guide rail and slider link can be made from various types of materials.

As previously mentioned, as the rear suspension system 540 moves in response to displacement of the rear wheel 106, the rear slider link 682 may move back and forth along a portion of the length of the rear guide rail 608. A comparison of the FIGS. 29A-29B with FIGS. 30A-30C shows how the rear slider link can move along the length of the rear guide rail. FIGS. 29A-29B show the rear suspension system 540 in a relatively uncompressed stage, and FIGS. 30A-30C show the rear suspension system in a relatively compressed stage. As such, the rear slider link 682 is shown in FIGS. 29A-29B as being located near a bottom end portion of the rear guide rail 608, whereas FIGS. 30A-30C show the rear slider link near a top end portion of the rear guide rail. As the rear slider link 682 moves back and forth along the rear guide rail 608, the ball bearings in the slider link body 698 roll back and forth along the grooves 692, 694 in the sides 688, 690 of the rear guide rail 608. As discussed above with reference to the forward slider link, it is to be appreciated that various types of bearings can be used to rollingly couple the rear slider link 682 with the rear guide rail 608.

Although the bearings in the rear slider link 682 are free to roll back-and-forth along the sides 688, 690 of the rear guide rail 608, forces acting on the rear suspension system can result in forces that act on the rear slider link 682 in forward, rearward, and lateral directions. Should the rear slider link 682 be subjected to forces in a lateral direction, either right or left with respect to the rear guide rail 608, the bearings will engage respective right and left sides 688, 690 of the rear guide rail, which will act to prohibit the rear slider link 682 from disengaging the rear guide rail 608. Further, in response to forward and rearward forces exerted on the rear slider link 682, the bearings will engage forward and rear edges of grooves 692, 693 on the sides 688, 690 of the rear guide rail 608. In this manner, the rear slider link 682 is prevented from disengaging the rear guide rail 608. As previously mentioned and as described below, the stiffener 658 connected with the front frame 544 and the rear frame 542 is adapted to absorb moment loads that would otherwise be exerted on the rear slider link and associated bearings.

Figure 31B:
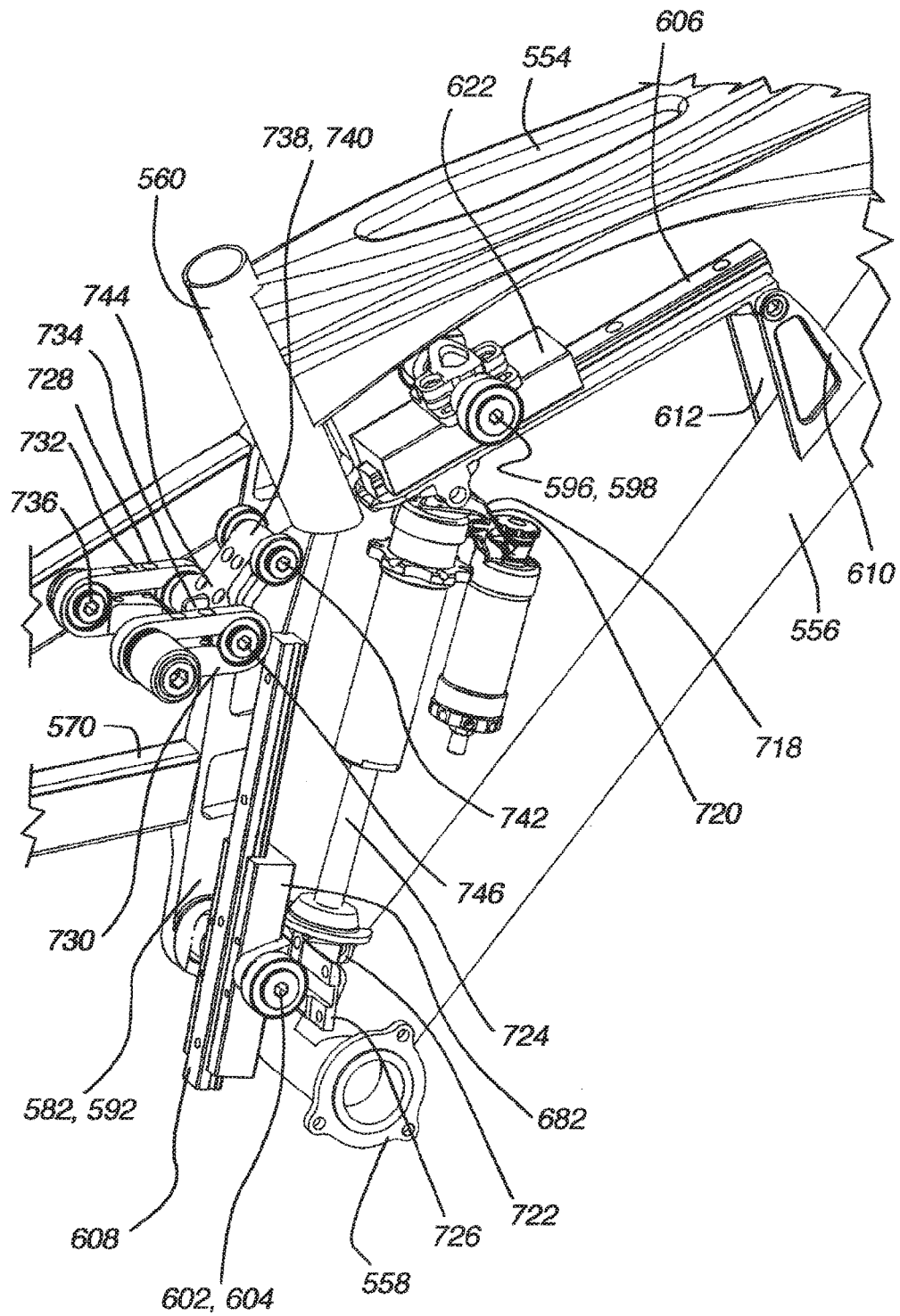
FIG. 31B is a detailed view first and second pivot translating assemblies shown in FIG. 31A with a right rear triangle removed.

As described above with reference to other embodiments, the rear suspension system 540 also includes the shock assembly 550 similar to that described above with reference to FIGS. 13A-13B. As such, the shock assembly 364 includes many of the same component parts described above with reference to FIGS. 13A-13B. As shown in FIG. 30B, an eyelet 718 located on a body cap 720 is connected between the right and left rear rail brackets 614, 616. As such, the shock assembly is pivotally connected with the rail brackets, and therefore, can pivot relative to the front frame 544. As shown in FIGS. 31A-30B and 31B, an eyelet 722 located on the piston shaft 724 of the shock assembly 550 is pivotally connected with the base portions 592 of the forward members 580, 582 of the rear triangles 568, 570. More particularly, the eyelet 772 is adapted to receive a bolt connecting the shock assembly 550 with a connection plate 726, which in turn, is bolted to the base portions 592 of the forward members 580, 582 of the rear triangles 568, 570 adjacent the second pivot 604. As such, when the rear slider link 682 and second pivot 604 move up and down, the piston shaft 724 is pushed upward and pulled downward. As shown in FIGS. 29A and 29B, the shock assembly can also include a compression spring 727. For clarity, the compression spring is not shown in some figures.

As previously mentioned with respect to the other embodiments, it is to be appreciated that the shock assembly 550 need not be connected in the manner described and depicted above. As such, although the shock assembly 550 can be configured to couple the front frame 544 with the rear frame 542, the shock assembly need not directly couple the front frame with the rear frame. For example, in other embodiments of the present invention, the shock assembly can be connected with the front frame and the first pivot translating assembly 546 or with the front frame and the second pivot translating assembly 548.

During use of the bicycle, forces exerted on the front frame 544 and rear frame 542 of the bicycle 538 can cause the front and rear frames to twist relative each other, producing moment loads on the connection structures (e.g. the first and second pivot translating assemblies 546, 548) between the front and rear frames. As previously mentioned, the bicycle 538 can include the stiffener assembly 658 adapted to absorb the moment loads that would otherwise be exerted on the forward and rear slider links 622, 682, guide rails 606, 608, and associated components. As discussed in more detail below, the stiffener assembly 658 pivotally couples the front frame with the rear frame without limiting the relative movements of the various components of the first and second pivot translating assemblies.

As shown in FIGS. 31A and 31B, the stiffener assembly 658 includes a U-shaped rear pivot link 728 having right and left extended portions 730, 732 connected with and separated by a base portion 734. The right and left extended portions 730, 732 are pivotally connected with the right and left top members 572, 574 of the rear triangles 568, 570, respectively. The pivotal connections between rear pivot link 728 and the rear triangles 568, 570 define a rear stiffener pivot 736. The stiffener assembly 658 also includes a forward pivot link 738 having a first end portion 740 pivotally connected with the front frame 544 adjacent a rear side of the seat tube 560. The pivotal connection between the forward pivot link 738 and the front frame 544 defines a forward stiffener pivot 742. A second end portion 744 of the forward pivot link 738 is pivotally connected with the base portion 734 of the rear pivot link 728, defining a connection pivot 746. The pivotal connections between the forward pivot link 738, rear pivot link 728, front frame 544, and rear frame 542 allow relative movement between the front frame and rear frame in horizontal and vertical directions. However, the pivotal connections between the forward pivot link, rear pivot link, front frame, and rear frame help prevent relative movement between the front frame and rear frame in lateral directions, either right or left. More particularly, forces exerted on the front frame 544 and rear frame 542 in lateral directions that would otherwise cause the frames to twist relative to each other are absorbed by the stiffener assembly 658, as opposed to the first and second pivot translating assemblies 546, 548.

As previously mentioned, the rear suspension system 540, and in particular, the first and second pivot translating assemblies 546, 548 operate or move in a similar manner as described above with respect to the other embodiments. Therefore, the rear suspension system 540 can also be configured to provide for adjustable wheel paths and/or leverage ratios. For example, as described above with reference to the first embodiment, the travel path of the first pivot 598 and/or second pivot 604, and, in turn, the travel path of the rear wheel 106 can be adjusted by changing the shape and/or orientation of the forward and rear guide rails 606, 608. It is also to be appreciated that the forward and rear guide rail shapes and/or orientations can be modified without the need for removal and replacement. For example, a screw or worm gear-type arrangement connected between the frame and the forward and/or rear guide rails can be used to maneuver the guide rails into various orientations with respect to the frame.

Figure 35A:
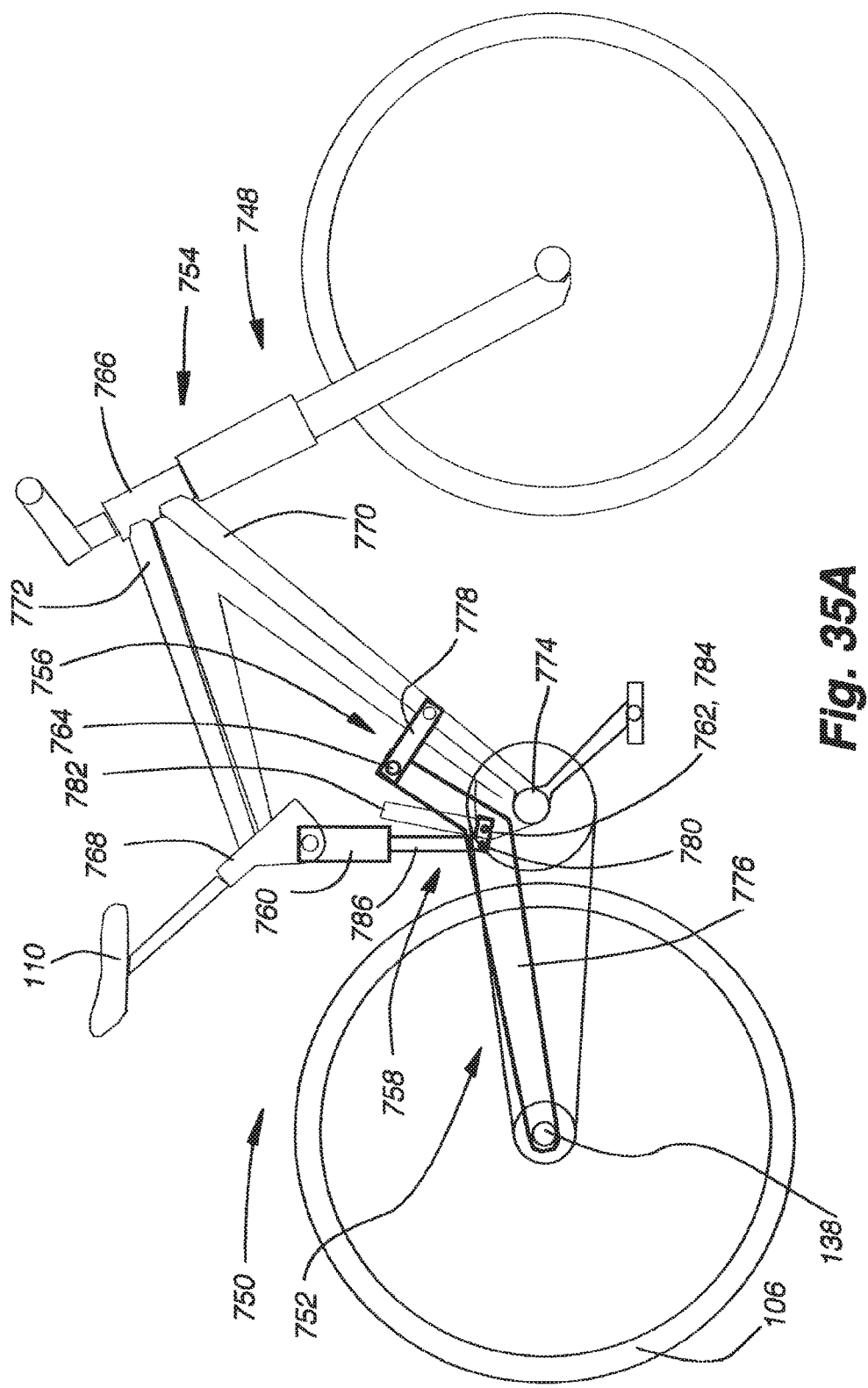
FIG. 35A is a schematic representation of the rear suspension system according to a third embodiment of the invention in a relatively first non-compressed stage.
Figure 35B:
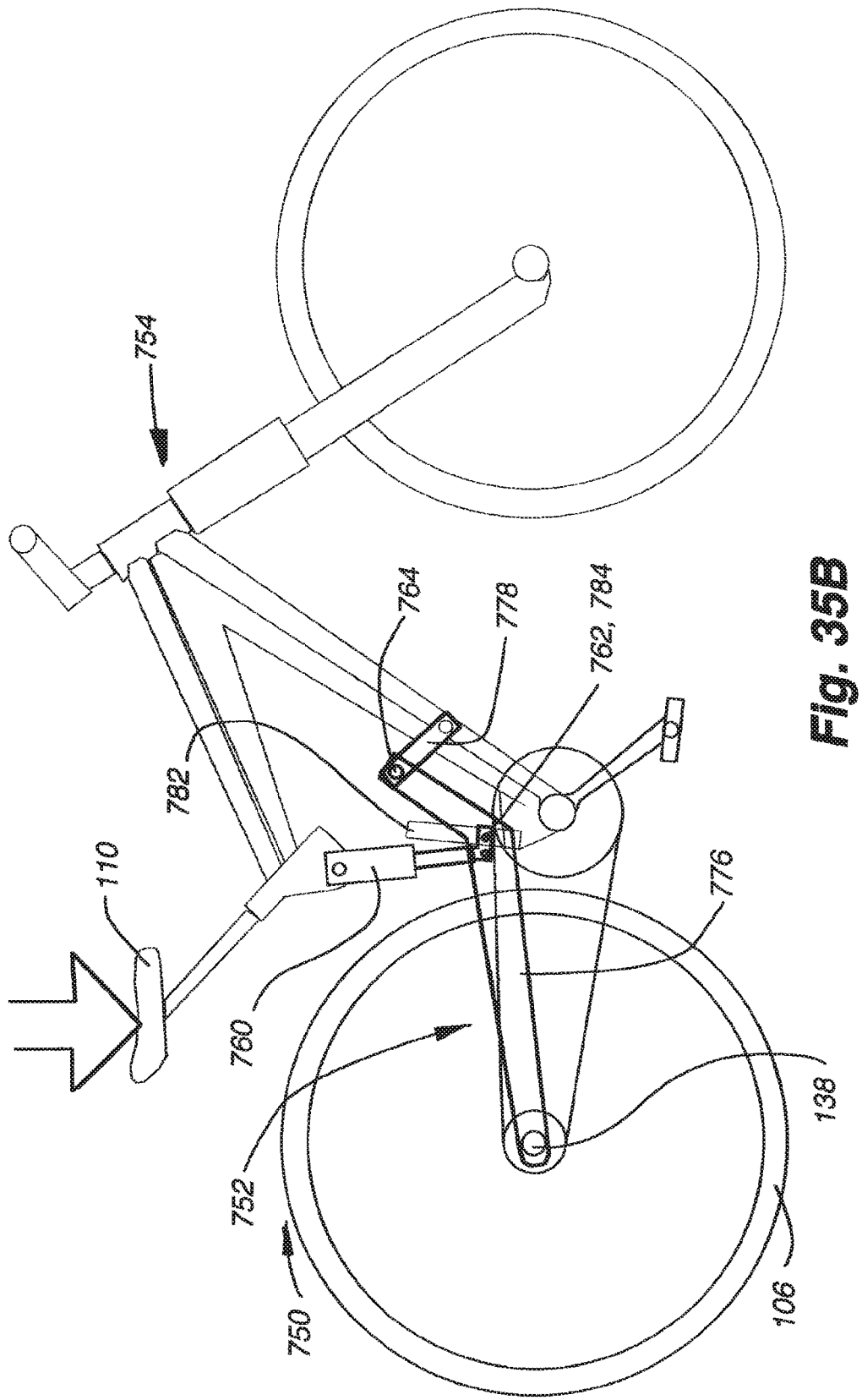
FIG. 35B depicts the rear suspension system of FIG. 35A in a second partially compressed stage.
Figure 35C:
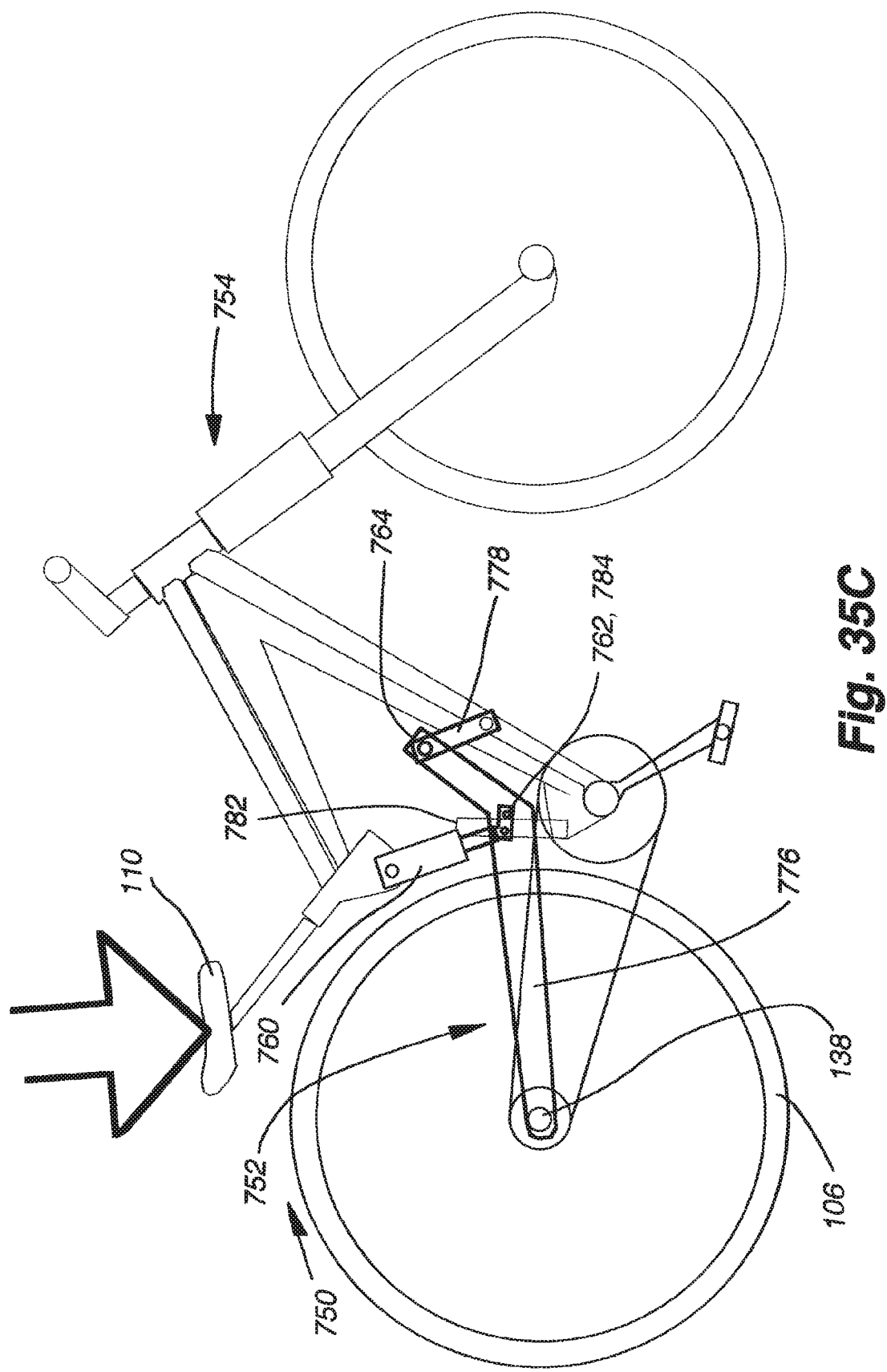
FIG. 35C depicts the rear suspension system of FIG. 35A in a third more fully compressed stage.

A schematic representation of a bicycle 748 including a fourth embodiment 750 of the rear suspension system is depicted in FIGS. 35A-35C. Similar to the embodiments described above, the rear suspension system 750 shown in FIGS. 35A-35C couples a rear frame 752 coupled with a front frame 754 of the bicycle 748 through a first pivot translating assembly 756 and a second pivot translating assembly 758. The rear suspension system 750 also includes a shock assembly 760, which can be configured to couple the front frame 754 with the rear frame 752. As with the other embodiments, it is to be appreciated that the shock assembly need not directly couple the front frame with the rear frame, and can be connected with the front frame and the first pivot translating assembly or the second pivot translating assembly. The rear frame 752 is also pivotally coupled with the front frame 754 at a second pivot 762 through a slider link and rail configuration similar to that described above with reference to the first embodiment. However, the fourth embodiment structurally varies from the above described embodiments in several ways. For example, the first pivot translating assembly 756 of the fourth embodiment of the rear suspension system 750 differs structurally from the first pivot translating assemblies discussed above. In particular, as opposed to coupling the rear frame with the front frame at the first pivot through a forward track, the rear frame 752 is coupled with the front frame at a first pivot 764 through swing links. As described in more detail below, the rear frame is also configured differently than the above described embodiments.

As shown in FIGS. 35A-35C, the front frame 754 is configured similar to the front frame described above with reference to the first embodiment. As such, the front frame includes similar component parts described above, such as a head tube 766, seat tube 768, down tube 770, top tube 772, and bottom bracket 774. As shown in FIGS. 35A-35C, the rear frame 752 includes right and left main swing arms 776. Although the FIGS. 35A-35C only show the right side components of the rear suspension system, it is to be appreciated that the left side components are substantially mirror images of the right side components and move in like fashion. As such, descriptions of the right side components are also applicable to the left side components.

As shown in FIGS. 35A-35C, forward end portions of the main swing arms 776 are pivotally coupled with the front frame 754 through the first pivot translating assembly 756. The first pivot translating assembly 756 includes right and left swing links 778. Forward end portions of the main swing arms 776 are pivotally connected with the swing links 778, which in turn, are pivotally connected with the down tube 770. In addition, middle portions of the main swing arms 776 are pivotally coupled with front frame through the second pivot translating assembly 758. As previously mentioned, the second pivot translating assembly 758 is similar to that described above with reference to the first embodiment and, as such, includes a slider link 780 coupled with right and left guide rails 782 that are connected with the front frame 754.

As previously mentioned and as shown in FIGS. 35A-35C, lower end portions of the swing links 778 are pivotally connected on opposing sides of the down tube 770 near the bottom bracket 774. It is to be appreciated that the swing links 778 can be pivotally connected with the down tube 770 in various ways. For example, in embodiment, the swing links are pivotally connected with the down tube through a link axle inserted through the down tube. In such a configuration, connection ends of the link axle protrude from opposite sides of the down tube. Connection apertures in the swing links rotatably receive the connection ends of the link axle. In another example, bosses are welded on opposite sides of the down tube with link pins protruding therefrom for engagement with the connection holes on the swing links. It is also to be appreciated that although the above configuration includes right and left swing links, other embodiments can include a single swing link. It is also to be further appreciated that the swing links can be pivotally connected with front frame components other than the down tube. For example, in other embodiments, the swing links can be pivotally connected with the head tube or the top tube.

Still referring to FIGS. 35A-35C, upper portions of the swing links 778 are pivotally connected with forward end portions of the main swing arms 776, respectively, which defines the first pivot 764. The main swing arms extend 776 rearwardly and downwardly from the first pivot 764 to the slider link 780. The slider link 780 is rotatably connected with middle portions of the main swing arms 776 through a second pivot axle 784, which defines the second pivot 762. Similar to the first embodiment, the slider link 780 is adapted to move up and down along the guide rails 782. From the second pivot 784, the main swing arms extend rearwardly and downwardly to rear end portions having rear axle apertures that support the rear axle 138 of the rear wheel 106. As such, the rear wheel 106 is rotatably connected between the rear end portions of the main swing arms. As previously mentioned, the shock assembly 760 of the fourth embodiment of the rear suspension system is pivotally connected with the front frame 754 and the slider link 780 as discussed above with reference to the first embodiment. Although the rear frame shown in FIGS. 35A-35C includes right and left main swing arms, it is to be appreciated that other embodiments can include a single main swing arm. It is also to be appreciated that main swing arms can be constructed from various types of material, such as aluminum, carbon, and titanium. The members used to construct the main swing arms may also define a hollow tubular structure, or may be have a solid construction.

As previously discussed, when a rider encounters rough terrain or jumps the bicycle 748, impact forces can act in a generally upward direction on the rear wheel 106. In turn, the forces are translated to the main swing arms 776 through the rear axle 138. The forces cause displacement of the main swing arms 776 in a direction dictated by the geometric parameters and structure of the rear suspension system 750. Geometric parameters that might have an effect on the displacement path of the main swing arms and rear wheel can include the locations of the first and second pivots 764, 762; the lengths of the swing links 778; the shapes and/or lengths of the main swing arms 776; and the shapes, lengths, and/or orientations of the guide rails 782.

FIGS. 35A-35C show the rear suspension system 750 in varying stages of compression. More particularly, FIG. 35A shows the rear wheel 106 and rear suspension system 750 in a first non-compressed stage. As illustrated, the first pivot 764 is in a first position with the swing links 778 near a 10 o'clock position (as viewed from the right side of the bicycle), and the second pivot 762 is in a first position near bottom ends of the guide rails 782. In addition, the shock assembly 760 is shown in a first stage of compression. An upward force applied to the rear wheel 106 or a downward force applied to the seat 110, such as when a rider sits on the bicycle, can place the rear suspension system in a second partially compressed stage as shown in FIG. 35B.

A comparison of FIG. 35A with FIG. 35B shows that the first pivot 764 has moved upward and forward as the swing links 778 rotate clockwise (as viewed from the right side of the bicycle) from the initial position in FIG. 35A. At the same time, the slider link 780 and slider axle 784 (second pivot 762) has moved upward along the length of the guide rails 782 to a second position between the bottom and top ends of the guide rails. The upward movement of the slider link 780 also forces a piston shaft 786 of the shock assembly 760 upward to place the shock assembly in a second stage of compression. In addition, as the rear suspension system 750 moves from the first non-compressed stage to the second partially non-compressed stage, the main swing arms 776 of the rear frame pivot 752 around the second pivot 762 in a clockwise direction (as viewed from the right side of the bicycle).

A relatively large upward force applied to the rear wheel 106 or a relatively large downward force applied to the seat 110, such as when the rider and the bicycle land on the ground after riding over a jump, can place the rear suspension system 750 in a third more fully compressed stage as shown in FIG. 35C. A comparison of FIG. 35B with FIG. 35C, shows that the first pivot 764 has moved further upward and forward as the swing links 778 rotate clockwise (as viewed from the right side of the bicycle) from the position in FIG. 35B. At the same time, the slider link 780 and slider axle 784 (second pivot 762) have moved further upward along the length of the guide rails 782 to a third position near top ends of the guide rails. The additional upward movement of the slider link 780 also forces the piston shaft 786 of the shock assembly 760 further upward to place the shock assembly in a third stage of compression. In addition, as the rear suspension system 750 moves from the second partially non-compressed stage to the third fully compressed stage, the main swing arms 776 of the rear frame 752 pivot further around the second pivot 762 in a clockwise direction (as view from the right side of the bicycle).

As discussed above with reference to the other embodiments, the shock assembly 760 acts to resist displacement of the rear wheel 106 and to return the rear wheel to its pre-displacement position. Therefore, the shock assembly can, for example, act to return the rear suspension 750 from the third fully compressed stage shown in FIG. 35C to the second partially compressed stage shown in FIG. 35B.

The above comparison of FIGS. 35A-35C further illustrates how the first and second pivot translating assemblies 756, 758 couple the rear frame 752 with the front frame 754 through pivotal connections that also translate along respective travel paths. More particularly, the first pivot 764 follows an arc defined by the pivoting motion of the swing links 778 relative to the down tube 770. In addition, movement from the non-compressed position to the fully compressed position results in displacement of the rear wheel axle 138 upward in a vertical direction and as well as in a horizontal direction. As described above with reference to the first embodiment, the magnitude of the horizontal displacement of the rear wheel axle 138 can be much less than the upward vertical displacement. As such, the rear suspension system 750 can mitigate forces exerted by the rider on the pedals that would otherwise act to compress the rear suspension system.

Some embodiments of the guide rails 782 shown in FIGS. 35A-35C are also configured to allow a user to adjust the guide rail orientations and/or shapes as discussed above with reference to the first embodiment. As discussed above, adjusting the rail angle can affect the travel path of the rear wheel as well as leverage ratios as the rear suspension system moves relative to the bicycle frame. The graphs shown in FIGS. 36A-36D are illustrative of how the rear wheel path, chain stay length (CSL), and leverage ratio can be affected by varying the orientation of the guide rails for a particular rear suspension system configuration according to the fourth embodiment. More particularly, FIGS. 36A-36D each contain three sets of data corresponding to three different rail angles (i.e. 0 degrees, 10 degrees, and 20 degrees forward with respect to the vertical reference line as illustrated in FIG. 9). In other words, the three sets of data on each graph correspond with a first vertical guide rail position and two additional guide rail positions wherein the upper end portions of the guide rails are tilted forwardly 10 and 20 degrees from a vertical reference line.

Figure 36A:
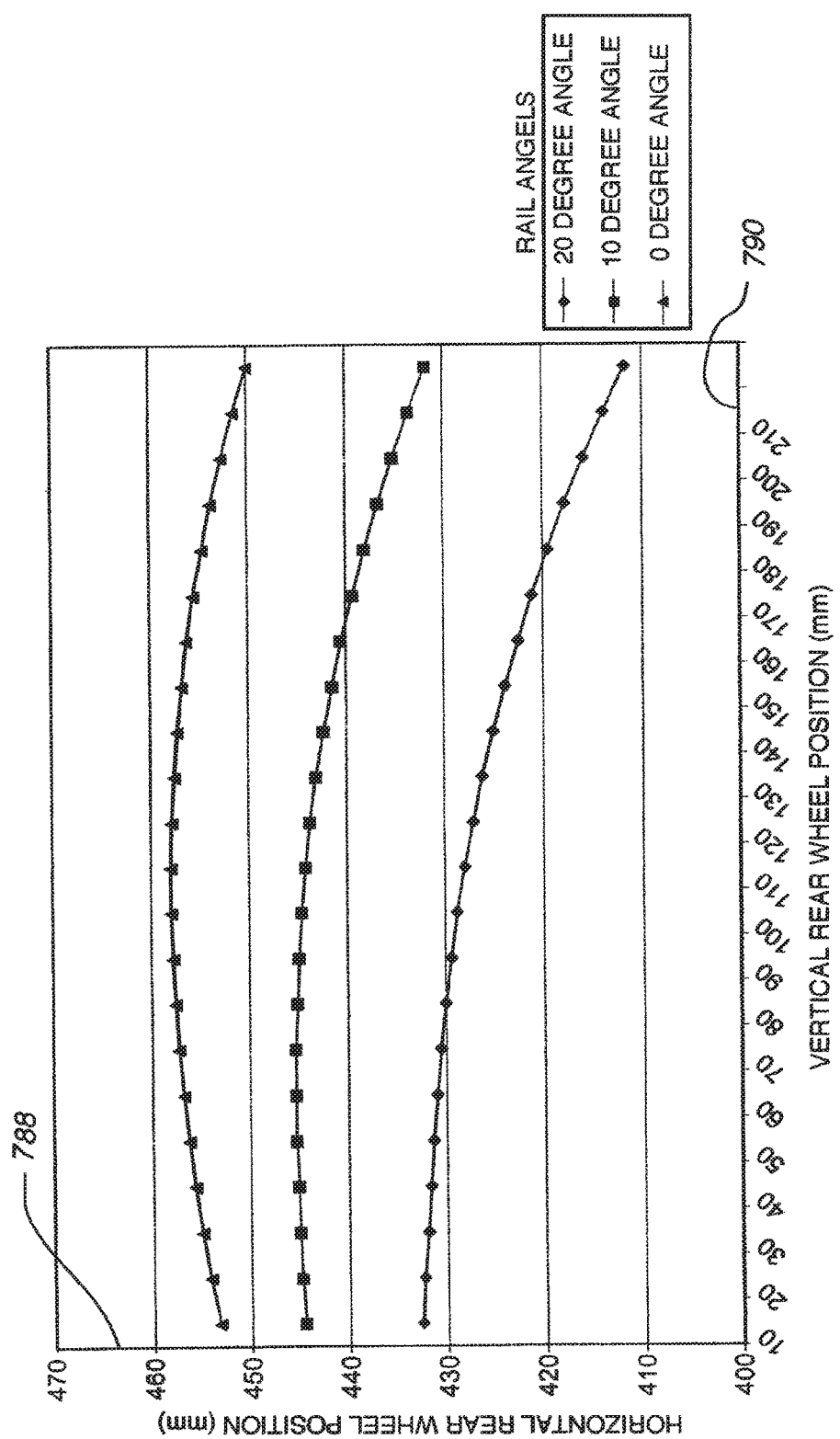
FIG. 36A is a graphical representation of the rear wheel path for three different guide rail orientations.

FIG. 36A graphically illustrates three different rear wheel paths corresponding with the three different rail angles described above as the rear suspension system 750 moves from a first stage of relative low compression to a second stage of relative high compression. The Y-axis 788 of the graph shown in FIG. 36A represents the horizontal rear wheel position in millimeters and the X-axis 790 represents the vertical rear wheel position in millimeters. As shown in FIG. 30A, all three rail angles provide similarly shaped rear wheel paths. However, wheel paths for the 0 and 10 degree rail angles differ from the 20 degree rail angle in that as the rear wheel 106 begins to move vertically, it also moves in a rearward horizontal direction relative to the front frame 754. In addition, with the 0 and 10 degree rail angles, once the rear wheel 106 is displaced vertically by approximately 130 mm, the rear wheel begins to travel in a forward horizontal direction relative to the front frame for the remainder of the travel path. The rear wheel 106 does not move rearwardly in a horizontal direction for the 20 degree rail angle. As shown in FIG. 36A, the 0 degree rail angle provides the greatest amount rearward horizontal travel, while rail angles of 10 and 20 degrees provide progressively less rearward horizontal travel. As such, as the track angle increases (i.e. the more the top end portions of the guide rails are tilted forward), the lesser the distance the rear wheel travels a rearward horizontal direction relative to the front frame as the rear wheel moves upward in a vertical direction. As previously mentioned, it is to be appreciated that embodiments of the rear suspension system can be configure to provide different rear wheel paths than that illustrated in FIG. 36A. For example, some embodiments of the rear suspension system can be configured such that the rear wheel travels in a rearward horizontal direction during the entire vertical movement of the rear wheel.

Figure 36B:
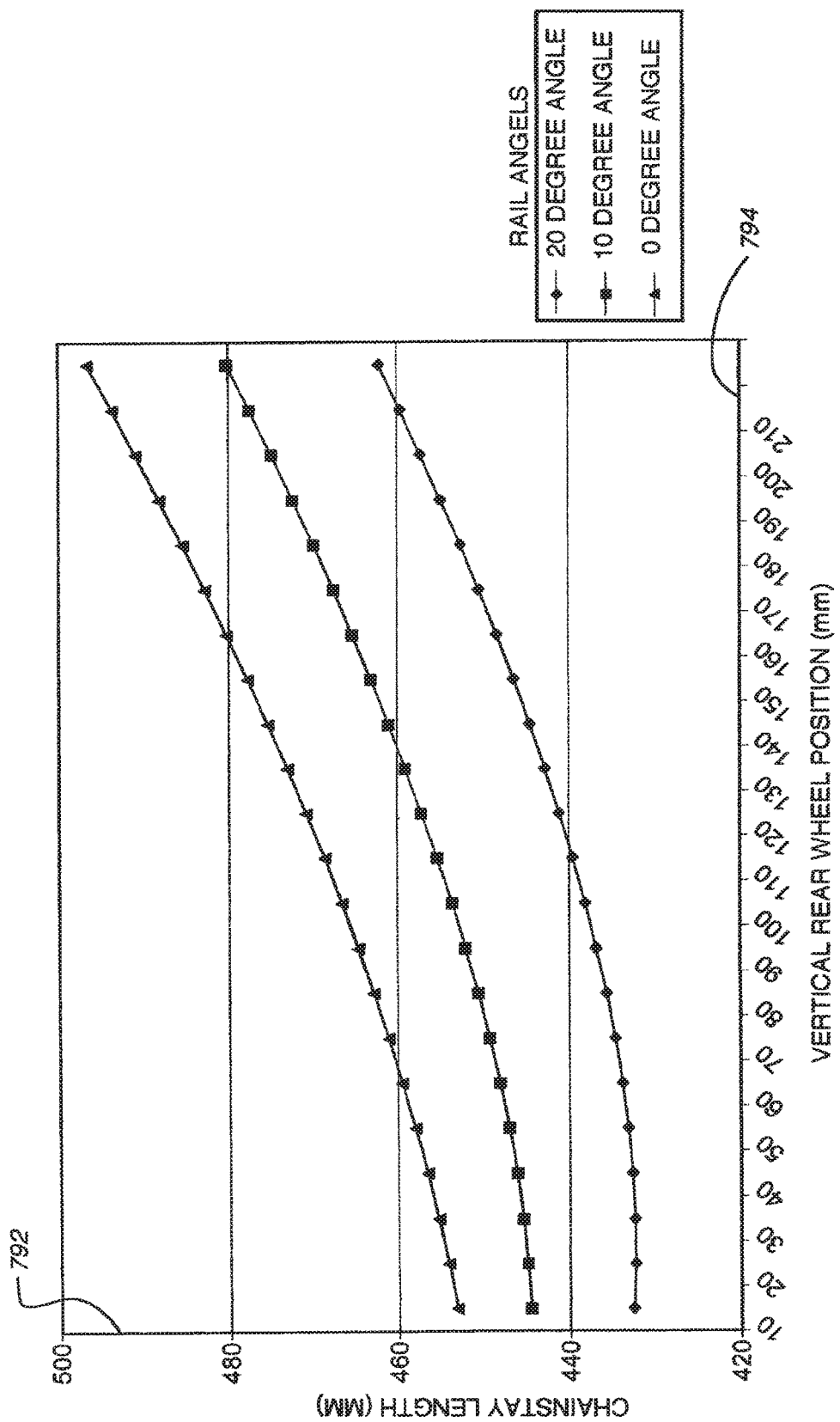
FIG. 36B is a graphical representation showing the change in chainstay length as the vertical position of the rear wheel changes for three different guide rail orientations.
Figure 36C:
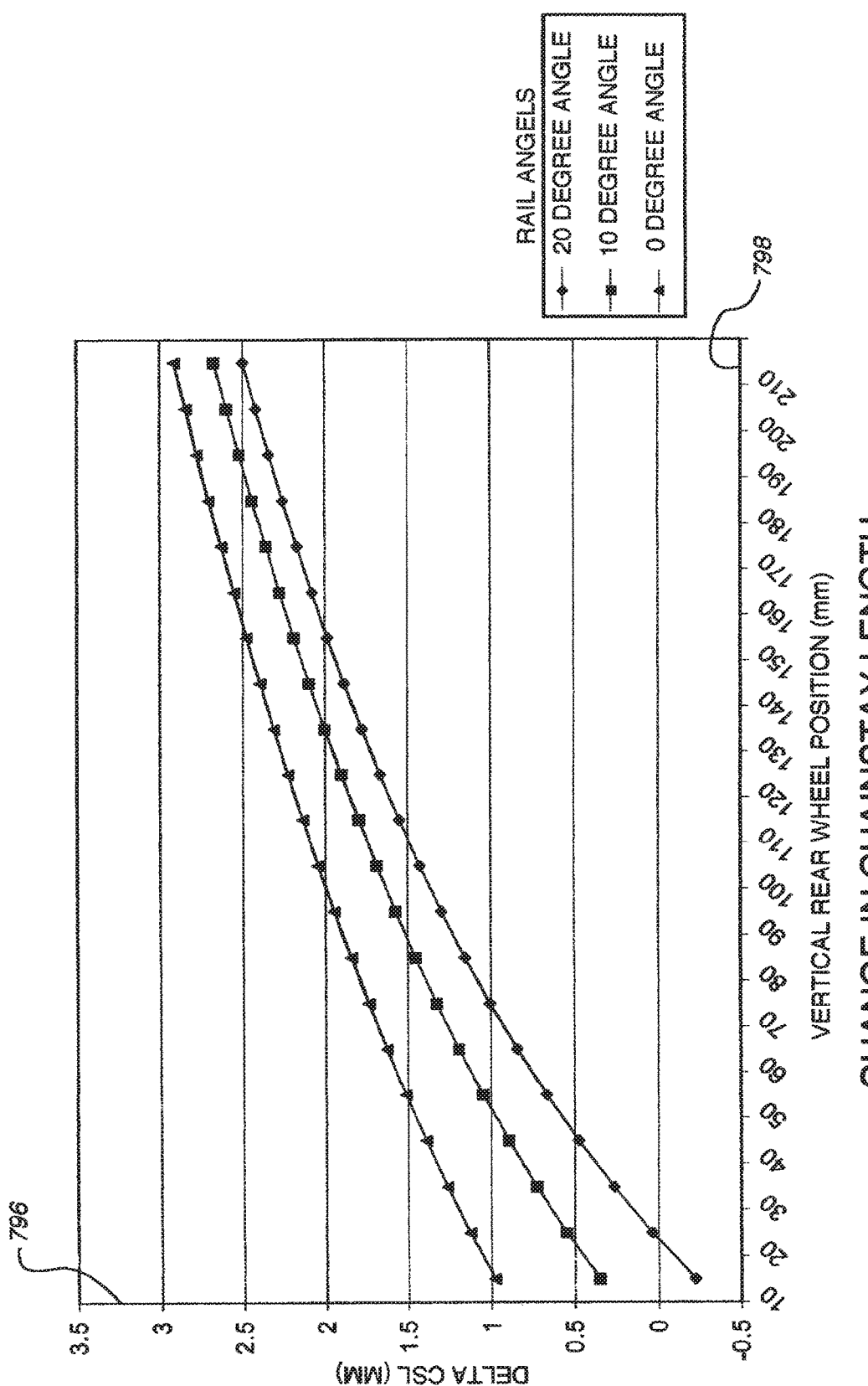
FIG. 36C is a graphical representation showing the change in chainstay length as the vertical position of the rear wheel changes for three different guide rail orientations.

FIGS. 36B and 36C graphically illustrate three sets of data showing how the chainstay length (CSL) changes with the three different guide rail orientations described above as the rear suspension system 750 moves from a first stage of relative low compression to a second stage of relative high compression. The Y-axis 792 of the graph shown in FIG. 36B represents an actual chainstay length in millimeters and the X-axis 794 represents the vertical rear wheel position in millimeters. The Y-axis 796 of the graph shown in FIG. 36C represents the change in chainstay length in millimeters and the X-axis 798 represents the vertical rear wheel position in millimeters. As shown in FIGS. 36B and 36C, for all three guide rail angles, as the rear wheel 106 moves vertically, the chain stay length increases. The 0 degree rail angle provides the greatest increase in chainstay length, while rail angles of 10 and 20 degrees provide progressively smaller increases in chainstay length.

Figure 36D:
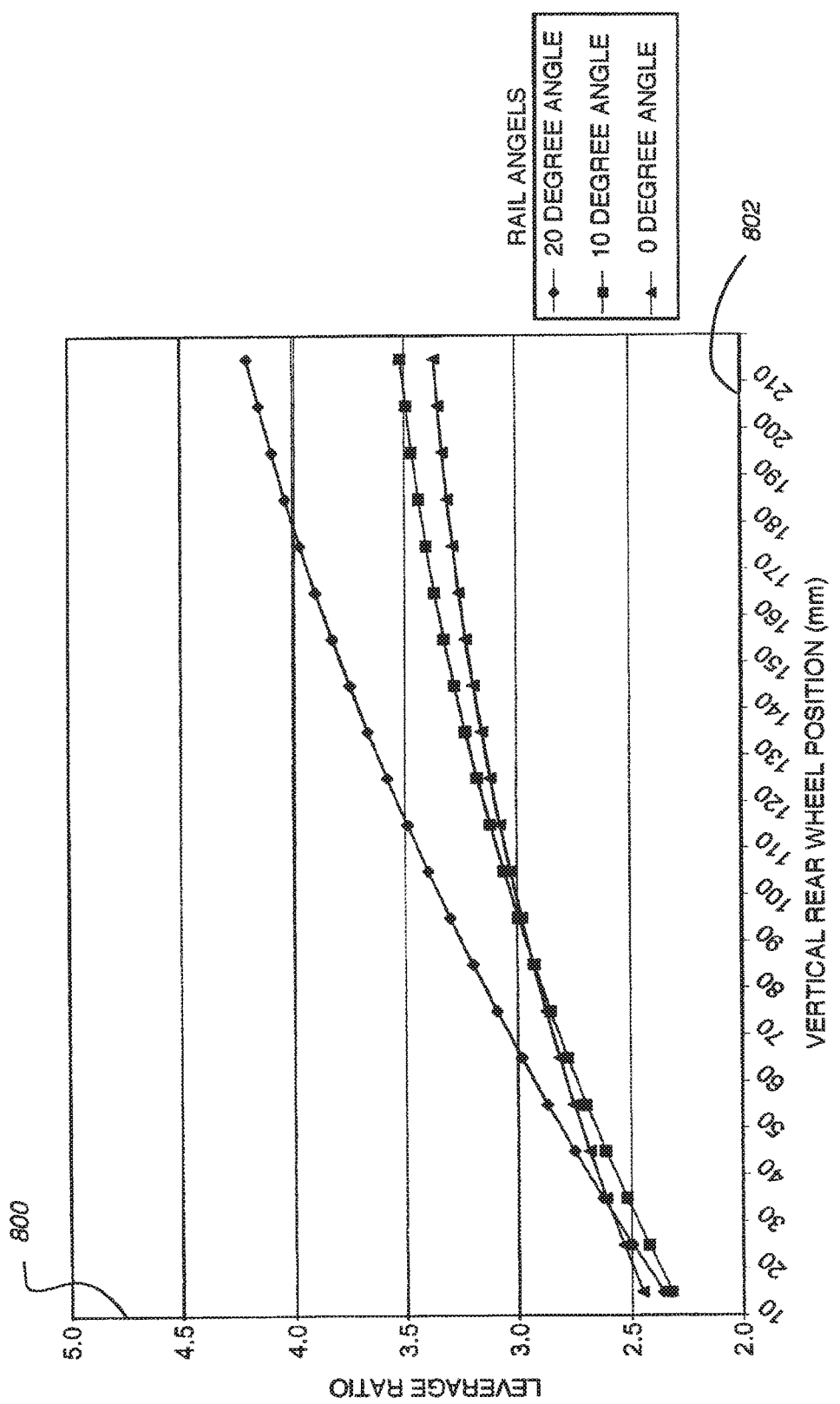
FIG. 36D is a graphical representation showing the change in leverage ratio as the vertical position of the rear wheel changes for three different guide rail orientations.

FIG. 36D graphically illustrates three sets of data showing how the leverage ratio changes with the three different guide rail orientations described above, as the rear suspension system 750 moves from a first stage of relative low compression to a second stage of relative high compression. As discussed above, the leverage ratio is defined as the total rear wheel travel divided by the total shock stroke. As such, for a given shock assembly, a relatively high leverage ratio corresponds with a "softer" suspension system as felt by the rider, and a relatively low leverage ratio corresponds with a "stiffer" suspension system as felt by the rider. The fourth embodiment of the rear suspension system can be configured to allow the rider to vary the guide rail orientation and/or shape to provide the desired leverage ratio, and hence, "feel" of the rear suspension system as the rear wheel 106 moves along a travel path.

The Y-axis 800 of the graph shown in FIG. 36D represents the leverage ratio, and the X-axis 802 represents the vertical rear wheel position in millimeters. As shown in FIG. 36D, the 0, 10, and 20 degree rail angles provide relatively low initial leverage ratios that increase as the rear wheel 106 is displaced upward in a vertical direction. As such, the rear suspension system configured with the 0, 10, and 20 degree rail angles would feel "stiff" during the initial rear wheel displacements and would progressively feel "softer" as the rear wheel is further displaced. As shown in FIG. 36D, the rail angle of 20 degrees provides the greatest leverage ratios as the rear wheel is displaced, while rail angles of 10 and 0 degrees provide progressively lower leverage ratios. Therefore, as the rail angle increases (i.e. the more the guide rails 782 are tilted forward), the rear suspension system 750 will provide a correspondingly "softer" feel. It is to be appreciated that embodiments of the present invention can also utilize guide rails defining an arcuate shape. Such guide rails would provide a variable rail angle with respect to the slider link as the slider link travels along the length of the guide rails. Therefore, the guide rails can be configured by the user to provide a desired leverage ratio curve.

Figure 37C:
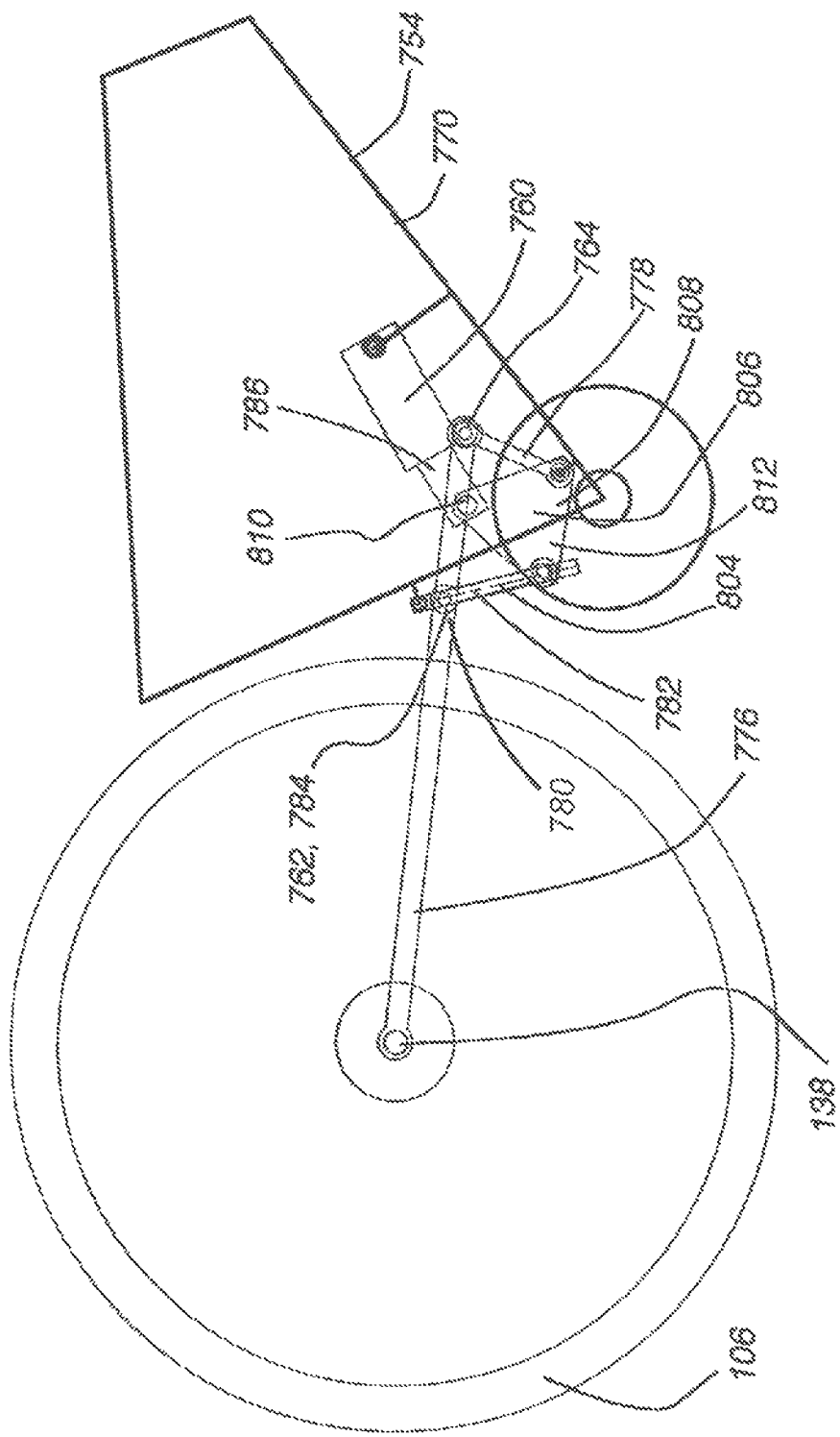
FIG. 37C depicts the rear suspension system of FIG. 37A in a third more fully compressed stage.

A schematic representation of a fifth embodiment 750' of the rear suspension system is depicted in FIGS. 37A-37C. The rear suspension system 750' according to the fifth embodiment is similar to the fourth embodiment 750 described above, except that the shock assembly 760 is connected with the slider link 780 in a different way. More particularly, as shown in FIGS. 37A-37C, the piston shaft 786 of the shock assembly 760 is connected with the slider link through a connecting link 804 and a rocker arm 806.

As shown in FIGS. 37A-37C, the rocker arm 806 defines a triangularly-shape member having three corner regions. A first corner region 808 is pivotally connected with the down tube 770 and the swing links 778. A second corner region 810 is pivotally connected with the shock assembly 760 and a third corner region 812 is pivotally connected with the connecting link 804. The connecting link 804 extends from the third corner region 812 of the rocker arm 806 and pivotally connects with the slider link 780. It is to be appreciated that the rocker arm 806 can be configured with a plurality of shock connection locations. As such, the fifth embodiment 750' provides the user an additional means for adjusting the leverage ratio by being able to connect the shock assembly in different orientations and locations on the rocker arm.

FIGS. 37A-37C show the rear suspension system 750' in varying stages of compression. More particularly, FIG. 37A shows the rear wheel 106 and rear suspension system 750' is a first relatively non-compressed stage. As illustrated, the first pivot 764 is in a first position with the swing links 778 near a 10 o'clock position (as viewed from the right side of the bicycle), and the second pivot 762 is in a first position near a middle portion of the guide rails 782. In addition, the shock assembly 760 is shown in a first stage of compression. An upward force applied to the rear wheel 106 or a downward force applied to the seat 110, such as when a rider sits on the bicycle, can place the rear suspension system 750' in a second partially compressed stage as shown in FIG. 37B.

A comparison of FIG. 37A with FIG. 37B, shows that the first pivot 764 has moved upward and forward as the swing links rotate 778 clockwise (as viewed from the right side of the bicycle) from the initial position in FIG. 37A. At the same time, the slider link 780 and second pivot axle 784 (second pivot 762) have moved upward along the length of the guide rails 782 to a second position. The upward movement of the slider link 780 also pulls the connecting link 804 upward, which rotates the rocker arm 806 clockwise relative to the down tube 770 (as viewed from the right side of the bicycle). Rotation of the rocker arm 806 in the clockwise direction, in turn, forces the piston shaft 786 of the shock assembly 760 upward and forward to place the shock assembly in a second stage of compression. As such, the connecting link 804 is pivotable relative to the guide rails 782 (i.e., around the second pivot axle 784) as the slider link 780 slides upwardly along the guide rails 782. In addition, as the rear suspension system 750' moves from the first non-compressed stage to the second partially non-compressed stage, the main swing arms 776 pivot around the second pivot 762 in a clockwise direction (as viewed from the right side of the bicycle).

A relatively large upward force applied to the rear wheel 106 or a relatively large downward force applied to the seat 110, such as when the rider and the bicycle land on the ground after riding over a jump, can place the rear suspension system 750' in a third more fully compressed stage as shown in FIG. 37C. A comparison of FIG. 37B with FIG. 37C, shows that the first pivot 764 has moved further forward and downward as the swing links 778 rotate clockwise (as viewed from the right side of the bicycle) from the position in FIG. 37B. At the same time, the slider link 780 and slider axle 784 (second pivot 762) has moved further upward along the length the guide rails 782 to a third position near the top ends of the guide rails. The additional upward movement of the slider link 780 also pulls the connecting link 804 further upward, which rotates the rocker arm 806 further in a clockwise direction relative to the down tube 770 (as viewed from the right side of the bicycle). Additional rotation of the rocker arm 806 in the clockwise direction, in turn, forces the piston shaft 786 of the shock assembly 760 further upward and forward to place the shock assembly in a third stage of compression. As discussed above with respect to the other embodiments, the shock assembly acts to resist displacement of rear wheel 106 and to return the rear wheel to its pre-displacement position. Therefore, the shock assembly can, for example, act to return the rear suspension 750' from the third fully compressed stage shown in FIG. 37C to the second partially compressed stage shown in FIG. 37B.

It will be appreciated from the above noted description of the various arrangements and embodiments of the present invention that a rear suspension system for a bicycle has been described which includes a first pivot translating assembly and a second pivot translating assembly. The rear suspension system can be formed in various ways and operated in various manners depending upon a user's desired rear wheel path and leverage ratio curve. It will be appreciated that the features described in connection with each arrangement and embodiment of the invention are interchangeable to some degree so that many variations beyond those specifically described are possible. It should also be understood that the above described component parts of the rear suspension need not be connected with the bicycle in the manners described and depicted above, and as such, can be connected with the frame and with each other in various additional locations. It should also be understood that the physical shapes and relative lengths of the rear suspension components are not limited to that which has been depicted and described herein.

Although various representative embodiments of this invention have been described above with a certain degree of particularity, those skilled in the art could make numerous alterations to the disclosed embodiments without departing from the spirit or scope of the inventive subject matter set forth in the specification and claims. All directional references (e.g., upper, lower, upward, downward, left, right, leftward, rightward, top, bottom, above, below, vertical, horizontal, clockwise, and counterclockwise) are only used for identification purposes to aid the reader's understanding of the embodiments of the present invention, and do not create limitations, particularly as to the position, orientation, or use of the invention unless specifically set forth in the claims. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other.

In some instances, components are described with reference to "ends" having a particular characteristic and/or being connected with another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, part, member or the like. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A bicycle comprising:
   a frame; and
   a rear suspension system comprising:
   at least one swing arm having a pivotable coupling with the frame;
   a link system pivotally connected with the at least one swing arm allowing the at least one swing arm to swing;
   at least one shock assembly operatively associated with the link system and the frame, the at least one shock assembly operatively also associated with the at least one swing arm; and
   at least one guide member operatively associated with the at least one swing arm providing translational pivoting of the swing arm relative to the frame.

2. The bicycle of claim 1, wherein the at least one swing arm forms a portion of a rear frame.

3. The bicycle of claim 2, wherein the rear frame supports a rear wheel.

4. The bicycle of claim 1, wherein the at least one guide member comprises a rail.

5. The bicycle of claim 1, wherein the link system comprises a first link that is pivotally coupled to the swing arm.

6. The bicycle of claim 5, wherein the link system comprises a second link that is slideable via the at least one guide member.

7. The bicycle of claim 6, wherein the link system comprises a rocker arm that is pivotally coupled to the second link and the rocker arm is pivotally coupled to the at least one shock assembly and to the frame.

8. The bicycle of claim 6, wherein: the frame comprises
   a top tube;
   a head tube connected with the top tube;
   a down tube connected with the head tube; and
   a seat tube connected with the top tube; and
   the at least one guide member is mounted to the frame.

9. The bicycle of claim 6, wherein the second link is configured to move via a contour of the at least one guide member.

10. The bicycle of claim 1, further comprising the rear sprocket assembly operatively associated with the at least one swing arm and pivotally associated with a drive sprocket.

11. The bicycle of claim 1, wherein the at least one guide member is arcuate.

12. The bicycle of claim 1, wherein the at least one guide member is linear.

* * * * *